US007779619B2

(12) United States Patent
Takubo

(10) Patent No.: US 7,779,619 B2
(45) Date of Patent: Aug. 24, 2010

(54) AIR FUEL RATIO CONTROL APPARATUS FOR AN INTERNAL COMBUSTION ENGINE

(75) Inventor: Hideki Takubo, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 554 days.

(21) Appl. No.: 11/755,176

(22) Filed: May 30, 2007

(65) Prior Publication Data
US 2008/0154476 A1 Jun. 26, 2008

(30) Foreign Application Priority Data
Dec. 25, 2006 (JP) ............................. 2006-347657

(51) Int. Cl.
F01N 3/00 (2006.01)
(52) U.S. Cl. .......................................... 60/277; 60/285
(58) Field of Classification Search .................. 60/277, 60/285, 274, 276, 299
See application file for complete search history.

(56) References Cited
U.S. PATENT DOCUMENTS
5,622,047 A 4/1997 Yamashita et al.
5,724,809 A * 3/1998 Mitsutani et al. ............... 60/276
6,877,311 B2 * 4/2005 Uchida ............................ 60/277
2005/0028517 A1 * 2/2005 Nakagawa et al. ............. 60/285
2005/0150208 A1 * 7/2005 Uchida ............................ 60/277
2005/0188680 A1 * 9/2005 Ueda et al. ...................... 60/277

FOREIGN PATENT DOCUMENTS
JP  6-26330 A    2/1994
JP  6-39932 A    5/1994
JP  7-259600 A   10/1995

* cited by examiner

Primary Examiner—Thomas E Denion
Assistant Examiner—Audrey Klasterka
(74) Attorney, Agent, or Firm—Sughrue Mion, PLLC

(57) ABSTRACT

An air fuel ratio control apparatus for an internal combustion engine can improve accuracy in catalyst degradation diagnosis. The apparatus includes a first air fuel ratio feedback control section that adjusts the air fuel ratio of a mixture supplied to an engine in accordance with an output of an upstream air fuel ratio sensor and a predetermined control constant thereby to make the air fuel ratio periodically oscillate in rich and lean directions, an average air fuel ratio oscillation section that operates the control constant based on an amount of oxygen occlusion of a catalyst so that an average air fuel ratio obtained by averaging the periodically oscillating air fuel ratio is caused to oscillate in the rich and lean directions, and a catalyst degradation diagnosis section that diagnoses catalyst degradation based on correlation between the oscillation of the average air fuel ratio and an output of the downstream oxygen sensor.

9 Claims, 29 Drawing Sheets

FIG. 13A

| FREQUENCY OF OSCILLATIONS PTN | 1 | 2 | 3 | 4 | 5 | 6 | 7 | 8 | ... |
|---|---|---|---|---|---|---|---|---|---|
| PERIOD CORRECTION COEFFICIENT | 0.5 | 1 | 1 | 1 | 1 | 1 | 1 | 1 | ... |

FIG. 13B

| FREQUENCY OF OSCILLATIONS PTN | 1 | 2 | 3 | 4 | 5 | 6 | 7 | 8 | ... |
|---|---|---|---|---|---|---|---|---|---|
| OSCILLATION WIDTH CORRECTION COEFFICIENT | 1 | 1 | 1 | 1 | 1 | 1 | 1 | 1 | ... |

FIG. 15A

| FREQUENCY OF OSCILLATIONS PTN | 1 | 2 | 3 | 4 | 5 | 6 | 7 | 8 | ... |
|---|---|---|---|---|---|---|---|---|---|
| PERIOD CORRECTION COEFFICIENT | 0.5 | 1 | 1 | 1 | 1 | 1 | 1 | 1 | ... |

FIG. 15B

| FREQUENCY OF OSCILLATIONS PTN | 1 | 2 | 3 | 4 | 5 | 6 | 7 | 8 | ... |
|---|---|---|---|---|---|---|---|---|---|
| OSCILLATION WIDTH CORRECTION COEFFICIENT | 0.5 | 0.6 | 0.7 | 0.8 | 0.9 | 1 | 1 | 1 | ... |

AIR FUEL RATIO CONTROL APPARATUS FOR AN INTERNAL COMBUSTION ENGINE

BACKGROUND OF THE INVENTION

1. Field of the Invention

The present invention relates to an air fuel ratio control apparatus for an internal combustion engine installed on a vehicle or the like. In particular, the invention relates to an air fuel ratio control apparatus for an internal combustion engine provided with an air fuel ratio feedback control section for oscillating the air fuel ratio of a mixture supplied to the internal combustion engine in rich and lean directions in a periodic manner.

2. Description of the Related Art

In general, a three-way catalyst (hereinafter referred to simply as a "catalyst") for purifying harmful components HC, CO, NOx in an exhaust gas at the same time is installed in the exhaust passage of an internal combustion engine, and in this kind of catalyst, the purification rate of the harmful components HC, CO, NOx becomes high in the vicinity of the stoichiometric air fuel ratio. Accordingly, in the air fuel ratio control apparatus for an internal combustion engine, an oxygen sensor is generally arranged at a location upstream of the catalyst, the air fuel ratio, and the air fuel ratio of a mixture is controlled in a feedback manner by adjusting the amount of injection fuel to a value in the vicinity of the stoichiometric air fuel ratio.

In addition, an oxygen occlusion capability, acting like filter processing, is added to the catalyst, so that a temporary variation of an upstream air fuel ratio (corresponding to an output value of an upstream oxygen sensor) from the stoichiometric air fuel ratio is absorbed. That is, the catalyst takes in the oxygen contained in the exhaust gas when the upstream air fuel ratio (hereinafter referred to as an "upstream A/F") is leaner than the stoichiometric air fuel ratio, whereas it releases the oxygen accumulated in the catalyst when the upstream A/F is richer than the stoichiometric air fuel ratio. Accordingly, the variation of the upstream A/F is filter processed in the catalyst, thus resulting in an air fuel ratio downstream of the catalyst.

Also, a maximum value of the amount of oxygen occlusion of the catalyst is decided by an amount of a material having an oxygen occlusion capability attached upon production of the catalyst, and the variation of the upstream A/F can not be absorbed any more when the amount of oxygen occlusion reaches a maximum amount of oxygen occlusion or a minimum amount of oxygen occlusion (=0) of the catalyst, so the air fuel ratio in the catalyst deviates from the stoichiometric air fuel ratio to decrease the purification ability of the catalyst. At this time, the air fuel ratio downstream of the catalyst deviates greatly from the stoichiometric air fuel ratio, so it is possible to detect that the amount of oxygen occlusion in the catalyst has reached the maximum value or minimum value (=0).

Further, the catalyst, being exposed to the exhaust gas of a high temperature, is designed such that the purification function of the catalyst is not rapidly reduced in certain conditions of use which can be generally considered in the internal combustion engine for a vehicle. However, the oxygen occlusion capability of the catalyst might remarkably be decreased during the use thereof because of some causes (e.g., in case of a misfire), and in addition, the oxygen occlusion capability is decreased gradually due to aging even when the travel distance of the vehicle reaches tens of thousands of kilometers for example.

Also, as is clear from timing charts of FIG. 34 and FIG. 35 which show the individual behaviors of the catalyst at the time of a normal operation thereof and at the time of a degraded operation thereof, respectively, it is known that as the catalyst is degraded or deteriorated to reduce the maximum amount of oxygen occlusion OSC to a certain value or below, the variation of the output value V1 (upstream A/F) of the upstream oxygen sensor becomes unable to be absorbed by the catalyst, so the variation of the output value V2 (the downstream A/F) of the downstream oxygen sensor increases.

Accordingly, in the past, there has been proposed an air fuel ratio control apparatus for an internal combustion engine that diagnoses the degradation of the catalyst by comparing the variation of an output value V1 of an upstream oxygen sensor and the variation of an output value V2 of a downstream oxygen sensor (see, for example, a first patent document: Japanese patent application publication No. H6-39932).

In addition, in recent years, exhaust emission control is strengthened from enhanced consideration to the earth environment, and hence it is requested to detect much smaller degradation of a catalyst (a decrease in the maximum amount of oxygen occlusion). Also, the thermal resistance of materials having an oxygen occlusion capability is being improved every year, so it is becoming possible to increase an amount of addition of such a material to a catalyst, and a maximum amount of oxygen occlusion of the catalyst for which the detection of degradation is necessary is increasing.

Accordingly, there has also been proposed an air fuel ratio control apparatus for an internal combustion engine in which, as shown in a timing chart of FIG. 36, by increasing the period and oscillation width of oscillation of an air fuel ratio to a lean direction and to a lean direction of an output value V1 (upstream A/F) of an upstream oxygen sensor, a maximum amount of oscillation width OSCmax of an amount of oxygen occlusion OSC of a catalyst is increased so that a slight degradation of the catalyst can be detected (see, for example, a second patent document: Japanese patent application laid-open No. H6-26330, and a third patent document: Japanese patent application laid-open No. H7-259600).

In conventional air fuel ratio control apparatuses for an internal combustion engine, according to a method of increasing the period or oscillation width of the air fuel ratio oscillation, for example, as in the above-mentioned first through third patent documents, there has been a problem that a degradation in air fuel ratio feedback performance with respect to external disturbances and an increase in variation of the output torque of the internal combustion engine might be caused, thus reducing marketability.

On the other hand, it can be considered that an amplitude or oscillation width of an amount of oxygen occlusion of a catalyst is increased by making an average value of an oscillating air fuel ratio oscillate in rich and lean directions in a periodic manner without changing the period and oscillation width of the air fuel ratio oscillation to the rich and lean directions of an upstream A/F to any great extent. However, in case where the average air fuel ratio is made to oscillate in this manner, the amount of oxygen occlusion is made to oscillate by means of oscillation processing of the average air fuel ratio at a period longer than the period of variation of the upstream air fuel ratio, as a result of which variation in a downstream air fuel ratio is generated without correlation to the period of variation of the air fuel ratio. Accordingly, there arises a problem that in case where the degradation of the catalyst is diagnosed based on the correlation between the upstream air fuel ratio variation and the downstream air fuel ratio variation, as in the above-mentioned conventional apparatuses, diagnostic accuracy will be reduced.

SUMMARY OF THE INVENTION

In view of the above problems, the present invention is intended to obtain an air fuel ratio control apparatus for an internal combustion engine, which is capable of improving diagnostic accuracy by performing degradation diagnosis of a catalyst based on a correlation between average air fuel ratio variation of an upstream air fuel ratio and variation in a downstream air fuel ratio detected by a downstream oxygen sensor when an average air fuel ratio in the oscillation of the upstream air fuel ratio is made to oscillate in rich and lean directions in a periodic manner.

An air fuel ratio control apparatus for an internal combustion engine according to the present invention includes: a catalyst that is arranged in an exhaust system of an internal combustion engine for purifying an exhaust gas from the internal combustion engine; an upstream air fuel ratio sensor that is arranged at a location upstream of the catalyst for detecting an air fuel ratio of a mixture in the exhaust gas upstream of the catalyst; a variety of kinds of sensors that detect operating conditions of the internal combustion engine; a first air fuel ratio feedback control section that adjusts the air fuel ratio of the mixture supplied to the internal combustion engine in accordance with an output value of the upstream air fuel ratio sensor and a predetermined control constant thereby to make the air fuel ratio oscillate in rich and lean directions in a periodic manner; a downstream air fuel ratio sensor that is arranged at a location downstream of the catalyst for detecting an air fuel ratio in the exhaust gas downstream of the catalyst; an average air fuel ratio oscillation section that operates the control constant based on an amount of oxygen occlusion of the catalyst so as to make an average air fuel ratio, which is obtained by averaging the periodically oscillating air fuel ratio, oscillate in the rich and lean directions; and a catalyst degradation diagnosis section. The catalyst degradation diagnosis section calculates a correlation between the oscillation of the average air fuel ratio and an output value of the downstream air fuel ratio sensor, and diagnoses the degradation of the catalyst based on the correlation thus calculated.

According to the present invention, in consideration of the oscillation of an amount of oxygen occlusion, which is a cause for generating downstream air fuel ratio variation, by comparing variation in a downstream air fuel ratio with a reference in the form of the oscillation of an upstream average air fuel ratio which has a correlation to the oscillation of the amount of oxygen occlusion, it is possible to diagnose the degradation of a catalyst, whereby diagnostic accuracy can be improved.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIGS. 13A and 13B are explanatory views showing a period correction coefficient and an oscillation width correction coefficient, respectively, in the form of tables, set in accordance with the number or frequency of oscillations by means of the first embodiment of the present invention.

FIGS. 15A and 15B are explanatory views showing other examples of a period correction coefficient and an oscillation width correction coefficient, respectively, in the form of tables, set in accordance with the number or frequency of oscillations by means of the first embodiment of the present invention.

DESCRIPTION OF THE PREFERRED EMBODIMENTS

Hereinafter, preferred embodiments of the present invention will be described in detail while referring to the accompanying drawings. Embodiment 1.

Figure 1:
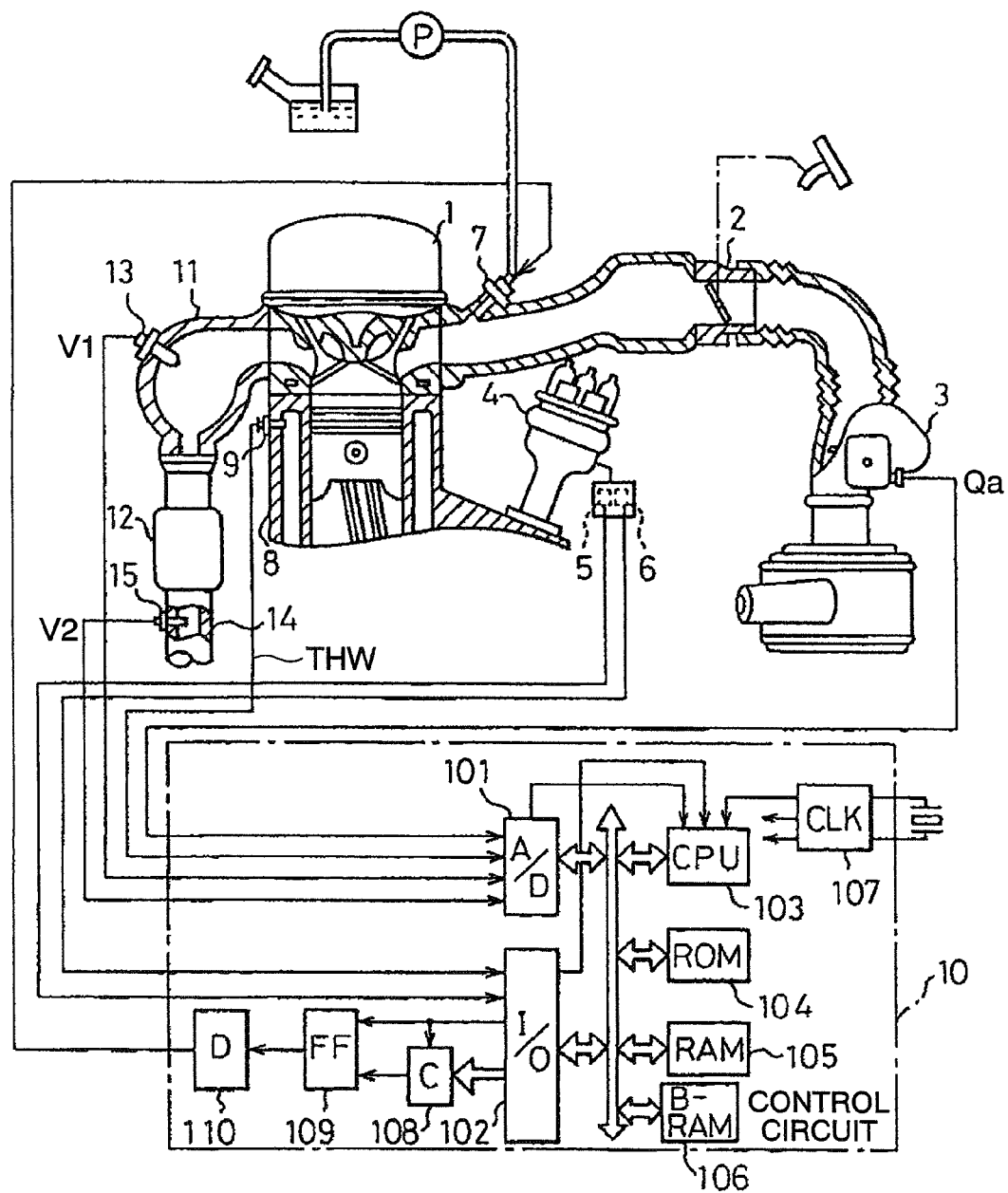
FIG. 1 is a construction view schematically showing an air fuel ratio control apparatus for an internal combustion engine according to a first embodiment of the present invention.

Now, referring to the drawings and first to FIG. 1, there is conceptually shown an air fuel ratio control apparatus for an internal combustion engine according to a first embodiment of the present invention. In FIG. 1, an air flow sensor 3 is arranged in an intake passage 2 of an engine proper 1 that constitutes an internal combustion engine (hereinafter also simply referred to as an engine). The air flow sensor 3 has a hot wire built therein for directly measuring an amount of intake air sucked into the engine proper 1, and generates an output signal (analog voltage) proportional to an amount of intake air. The output signal of the air flow sensor 3 is supplied to the A/D converter 101 of the type having a built-in multiplexer in a control circuit 10 comprising a microcomputer.

A distributor 4 related to the ignition control of a plurality of cylinders is arranged in the engine proper 1, and has a pair of crank angle sensors 5, 6 arranged therein. One crank angle sensor 5 generates a pulse signal for reference position detection at intervals corresponding to every crank angle of 720 degrees, and the other crank angle sensor 6 generates a pulse signal for reference position detection at intervals corresponding to every crank angle of 30 degrees. The individual pulse signals of the crank angle sensors 5, 6 are supplied to an input/output interface 102 in the control circuit 10, and the output signal of the crank angle sensor 6 is also supplied to an interruption terminal of the CPU 103.

The fuel injection valves 7 for supplying pressurized fuel from a fuel supply system to the intake ports of individual cylinders, respectively, are arranged in the intake passage 2 of the engine proper 1. In addition, a water temperature sensor 9 for detecting the temperature of cooling water is arranged in a water jacket 8 of a cylinder block of the engine proper 1. The water temperature sensor 9 generates an electric signal (analog voltage) corresponding to a cooling water temperature THW (i.e., the temperature of cooling water). The electric signal output from the water temperature sensor 9 is supplied to the A/D converter 101 in the control circuit 10.

A catalytic converter 12 (hereinafter simply referred to as a "catalyst"), which accommodates the three-way catalyst for purifying three harmful components HC, CO, NOx in an exhaust gas at the same time, is arranged in an exhaust system at a location downstream of an exhaust manifold 11 of the engine proper 1. An upstream oxygen sensor (upstream air fuel ratio sensor) 13 is arranged in the exhaust manifold 11 at a location upstream of the catalyst 12, and a downstream oxygen sensor (downstream air fuel ratio sensor) 15 is arranged in the exhaust pipe 14 downstream of the catalyst 12.

The individual oxygen sensors 13, 15 generate electric signals (voltage signals) corresponding to the air fuel ratios in the exhaust gas upstream and downstream of the catalyst 12 as output values V1, V2, respectively. The output values V1, V2 of the individual oxygen sensors 13, 15 varying in accordance with the air fuel ratios are input to the A/D converter 101 in the control circuit 10.

The control circuit 10 is provided with a ROM 104, a RAM 105, a backup RAM 106, a clock generation circuit 107, a drive units 108, 109, 110 and so on in addition to the A/D converter 101, the input/output interface 102 and the CPU 103. Detected information from various kinds of sensors (the air flow sensor 3, the crank angle sensor 5, 6, the temperature sensor 9, etc.), which represent the operating condition of the engine proper 1, is input to the control circuit 10. The various kinds of sensors include a pressure sensor (not shown) and the like that are arranged at locations downstream of a throttle valve in the intake passage 2.

When amounts of fuel to be supplied Qfuel (to be described later) are calculated in the control circuit 10, the fuel injection valves 7 are driven by the drive units 108, 109, 110, respectively, so that amounts of fuel corresponding to the thus calculated amounts of fuel to be supplied Qfuel are sent to the combustion chambers of the corresponding individual cylinders of the engine proper 1. The interruption to the CPU 103 is carried out at the time of completion of the A/D conversion of the A/D converter 101, or at the time of receipt of a pulse signal from the crank angle sensor 6 through the input/output interface 102, or at the time of receipt of an interruption signal from the clock generation circuit 107, or the like times.

An amount of intake air Qa from the air flow sensor 3 and the cooling water temperature THW from the water temperature sensor 9 are taken in according to an A/D conversion routine executed by the A/D converter 101 at predetermined time intervals, and stored in a predetermined region of the RAM 105. In other words, the amount of intake air Qa and the cooling water temperature THW in the RAM 105 are updated at the predetermined time intervals. In addition, the engine rotational speed Ne is calculated at every interruption of 30 degrees CA of the crank angle sensor 6 and stored in a predetermined region of the RAM 105.

Figure 2:
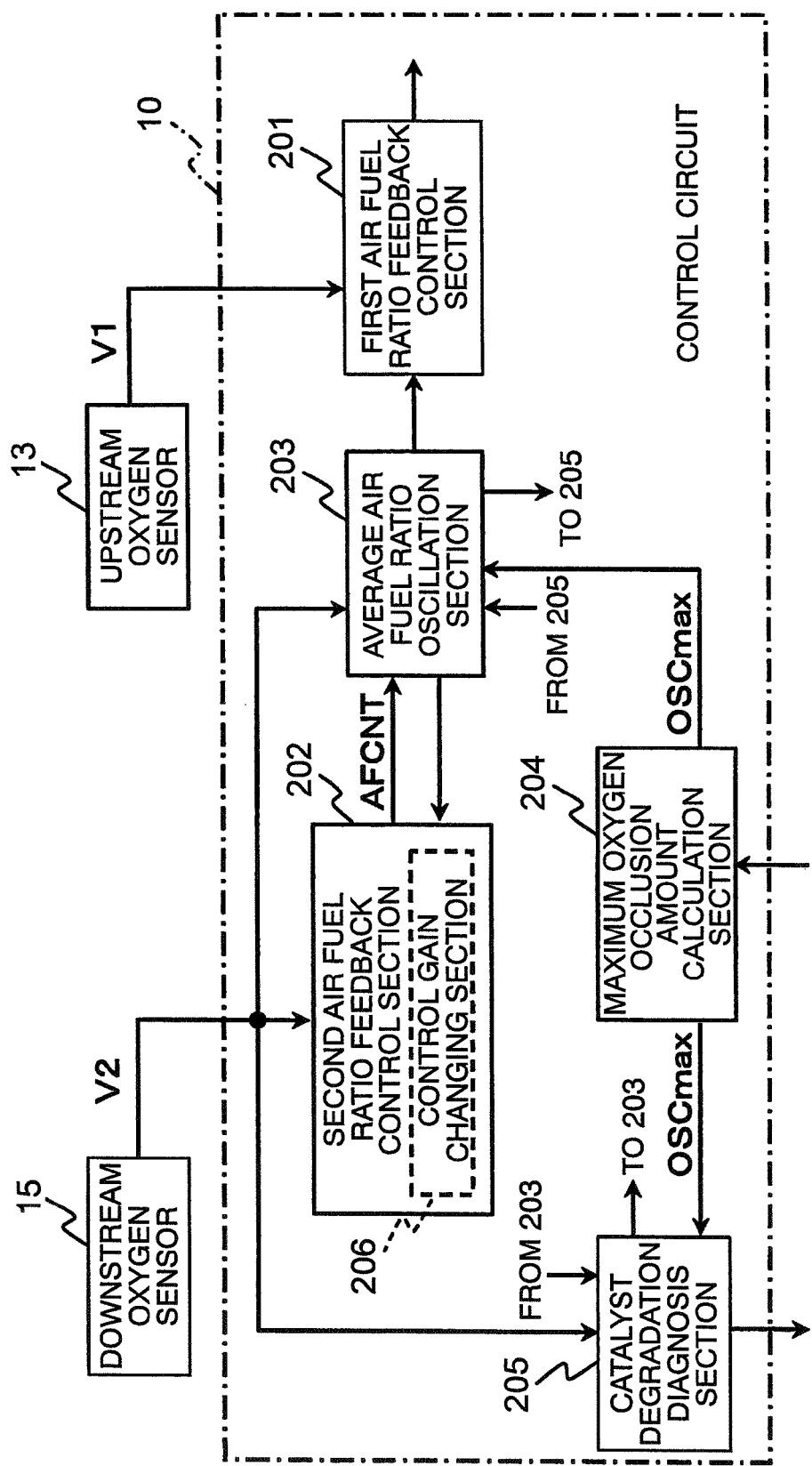
FIG. 2 is a functional block diagram showing the construction of a control circuit in FIG. 1.

FIG. 2 is a functional block diagram that shows the basic structure of the control circuit 10 in FIG. 1, wherein the individual sections in FIG. 2 are mainly constituted by the CPU 103.

The output value V1 of the upstream oxygen sensor 13 (the air fuel ratio in the exhaust gas upstream of the catalyst 12), the output value V2 of the downstream oxygen sensor 15 (the air fuel ratio in the exhaust gas downstream of the catalyst 12), and the detected information from the other various kinds of sensors are input to the control circuit 10, as previously stated.

In FIG. 2, the control circuit 10 is provided with a first air fuel ratio feedback control section 201, a second air fuel ratio feedback control section 202, an average air fuel ratio oscillation section 203, a maximum oxygen occlusion calculation section 204, and a catalyst degradation oscillation section 205. The output value V1 of the upstream oxygen sensor 13 is input to the first air fuel ratio feedback control section 201.

The output value V2 of the downstream oxygen sensor 15 is input to the second air fuel ratio feedback control section 202, the average air fuel ratio oscillation section 203 and the catalyst degradation oscillation section 205, whereas the detected information from the other various kinds of sensors is input to the maximum oxygen occlusion amount calculation section 204.

The first air fuel ratio feedback control section 201 adjusts the air fuel ratio of a mixture supplied to the engine proper 1 by controlling an excitation driving section (not shown) for the fuel injection valves 7 in accordance with the output value V1 of the upstream oxygen sensor 13 and a predetermined control constant, so that the air fuel ratio is caused to oscillate in rich and lean directions in a periodic manner.

The average air fuel ratio oscillation section 203 operates or adjusts the control constant used in the first air fuel ratio feedback control section 201 based on the amount of oxygen occlusion of the catalyst 12 (an estimated amount of oxygen occlusion OSC to be described later) in such a manner that the average air fuel ratio obtained by averaging the periodically oscillating air fuel ratio is caused to oscillate in the rich and lean directions.

The average air fuel ratio oscillation section 203 specifically sets the control constant in accordance with a target average air fuel ratio AFAVEobj for the average air fuel ratio, so that the target average air fuel ratio AFAVEobj is caused to oscillate in the rich and lean directions in a periodic manner.

In addition, for example, the average air fuel ratio oscillation section 203 sets the width or period of oscillation of the average air fuel ratio in accordance with the operating condition of the engine proper 1 in such a manner that the width of oscillation $\Delta OSC$ of the amount of oxygen occlusion of the catalyst 12 is adjusted to a predetermined oscillation width which is set in accordance with the operating condition of the engine proper 1 within the range of a maximum amount of oxygen occlusion OSCmax of the catalyst 12.

Alternatively, the average air fuel ratio oscillation section 203 sets the width or period of oscillation of the average air fuel ratio in accordance with the operating condition of the engine proper 1 in such a manner that the width (amplitude) of oscillation $\Delta OSC$ of the amount of oxygen occlusion of the catalyst 12 becomes within the range of the maximum amount of oxygen occlusion OSCmax of the catalyst 12 before degradation thereof and outside the range of the maximum amount of oxygen occlusion of the degraded catalyst for which a degradation diagnosis is needed.

The average air fuel ratio oscillation section 203 sets an initial oscillation period at the start of oscillation of the average air fuel ratio to a half of the oscillation period finally set, and also sets an initial oscillation width (amplitude) at the start of oscillation of the average air fuel ratio to a half of the oscillation width finally set.

In addition, the average air fuel ratio oscillation section 203 stops the execution of the oscillation processing of the average air fuel ratio during a transient operation of the engine proper 1 or in a predetermined period of time after a transient operation of the engine proper 1.

The average air fuel ratio oscillation section 203 makes the average air fuel ratio oscillate in the rich and lean directions at a predetermined period or cycle, and when the output value V2 of the downstream oxygen sensor 15 is inverted into the rich direction in case where the average air fuel ratio is set to the rich direction, the average air fuel ratio oscillation section 203 terminates the period set to the rich direction of the average air fuel ratio, and inverts the average air fuel ratio into the lean direction in a forced manner. Also, when the output value V2 of the downstream oxygen sensor 15 is inverted into the lean direction in case where the average air fuel ratio is set to the lean direction, the average air fuel ratio oscillation section 203 terminates the period set to the lean direction of the average air fuel ratio, and inverts the average air fuel ratio into the rich direction in a forced manner.

Further, the average air fuel ratio oscillation section 203 makes the average air fuel ratio oscillate in the rich and lean directions based on the estimated amount of oxygen occlusion OSC, and when the output value V2 of the downstream oxygen sensor is inverted into the rich direction in case where the average air fuel ratio is set to the rich direction, the average air fuel ratio oscillation section 203 resets the estimated amount of oxygen occlusion OSC to a lower limit value within the oscillation range of the amount of oxygen occlusion of the catalyst 12, and inverts the average air fuel ratio into the lean direction in a forced manner.

Also, when the output value V2 of the downstream oxygen sensor is inverted into the lean direction in case where the average air fuel ratio is set to the lean direction, the average air fuel ratio oscillation section 203 resets the estimated amount of oxygen occlusion OSC to an upper limit value within the oscillation range of the amount of oxygen occlusion of the catalyst 12, and inverts the average air fuel ratio into the rich direction in a forced manner.

Furthermore, the average air fuel ratio oscillation section 203 changes the oscillation width or the oscillation period of the average air fuel ratio so that the width of oscillation $\Delta OSC$ of the amount of oxygen occlusion of the catalyst 12 is changed between at the time of degradation diagnosis of the catalyst 12 by the catalyst degradation diagnosis section 205 and at times other than the degradation diagnosis.

The second air fuel ratio feedback control section 202 corrects, based on the output value V2 of the downstream oxygen sensor 15, a center of oscillation AFCNT of the average air fuel ratio (a central air fuel ratio) that is oscillated by the average air fuel ratio oscillation section 203.

In addition, the second air fuel ratio feedback control section 202 includes a control gain changing section 206 that changes the control gain of the second air fuel ratio feedback control section 202. The control gain changing section 206 changes the control gain during the execution of oscillation processing of the average air fuel ratio by the average air fuel ratio oscillation section 203.

The catalyst degradation diagnosis section 205 diagnoses the presence or absence of the degradation of the catalyst 12 based on the maximum amount of oxygen occlusion OSCmax calculated by the maximum oxygen occlusion amount calculation section 204. In addition, the catalyst degradation diagnosis section 205 diagnoses the degradation of the catalyst 12 at least by the output value V2 of the downstream oxygen sensor during the execution of oscillation processing of the average air fuel ratio by the average air fuel ratio oscillation section 203. The result of the diagnosis by the catalyst degradation diagnosis section 205 is input to an alarm driving section such as an alarm lamp (not shown), etc.

Next, reference will be made to the calculation processing operation of the first air fuel ratio feedback control section 201 in FIG. 2 while referring to a flow chart in FIG. 3. A calculation processing routine of FIG. 3 shows the arithmetic calculation control procedure of a fuel correction coefficient FAF based on the output value V1 of the upstream oxygen sensor 13, and it is executed by the first air fuel ratio feedback control section 201 at every predetermined time (e.g., 5 msec).

Figure 3:
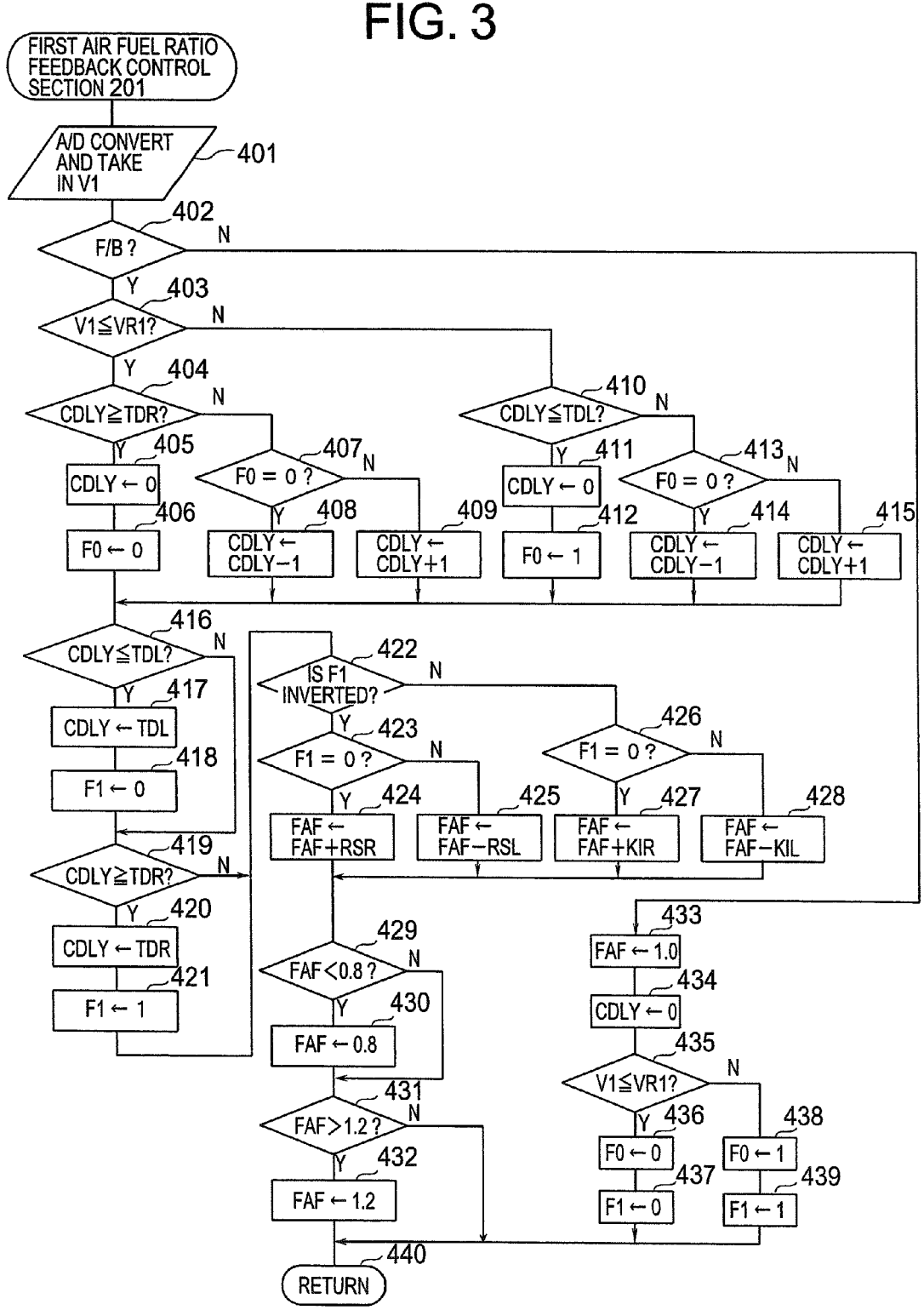
FIG. 3 is a flow chart showing a calculation processing operation of a first air fuel ratio feedback control section in FIG. 2.

In FIG. 3, symbols "Y", "N" at branched portions from each determination process represent "YES", "NO", respectively.

First of all, the output value V1 of the upstream oxygen sensor 13 is taken in after having been converted from analog into digital form (step 401), and it is determined whether the air fuel ratio feedback (F/B) (closed loop) condition by the upstream oxygen sensor 13 holds (step 402).

At this time, in case where an air fuel ratio control condition other than stoichiometric air fuel ratio control (e.g., during engine starting, during fuel enriching control at low water temperatures, during fuel enriching control for increasing power under a high load, during fuel leaning control for improvements in fuel consumption or mileage, during fuel leaning control after engine starting, or during fuel cut operation) holds, or in case where the upstream oxygen sensor 13 is in an inactive state or in a failed state, it is determined, in either case, that a closed loop condition does not hold, whereas in other cases, it is determined that a closed loop condition holds.

When in step 402, it is determined that the closed loop condition does not hold (that is, NO), the fuel correction coefficient FAF is set to "1.0" (step 433), and a delay counter CDLY is reset to "0" (step 434). Here, note that the fuel correction coefficient FAF may be a value immediately before the termination of the closed loop control or a learning value (a storage value in the backup RAM 106 in the control circuit 10).

Subsequently, it is determined whether the output value V1 of the upstream oxygen sensor 13 is less than or equal to a comparison voltage VR1 (i.e., lean) (step 435), and when it is determined that the upstream air fuel ratio is in a lean state (V1≦VR1) (that is, YES), a before-delay air fuel ratio flag F0 is set to "0" (lean) (step 436), and an after-delay air fuel ratio flag F1 is also set to "0" (lean) (step 437), after which the processing routine of FIG. 3 is exited (step 440). Here, note that the comparison voltage VR1 is set to a lean determination reference voltage (e.g., about 0.45 V).

In addition, when it is determined as V1>VR1 in step 435 (that is, NO), the upstream air fuel ratio is in a rich state, so the before-delay air fuel ratio flag F0 is set to "1" (rich) (step 438), and the after-delay air fuel ratio flag F1 is also set to "1" (rich) (step 439), after which the processing routine of FIG. 3 is exited (step 440). The initial value at the time when the closed loop condition of the air fuel ratio does not hold is set according to the above-mentioned steps 434 through 439.

On the other hand, when it is determined in step S402 that the closed loop (feedback) condition holds (that is, YES), it is subsequently determined whether the output value V1 of the upstream oxygen sensor 13 is less than or equal to the comparison voltage VR1 (e.g., 0.45 V), i.e., it is determined whether the upstream air fuel ratio upstream of the catalyst 12 is in a richer or leaner state with respect to the comparison voltage VR1 (step 403).

When it is determined as V1≦VR1 in step S403 (that is, YES), it is assumed that the upstream air fuel ratio is in the lean state, and subsequently, it is determined whether a delay counter CDLY is larger than or equal to a maximum value TDR (step 404). Here, note that the maximum value TDR corresponds to a "rich delay time" for which a determination that the upstream air fuel ratio is in the lean state is held even if the output value V1 of the upstream oxygen sensor 13 has changed from the lean state to the rich state, and it is defined as a positive value.

When it is determined as CDLY≧TDR in step S404 (that is, YES), the delay counter CDLY is reset to "0" (step 405), and the before-delay air fuel ratio flag F0 is set to "0" (lean) (step 406), after which the control process proceeds to step 416 (to be described later).

When it is determined as CDLY<TDR in step S404 (that is, NO), it is subsequently determined whether the before-delay air fuel ratio flag F0 is "0" (lean) (step 407), When it is determined as F0=0 (lean) (that is, YES), the delay counter CDLY is subtracted by "1" (step 408), and the control process proceeds to step 416, whereas when it is determined in step 407 as F0=1 (rich) (that is, NO), the delay counter CDLY is added by "1" (step 409), and the control process proceeds to step 416.

On the other hand, when it is determined as V1>VR1 in step 403 (that is, NO), it is assumed that the upstream air fuel ratio is in the rich state, and subsequently, it is determined whether the delay counter CDLY is less than or equal to a minimum value TDL (step 410). Here, note that the minimum value TDL corresponds to a "lean delay time" for which a determination that the upstream air fuel ratio is in the rich state is held even if the output value V1 of the upstream oxygen sensor 13 has changed from the rich state to the lean state, and it is defined as a negative value.

When it is determined as CDLY≦TDR in step S410 (that is, YES), the delay counter CDLY is reset to "0" (step 411), and the before-delay air fuel ratio flag F0 is set to "1" (rich) (step 412), after which the control process proceeds to step 416.

On the other hand, when it is determined as CDLY>TDL in step S410 (that is, NO), it is subsequently determined whether the before-delay air fuel ratio flag F0 is "0" (lean) (step 413). When it is determined as F0=0 (lean) (that is, YES), the delay counter CDLY is subtracted by "1" (step 414), and the control process proceeds to step 416, whereas when it is determined in step 413 as F0=1 (rich) (that is, NO), the delay counter CDLY is added by "1" (step 415), and the control process proceeds to step 416.

In step 416, it is determined whether the delay counter CDLY is less than or equal to the minimum value TDL, and when determined as CDLY>TDL (that is, NO), the control process advances to step 419 (to be described later).

When it is determined as CDLY≦TDR in step S416 (that is, YES), the delay counter CDLY is set to the minimum value TDL (step 417), and the after-delay air fuel ratio flag F1 is set to "0" (lean) (step 418). In other words, when the delay counter CDLY reaches the minimum value TDL, it is guarded or held at the minimum value TDL, and the after-delay air fuel ratio flag F1 is also set to "0" (lean).

Subsequently, it is determined whether the delay counter CDLY is larger than or equal to the maximum value TDR (step 419), and when it is determined as CDLY<TDR (that is, NO), the control process advances to step 422 (to be described later), whereas when it is determined as CDLY≧TDR in step S419 (that is, YES), the delay counter CDLY is set to the maximum value TDR (step 420), and the after-delay air fuel ratio flag F1 is set to "1" (rich) (step 421), after which the control process proceeds to step 422. In other words, when the delay counter CDLY reaches the maximum value TDR, it is guarded or held at the maximum value TDR, and the after-delay air fuel ratio flag F1 is set to "1" (rich).

In step 422, before executing skip increasing and decreasing processing (or integration processing) of the fuel correction coefficient FAF, a determination as to whether the air fuel ratio after the delay processing is inverted is made based on whether the sign of the after-delay air fuel ratio flag F1 has been inverted.

When it is determined in step 422 that the sign of the after-delay air fuel ratio flag F1 (the air fuel ratio) has been inverted (that is, YES), a determination as to whether it is an inversion from rich to lean or vice versa is subsequently made based on whether the value of the after-delay air fuel ratio flag F1 is "0" or not (step 423).

When it is determined as F1=0 in step S423 (that is, YES), it is an inversion from rich to lean, so the fuel correction coefficient FAF is made to "FAF+RSR" by being increased by a constant RSR in a skipping manner (step 424), and the control process proceeds to step 429 (to be described later), whereas when it is determined in step 423 as F1=1 (that is, NO), it is an inversion from lean to rich, so the fuel correction coefficient FAF is made to "FAF−RSL" by being decreased by a constant RSL in a skipping manner (step 425), and the control process proceeds to step 429.

On the other hand, when it is determined in step 422 that the sign of the after-delay air fuel ratio flag F1 (the air fuel ratio) has not been inverted (that is, NO), it is subsequently determined whether the after-delay air fuel ratio flag F1 is "0" (lean) (step 426). When it is determined as F1=0 (that is, YES), the fuel correction coefficient FAF is made to "FAF+KIR" by being increased by a constant KIR (<RSR) (step 427), and the control process proceeds to step 429, whereas when it is determined in step 426 as F1=1 (that is, NO), the air fuel ratio is in a rich state, so the fuel correction coefficient FAF is made to "FAF−KIL" by being decreased by a constant KIL (<RSL) (step 428), and the control process proceeds to step 429.

Here, note that the integral constants KIR and KIL are set to very small values in comparison with the skip constants RSR and RSL, respectively. Accordingly, in step 427, the amount of injection fuel in the lean state (F1=0) is gradually increased, whereas in step 428, the amount of injection fuel in the rich state (F1=1) is gradually decreased.

In step 429, it is determined whether the fuel correction coefficient FAF is smaller than "0.8", and when it is determined as FAF<0.8 (that is, YES), the fuel correction coefficient FAF is set to "0.8" (step 430), and the control process proceeds to step 431 (to be described later).

On the other hand, when it is determined as FAF≧0.8 in step 429 (that is, NO), it is subsequently determined whether the fuel correction coefficient FAF is larger than "1.2" (step 431). When it is determined as FAF>1.2 (that is, YES), the fuel correction coefficient FAF is set to "1.2" (step 432), and the processing routine of FIG. 3 is exited (step 440), whereas when it is determined as FAF≦1.2 in step 431 (that is, NO), the processing routine of FIG. 3 is immediately exited (step 440).

In other words, the fuel correction coefficient FAF calculated in steps 424, 425, 427, 428 is guarded at "0.8" (minimum value) in steps 429, 430, and it is also guarded at "1.2" (maximum value) in steps 431, 432. As a result, when the fuel correction coefficient FAF becomes too large or small due to some cause, the air fuel ratio in the engine proper 1 is controlled at its maximum value (e.g., 1) or at its minimum value (e.g., 0.8), whereby the over richness or over leanness of the air fuel ratio can be prevented.

The calculation processing of FIG. 3 is terminated as stated above, and the fuel correction coefficient FAF calculated in steps 401 through 440 is stored in the RAM 105 in the control circuit 10.

Next, reference will be made to the calculation processing operation as shown in FIG. 3 while referring to a timing chart in FIG. 4.

Figure 4:
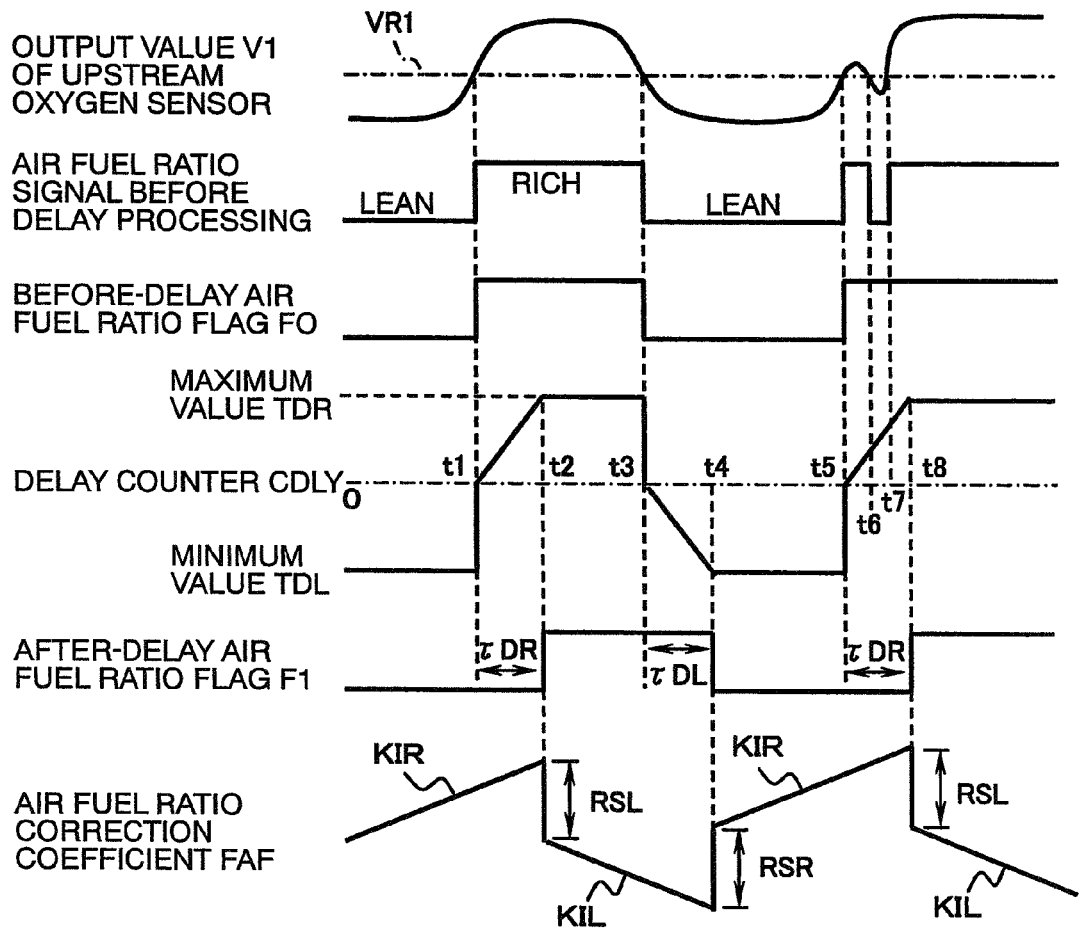
FIG. 4 is a timing chart for supplementarily explaining the operation of the first air fuel ratio feedback control section in FIG. 2.

In FIG. 4, when an air fuel ratio signal before delay processing (i.e., the comparison result of rich and lean determinations) is obtained based on the output value V1 of the upstream oxygen sensor 13, the before-delay air fuel ratio flag F0, which responds to the air fuel ratio signal before the delay processing, changes into a rich state or a lean state.

The delay counter CDLY is counted up within a range between the maximum value TDR and the minimum value TDL in response to the rich state of the before-delay air fuel ratio flag F0 (corresponding to the air fuel ratio signal before delay processing), and is, on the contrary, counted down in response to the lean state of the before-delay air fuel ratio flag F0. As a result, the after-delay air fuel ratio flag F1 comes to show an air fuel ratio signal which has been subjected to delay processing.

For example, even if the air fuel ratio signal before delay processing (the comparison result of the output value V1) is inverted from lean to rich at time point t1, the delay-processed air fuel ratio signal (the after-delay air fuel ratio flag F1) changes into a rich state at time point t2 after having been held lean for a rich delay time τDR.

Similarly, even if the air fuel ratio signal before delay processing (upstream A/F) changes from rich to lean at time point t3, the delay-processed air fuel ratio signal (the after-delay air fuel ratio flag F1) changes into a lean state at time point t4 after having been held rich for a lean delay time τDL.

However, even if the air fuel ratio signal before delay processing (comparison result) is inverted in a period of time shorter than the rich delay time τDR for example after time point t5 (after the starting of rich delay processing), as shown in time points t6, t7, the before-delay air fuel ratio flag F0 is not inverted during the delay processing (time points t5 through t8) until the delay counter CDLY reaches the rich delay time τDR.

In other words, the before-delay air fuel ratio flag F0 is not influenced by the variation of a temporary comparison result (air fuel ratio signal after delay processing) resulting from a minute variation of the output value V1, so it becomes a stable waveform as compared with the comparison result (air fuel ratio signal before delay processing). Thus, by executing delay processing, a stable before-delay air fuel ratio flag F0 and a stable air fuel ratio signal after delay processing (the after-delay air fuel ratio flag F1) are obtained, and an appropriate fuel correction coefficient FAF is obtained based on the after-delay air fuel ratio flag F1.

The slopes in an increasing direction and in a decreasing direction of the waveform of the fuel correction coefficient FAF correspond to the integration constants KIR and KIL, respectively, and the increasing and decreasing amounts of skip correspond to the skip constants RSR and RSL, respectively.

Hereinafter, in order to drive the fuel injection valves 7 so as to make the air fuel ratio coincide with a target air fuel ratio A/Fo in accordance with the fuel correction coefficient FAF and a basic fuel amount Qfuel0 calculated by the first air fuel ratio feedback control section 201, an excitation driving section in the control circuit 10 adjusts the amount of fuel Qfuel to be supplied to the engine proper 1 in a manner as shown by the following expression (1).

$$Qfuel1 = Qfuel0 \times FAF \qquad (1)$$

Here, in expression (1) above, the basic fuel amount Qfuel0 is calculated by using the amount of air Qacyl to be supplied to the engine proper 1 and the target air fuel ratio A/Fo in a manner as shown by the following expression (2).

$$Qfuel0 = Qacyl/(A/Fo) \qquad (2)$$

In expression (2) above, the amount of air Qacyl supplied to the engine proper 1 is calculated based on the amount of intake air Qa detected by the air flow sensor 3. In addition, in case where the air flow sensor 3 is not used, the amount of intake air Qa may be calculated based on an output signal of a pressure sensor (not shown) arranged in the intake passage 2 at a location downstream of the throttle valve, or may be calculated based on an engine rotational speed Ne or the degree of opening of the throttle valve.

Figure 5:
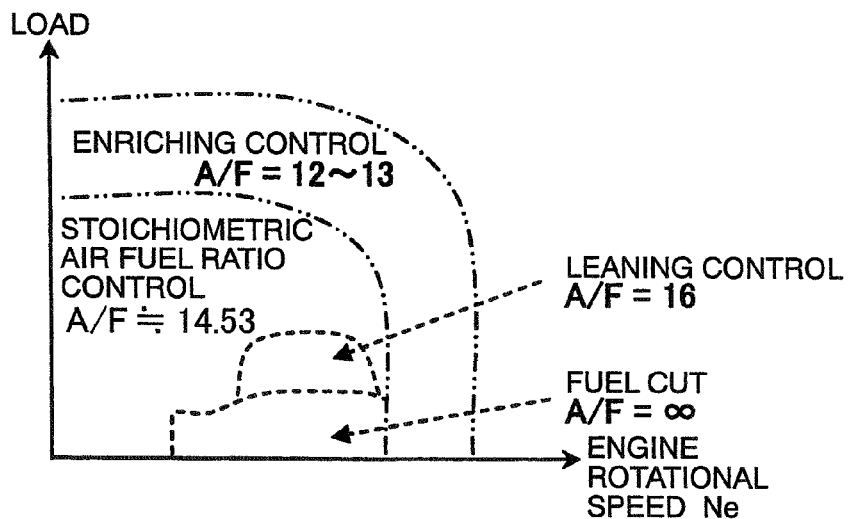
FIG. 5 is an explanatory view showing a general control region of a target air fuel ratio that is variably set in accordance with the operating condition of the internal combustion engine.

In addition, the target air fuel ratio A/Fo is set to a value, the region or location of which is set by the two dimensional map of the engine rotational speed Ne and an engine load, as shown in FIG. 5. That is, when the air fuel ratio is controlled to the stoichiometric air fuel ratio (A/F≈14.53), the target air fuel ratio A/Fo is set to a value that is reflected in a feed forward manner as the target average air fuel ratio calculated by the average air fuel ratio oscillation section 203.

As a result, a feedback follow-up delay occurring upon a change of the target value can be improved, and the fuel correction coefficient FAF can be maintained at a value in the vicinity of its central value of "1.0". In addition, at this time, learning control is performed so as to absorb a change with the lapse of time and a production variation of component elements related to the first air fuel ratio feedback control section 201 on the basis of the fuel correction coefficient FAF, so the accuracy of the learning control can be improved in accordance with the increasing stability of the fuel correction coefficient FAF by feed forward correction.

Next, reference will be made to the calculation processing operation of the average air fuel ratio oscillation section 203 in FIG. 2 while referring to a flow chart of FIG. 6 together with explanatory views in FIG. 7 through FIGS. 13A, 13B and FIGS. 15A, 15B as well as timing charts of FIG. 14, FIG. 16 and FIG. 17. The calculation processing routine of FIG. 6 is executed at every predetermined time (e.g., 5 msec).

Figure 6:
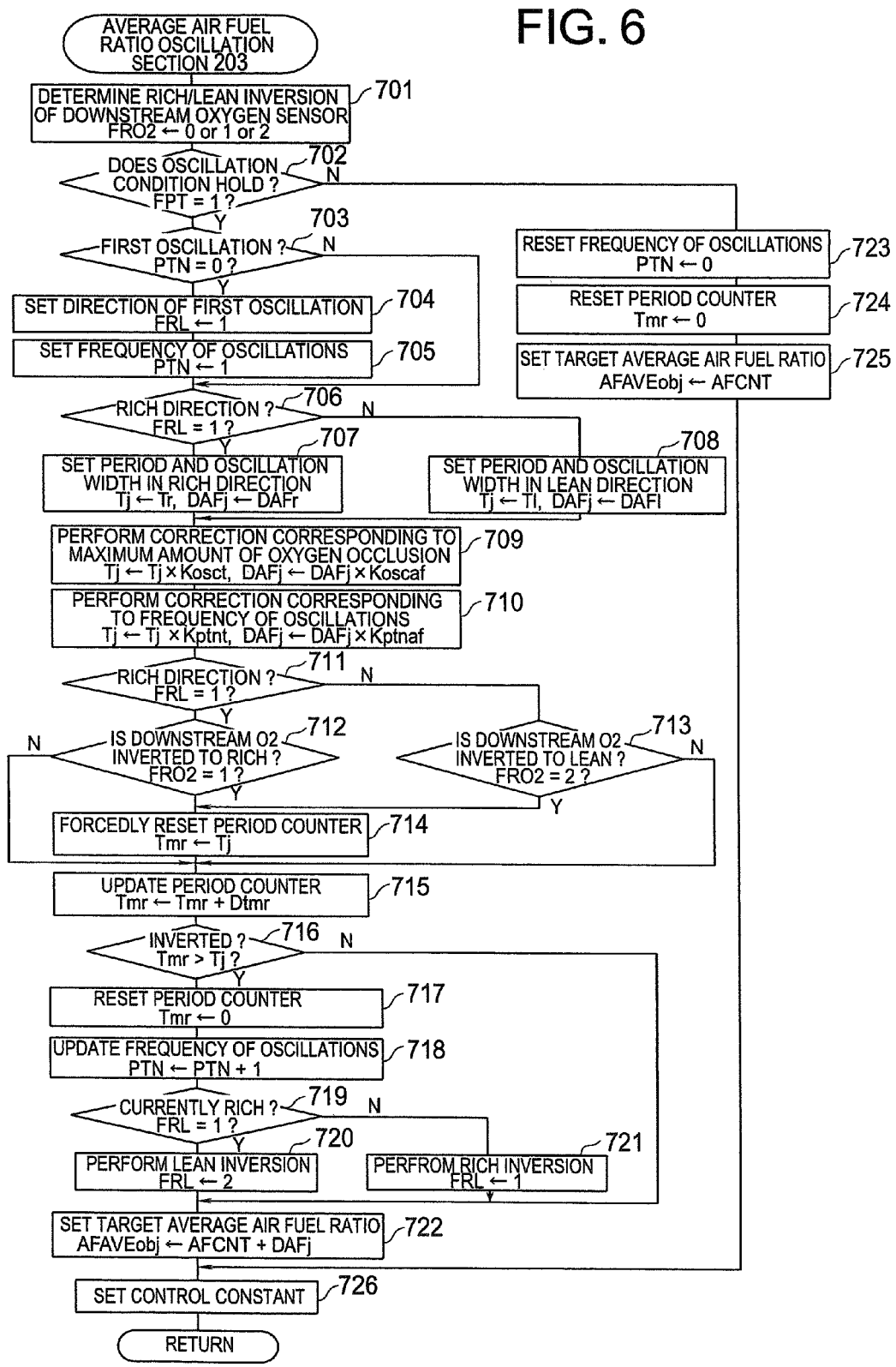
FIG. 6 is a flow chart showing the calculation processing operation of an average air fuel ratio oscillation section in FIG. 2.
Figure 7:
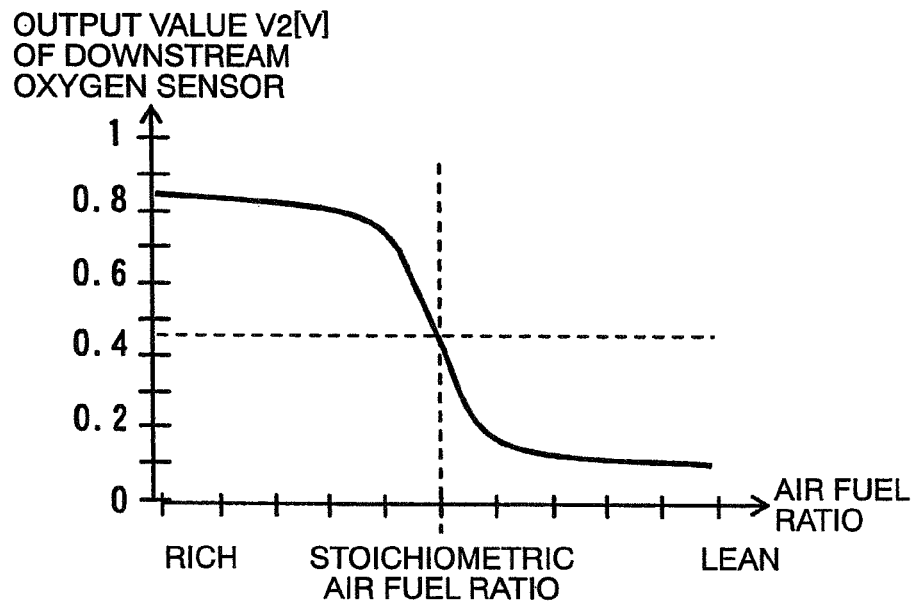
FIG. 7 is an explanatory view showing the output characteristic of a downstream oxygen sensor in case of using a general λ type sensor.

In FIG. 6, first of all, a lean/rich inversion of the output value V2 of the downstream oxygen sensor 15 is determined (step 701). The downstream oxygen sensor 15 is in the form of a λ type sensor having a binary output characteristic, in which the output value V2 (voltage value) rapidly changes in the vicinity of the stoichiometric air fuel ratio with respect to a change in the air fuel ratio of a sensor atmosphere, as shown in FIG. 7. The λ type sensor having the characteristic of FIG. 7 has a very high detection resolution and detection accuracy with respect to air fuel ratios in the vicinity of the stoichiometric air fuel ratio.

Figure 8:
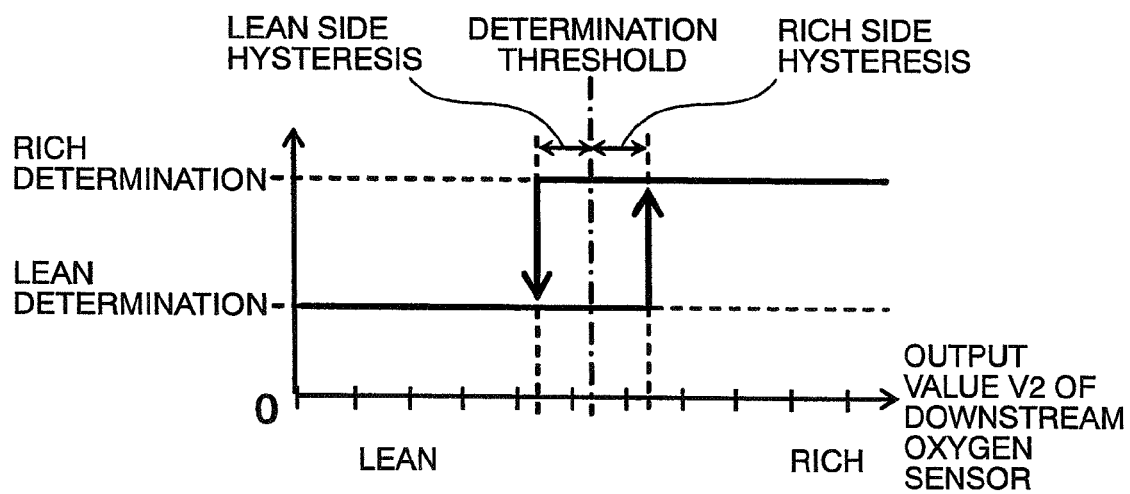
FIG. 8 is an explanatory view showing the hysteresis width of a general lean/rich determination threshold.

In other words, in step 701, it is determined, based on a determination threshold (an alternate long and short dash line), whether the output value V2 of the downstream oxygen sensor 15 is at a rich side or at a lean side, as shown in FIG. 8, and then it is determined whether the result of the rich or lean determination has been inverted.

When an inversion from lean to rich is determined in step 701, an inversion flag FRO2 of the downstream oxygen sensor 15 is set to "1" (a value indicating a lean to rich inversion (also referred to as a rich inversion)), whereas when an inversion from rich to lean is determined, the inversion flag FRO2 is set to "2" (a value indicating a rich to lean inversion (also referred to as a lean inversion)). In addition, when any inversion is not determined, the inversion flag FRO2 is set to "0" (a value indicating non-inversion).

Here, note that a determination threshold (see an alternate long and short dash line) as shown in FIG. 8 may simply be set to a predetermined voltage corresponding to engine operating conditions such as the engine rotational speed Ne, the engine load, etc., or it may be set to a target voltage VR2 of the downstream oxygen sensor 15 (to be described later) related to the second air fuel ratio feedback control section 202. The output value V2 of the downstream oxygen sensor 15 is controlled to a value in the vicinity of the target voltage VR2, so when the determination threshold is set to the target voltage VR2, the detection accuracy of the variation in a rich direction or a lean direction of the downstream oxygen sensor 15 is improved.

In addition, a value which is obtained by applying filter processing (or gradually changing processing such as averaging, etc.) to the target voltage VR2 of the downstream oxygen sensor 15 may be set as the determination threshold. According to this setting, even if the target voltage VR2 suddenly changes with the output value V2 of the downstream oxygen sensor 15 remaining unchanged, the possibility of misjudging a rich/lean inversion can be reduced.

Also, a value which is obtained by applying filter processing (or gradually changing processing such as averaging, etc.) to the output value V2 of the downstream oxygen sensor 15 may be set as the determination threshold. According to such a setting, the rich/lean inversion can be detected in a reliable manner even if the output value V2 of the downstream oxygen sensor 15 changes to a rich direction or to a lean direction while being shifted from a fixed threshold.

Further, a value which is obtained by applying filter processing (or gradually changing processing such as averaging, etc.) to the output value V2 may be used in place of the output value V2 which is to be compared with the determination threshold. Thus, an incorrect determination resulting from high frequency components of the output value V2 can be prevented.

At this time, the influence of the variation period of the output value V1 of the upstream oxygen sensor 13 may be reduced by adjusting the filtering processing (or gradually changing processing such as averaging, etc.) on the output value V2 of the downstream oxygen sensor 15. As a result, even when the variation of the output value V2 of the downstream oxygen sensor 15 approaches the variation of the output value V1 of the upstream oxygen sensor 13 due to the large degradation of the catalyst 12, it is possible to avoid the problem that the determination of the rich/lean inversion might be performed at high frequencies to make the behavior of a control system unstable.

Further, as shown in FIG. 8, in a rich or lean determination, there may be arranged a hysteresis (or dead zone) around determination thresholds between a rich to lean determination threshold for a change from rich to lean and a lean to rich determination threshold for a change from lean to rich, so that the width of the hysteresis (or dead zone) can be adjusted. As a result, it is possible to prevent the chattering of the result of the determination due to minute variation of the output value V2 and to adjust the variation width or range of the output value V2 for inversion determination.

Returning to FIG. 6, following step 701, the average air fuel ratio oscillation section 203 determines, depending upon whether an oscillation condition flag FPT is set to "1", whether the oscillation condition of the average air fuel ratio holds (step 702).

The oscillation condition in step 702 includes a state in which the catalyst 12 becomes stable and a state in which the engine proper 1 is under a predetermined operating condition, For example, the oscillation condition is determined according to the following cases: the stoichiometric air fuel ratio control according to the first air fuel ratio feedback control section 201 is executed; the engine operating conditions such as the engine rotational speed Ne, the engine load, the amount of intake air Qa, etc., are shown to be within predetermined ranges, respectively; a predetermined time or more has elapsed after the starting of the engine proper 1; the cooling water temperature THW is equal to or higher than a predetermined temperature; the engine is in a non-idling operation; the engine is in a non-transient operation; and the engine is in a state except for a predetermined time after the transient operation thereof, and so on.

The transient operation is a condition in which the variation of the air fuel ratio increases to suddenly change the amount of oxygen occlusion of the catalyst 12, and includes the following cases: the engine is suddenly accelerated or decelerated; fuel is cut; the air fuel ratio is enriched; the air fuel ratio is leaned; the control according to the second air fuel ratio feedback control section 201 is stopped; the control according to the first air fuel ratio feedback control section 202 is stopped; the fuel correction coefficient FAF from the first air fuel ratio feedback control section 201 greatly changes; an actuator is forcedly driven for failure diagnosis; and the introduction of evaporated gas is suddenly changed, and so on.

Sudden acceleration and deceleration are determined from the indication that the amount of change of the throttle opening per unit time (or the amount of intake air Qa) is equal to or more than a predetermined value for example. In addition, the sudden change of the introduction of evaporated gas is determined from the indication that the amount of change per unit time of the opening of a valve through which the evaporated gas is introduced is equal to or more than a predetermined value.

Here, note that even after the transient operation, there remains an influence due to the variation of the amount of oxygen occlusion of the catalyst 12 until after the elapse of the predetermined period of time, so oscillation processing is not executed. The predetermined period of time may be simply set in terms of time, or may be set to a time until an accumulated amount of intake air after the transient operation reaches a predetermined value, by using the amount of intake air Qa having a proportional relation with respect to the change of the amount of oxygen occlusion of the catalyst 12. By determining the elapse of the predetermined period based on the amount of intake air Qa, the start time of oscillation can be appropriately set so as to meet the behavior of the amount of oxygen occlusion of the catalyst 12.

In step 702, when the oscillation condition holds and it is determined as FPT=1 (that is, YES), the control flow proceeds to step S703, whereas when the oscillation condition does not hold and it is determined as FTP=0 (that is, NO), the control flow advances to step 723 (to be described later).

When the oscillation condition holds, an initial value for first oscillation after the oscillation condition holds is set in steps 703 through 705. First of all, it is determined, depending upon whether the frequency of oscillations PTN is "0", whether it is a first oscillation (step 703). When it is determined as PTN=0 (that is, YES), a first oscillation direction flag FRL is set to "1" (rich direction) as the initial value (step 704), and the frequency of oscillations PTN is set to "1" (i.e., indicates during the first oscillation) (step 705), after which the control process proceeds to step 706.

On the other hand, when it is determined as PTN>0 in step S703 (that is, NO), the control process proceeds to step S706 without executing the initial value setting processing (step 704, 705).

Although in step 704, the initial value of the oscillation direction flag FRL is set to "1" (rich direction), it may be set to "2" (lean direction).

Subsequently, in steps 706 through 708, a period Tj and an oscillation width DAFj in the rich and lean directions of the average air fuel ratio oscillation are set, respectively. First of all, it is determined, depending upon whether the oscillation direction flag FRL is "1", whether the oscillation direction is the rich direction (step 706), and when it is determined that the oscillation direction is the rich direction (FRL=1) (that is, YES), a rich direction period Tr and a rich direction oscillation width DAFr are set as the period Tj and the oscillation width DAFj, respectively, (step 707), and the control process proceeds to step 709.

Figure 9:
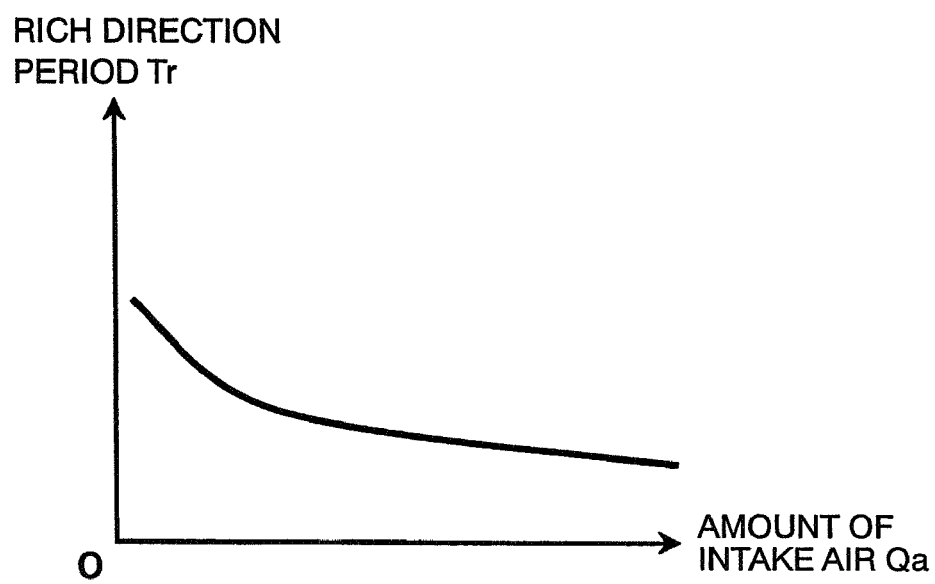
FIG. 9 is an explanatory view showing the characteristic of an oscillation period in a rich direction set in accordance with the amount of intake air by means of the first embodiment of the present invention.
Figure 10:
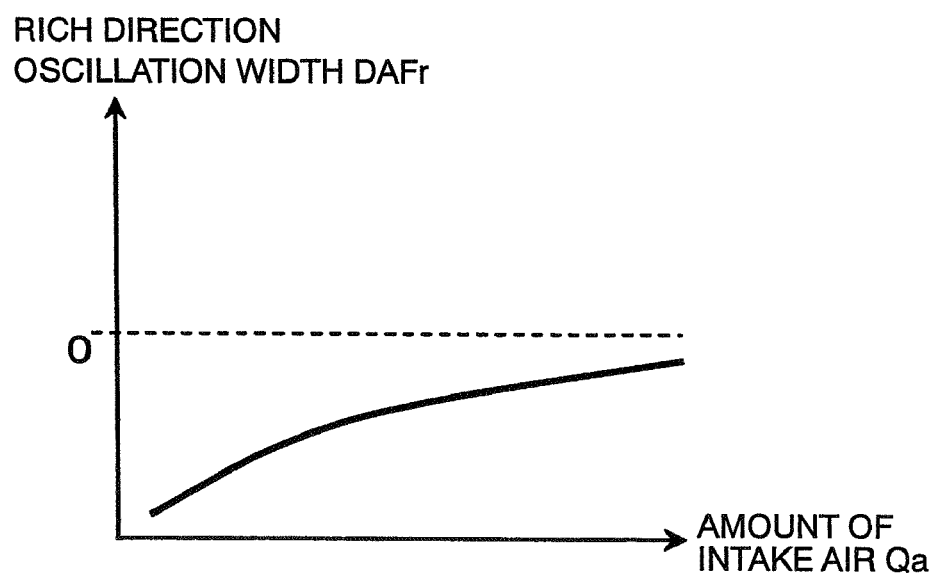
FIG. 10 is an explanatory view showing the characteristic of the width (amplitude) of oscillation in a rich direction set in accordance with the amount of intake air by means of the first embodiment of the present invention.

Here, note that in step 707, the rich direction period Tr and the rich direction oscillation width DAFr of the average air fuel ratio oscillation are respectively set based on a one-dimensional map corresponding to the amount of intake air Qa so as to adjust the width of oscillation ΔOSC of the amount of oxygen occlusion of the catalyst 12 to a predetermined value, as shown in explanatory views of FIG. 9 and FIG. 10.

On the other hand, when it is determined in step S703 that the oscillation direction is the lean direction (FRL=2) (that is, NO), a lean direction period Tl and a lean direction oscillation width DAFl are set as the period Tj and the oscillation width DAFj, respectively, (step 708), and the control process proceeds to step 709.

Figure 11:
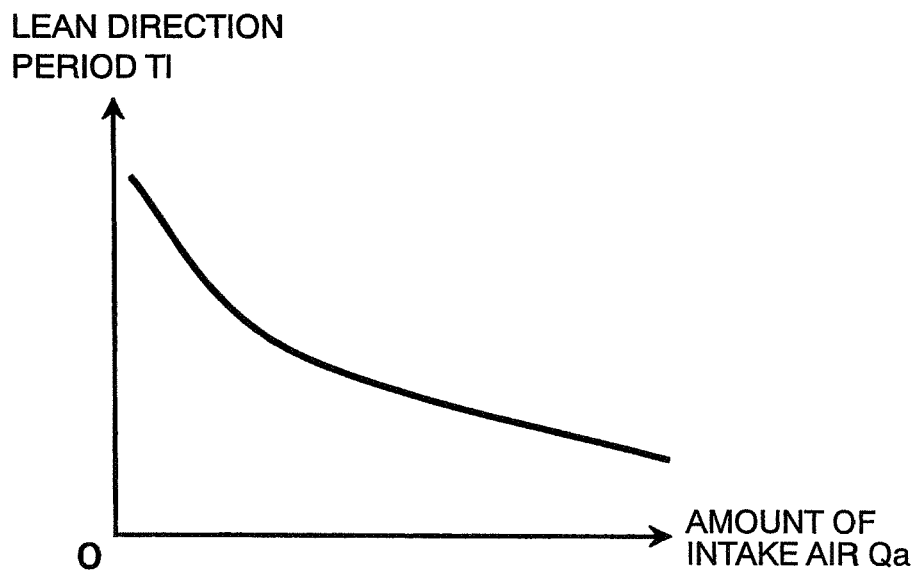
FIG. 11 is an explanatory view showing the characteristic of an oscillation period in a lean direction set in accordance with the amount of intake air by means of the first embodiment of the present invention.
Figure 12:
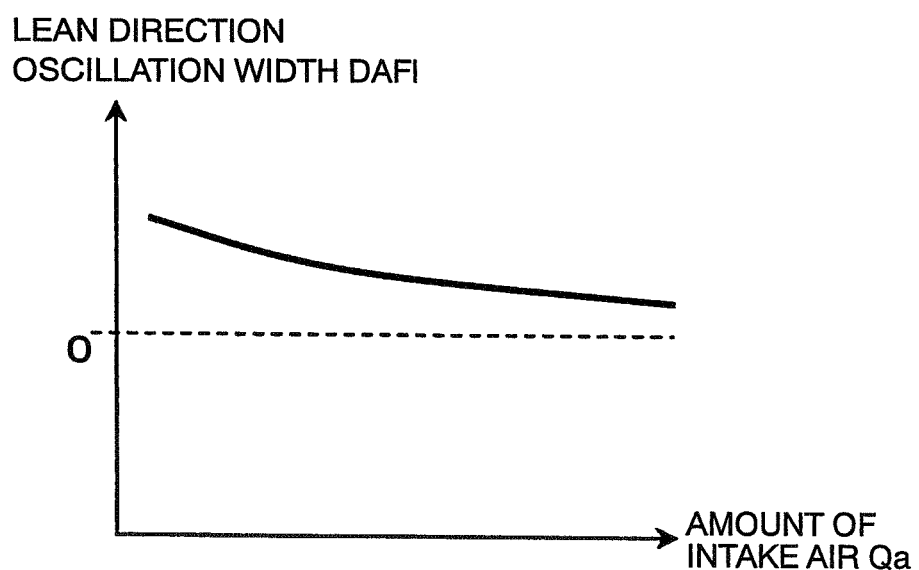
FIG. 12 is an explanatory view showing the characteristic of the width of oscillation in a lean direction set in accordance with the amount of intake air by means of the first embodiment of the present invention.

Here, note that in step 708, the lean direction period Tl and the lean direction oscillation width DAFl of the average air fuel ratio oscillation are respectively set based on the one-dimensional map corresponding to the amount of intake air Qa so as to adjust the width of oscillation ΔOSC of the amount of oxygen occlusion of the catalyst 12 to a predetermined value, as shown in explanatory views of FIG. 11 and FIG. 12 which are similar to FIG. 9 and FIG. 10.

The width of oscillation ΔOSC of the amount of oxygen occlusion is represented by using the period Tj [sec], the absolute value of the oscillation width DAFj, the amount of intake air Qa [g/sec], and a predetermined coefficient KO2 for conversion into the amount of oxygen occlusion, as shown in the following expression (3).

$$\Delta OSC[g] = Tj \times |DAFj| \times Qa \times KO2 \quad (3)$$

Here, note that in order to adjust the width of oscillation ΔOSC to a predetermined amount, it is necessary to change the width of oscillation DAFj or period Tj according to the change of the amount of intake air Qa.

For example, in case where the width of oscillation DAFj is set to a fixed value, the period Tj is set to a value that is in inverse proportion to the amount of intake air Qa, whereas in case where the period Tj is made a fixed value, the width of oscillation DAFj is set to a value that is in inverse proportion to the amount of intake air Qa.

However, in actuality, there are a variety of limitations or constraints on the setting ranges of the period Tj and the oscillation width DAFj for the purpose of improving the purification characteristic of the catalyst 12, the driveability or response of the vehicle, so both of the period Tj and the oscillation width DAFj are variably set in accordance with the amount of intake air Qa so as to adjust the width of oscillation ΔOSC of the amount of oxygen occlusion to a predetermined value.

In addition, the periods Tj (or the oscillation widths DAFj) in the rich and lean directions of the average air fuel ratio oscillation may be set asymmetric with respect to each other. For example, in order to improve the NOx purification characteristic of the catalyst 12 or to alleviate the reduction in torque, the absolute value of the width of oscillation DAFj to the lean direction may be set smaller than the absolute value of the width of oscillation DAFj to the rich direction, and in order to make the width of oscillation ΔOSC constant, the period Tj in the lean direction may be set to be larger than the period Tj in the rich direction.

In addition, the width of oscillation ΔOSC of the amount of oxygen occlusion is set to be in the range of the maximum amount of oxygen occlusion OSCmax of the catalyst 12, and the amount of oxygen occlusion of the catalyst 12 is set in a range between the maximum amount of oxygen occlusion OSCmax and the minimum amount of oxygen occlusion (=0). As a result, the variation of the air fuel ratio upstream of the catalyst 12 is absorbed by the change in the amount of oxygen occlusion in a reliable manner, and the air fuel ratio in the catalyst 12 is kept in the vicinity of the stoichiometric air fuel ratio, whereby it is possible to prevent the purification rate of the catalyst 12 from being deteriorated greatly.

In addition, in the range of the maximum amount of oxygen occlusion OSCmax, too, the oscillation width ΔOSC of the amount of oxygen occlusion is adjusted to be set to a predetermined amount in accordance with various conditions so as to improve the purification characteristic of the catalyst 12 as well as to perform the degradation or deterioration diagnosis of the catalyst 12. For example, the components of the exhaust gas from the engine proper 1 and the temperature of the catalyst 12 are changed depending upon the variations in the engine rotational speed Ne and the load, and the purification characteristic of the catalyst 12 is also varied, too, so the oscillation width ΔOSC of the amount of oxygen occlusion is changed in accordance with the engine rotational speed Ne or the load. As a result, the purification characteristic of the catalyst 12 can be further improved.

In addition, the width of oscillation ΔOSC of the amount of oxygen occlusion at the time of degradation diagnosis is set to be within the range of the maximum amount of oxygen occlusion OSCmax of the catalyst 12 before degradation thereof, and outside the range of the maximum amount of oxygen occlusion of the catalyst for which the degradation diagnosis is required. As a result, in case where a catalyst for which degradation diagnosis is required is used, the disturbance of the output value V2 of the downstream oxygen sensor 15 becomes large, so the accuracy of degradation determination in the degradation diagnosis can be improved.

Returning to FIG. 6, in step 709, the period Tj and the oscillation width DAFj of the average air fuel ratio oscillation set in steps 707, 708 are respectively adaptively corrected in accordance with the maximum amount of oxygen occlusion OSCmax calculated by the maximum oxygen occlusion amount calculation section 204. Specifically, the period Tj and the oscillation width DAFj are individually corrected by using correction coefficients Kosct and Koscaf, respectively, as shown by the following expressions (4) and (5).

$$Tj = Tj(n-1) \times Kosct \quad (4)$$

$$DAFj = DAFj(n-1) \times Koscaf \quad (5)$$

where (n−1) represents the last value before correction. Here, note that the correction coefficient Kosct for the period Tj and the correction coefficient Koscaf for the oscillation width DAFj of the average air fuel ratio are set respectively by a one-dimensional map corresponding to the maximum amount of oxygen occlusion OSCmax.

In addition, the individual correction coefficients Kosct, Koscaf are set so as to maintain the oscillation width ΔOSC of the amount of oxygen occlusion within the range of the changed maximum amount of oxygen occlusion OSCmax in such a manner that the oscillation width ΔOSC of the amount of oxygen occlusion decreases in accordance with the decreasing maximum amount of oxygen occlusion OSCmax. As a result, it is possible to prevent the oscillation width ΔOSC of the amount of oxygen occlusion from deviating from the maximum amount of oxygen occlusion OSCmax to go off scale to a great extent, whereby it is possible to prevent the great deterioration of the exhaust gas.

In addition, following the step 709, the correction coefficients Kptnt, Kptnaf corresponding to the frequency of oscillations PTN after the start of oscillation of the average air fuel ratio are multiplied, similar to the above-mentioned expressions (4) and (5), to further correct the period Tj and the oscillation width DAFj (step 710). Here, note that the correction coefficient Kptnt for the period Tj and the correction coefficient Kptnaf for the oscillation width DAFj are respectively set in accordance with the frequency of oscillations PTN by using tables shown in FIGS. 13A, 13B.

In FIG. 13A, the period correction coefficient Kptnt is set to "0.5" for only the first oscillation (PTN=1), and it is set to "1.0" for the other frequencies of oscillations PTN. Also, in FIG. 13B, the oscillation width correction coefficient Kptnaf is all set to "1.0" without regard to the frequencies of oscillations PTN.

Figure 14:
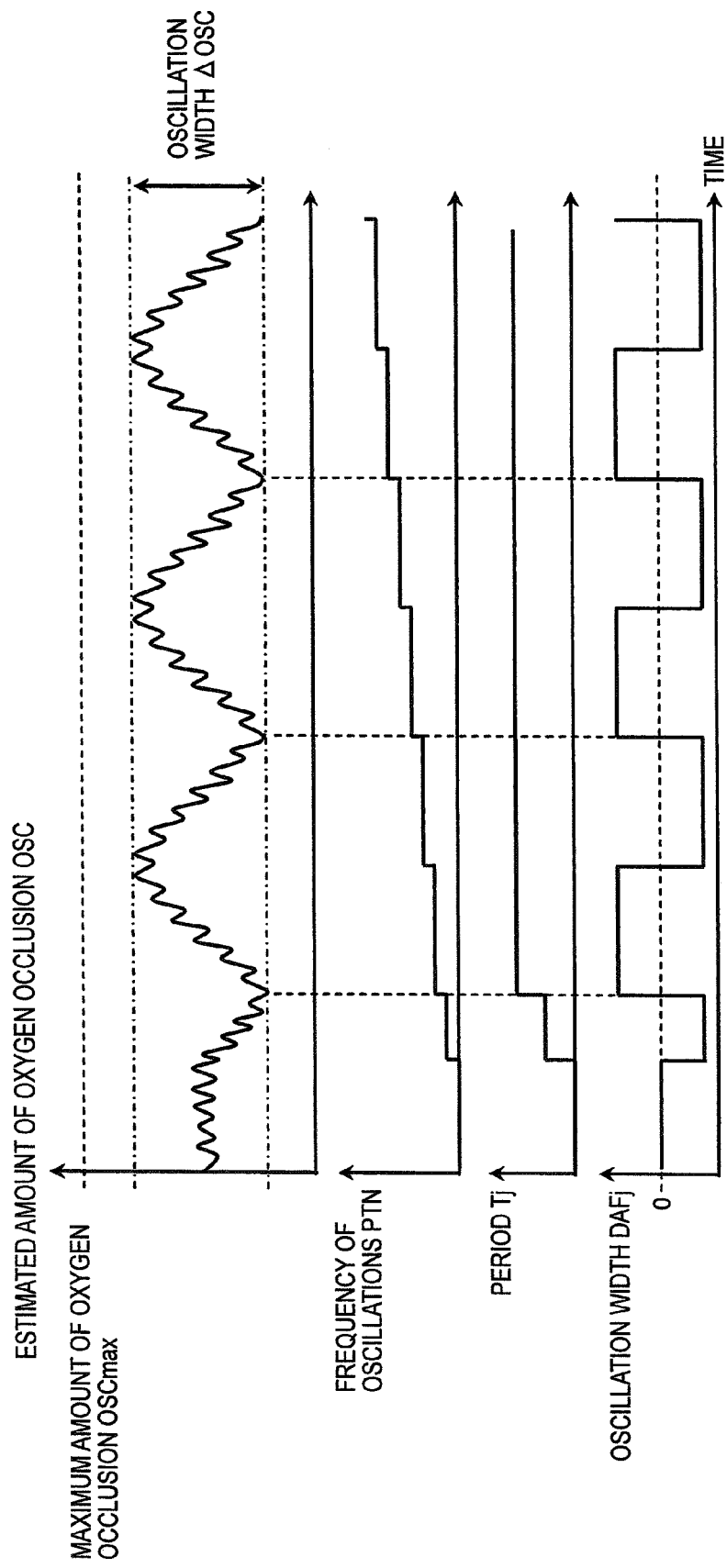
FIG. 14 is a timing chart for supplementarily explaining the operation of the average air fuel ratio oscillation section in FIG. 2.

The oscillation width ΔOSC of the amount of oxygen occlusion is set to a half of the final set value for only the first oscillation, as shown in the timing chart of FIG. 14, by setting the individual correction coefficients Kptnt, Kptnaf in a manner as shown in FIGS. 13A, 13B. As a result, the oscillation width ΔOSC does not exceed the predetermined width.

Although in FIGS. 13A, 13B and FIG. 14, there is shown the case where the period correction coefficient Kptnt for the first oscillation is set to "0.5", the oscillation width correction coefficient Kptnaf for the first oscillation may be set to "0.5". In addition, an appropriate combination of the individual correction coefficients Kptnt, Kptnaf for the period and the oscillation width may be set in such a manner that the oscillation width ΔOSC of the amount of oxygen occlusion at the first oscillation becomes a half.

Figure 16:
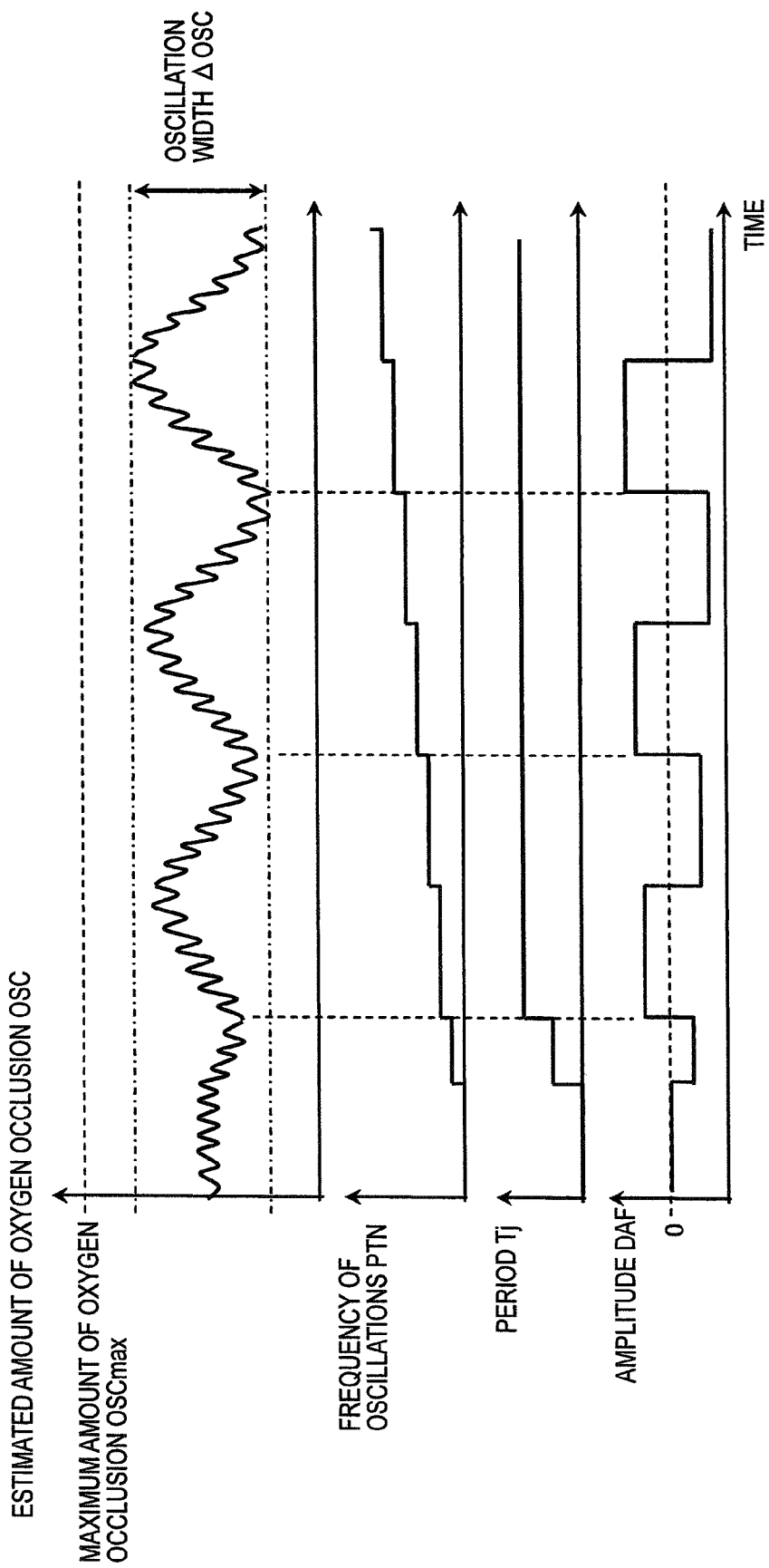
FIG. 16 is a timing chart for supplementarily explaining the operation of the average air fuel ratio oscillation section based on the period correction coefficient and the oscillation width correction coefficient in FIGS. 15A and 15B.

Further, as shown in the explanatory views of FIGS. 15A, 15B and the timing chart of FIG. 16, the individual correction coefficients Kptnt, Kptnaf for the period and the oscillation width may be set in such a manner that the oscillation width ΔOSC of the amount of oxygen occlusion gradually increases in accordance with the increasing frequency of oscillations PTN. Thus, a sudden change in the state of the catalyst 12 can be prevented. In addition, it is possible to prevent the defect in followability of air fuel ratio control (in particular, control according to the second air fuel ratio feedback control section 202).

Returning to FIG. 6, in steps 711 through 714 following the step 710, processing to forcedly invert the direction of oscillation of the average air fuel ratio is executed when it is detected by the rich/lean inversion of the output value V2 of the downstream oxygen sensor 15 that the amount of oxygen occlusion of the catalyst 12 has exceeded beyond the maximum amount of oxygen occlusion OSCmax or the minimum amount of oxygen occlusion (=0).

First of all, it is determined, depending upon whether the oscillation direction flag FRL is "1", whether the air fuel ratio is oscillating in the rich direction (step 711), and when it is determined that the air fuel ratio is oscillating in the rich direction (FRL=1) (that is, YES), it is subsequently determined, depending upon whether the inversion flag FRO2 of the downstream oxygen sensor 15 is "1", whether the downstream A/F is inverted in the rich direction (the output value V2 of the downstream oxygen sensor 15 indicates an inversion from lean to rich) (step 712).

When it is determined in step 712 that the downstream A/F indicates a rich inversion (FRO2=1) (that is, YES), a period counter Tmr (timer counter) is reset to the period Tj so as to invert the oscillation (step 714), and the control process proceeds to step 715.

In addition, when it is determined in step 712 that the downstream A/F indicates not a rich inversion (FRO2≠1) (that is, NO), the control process proceeds to step 715 without executing the reset processing of the period counter Tmr (step 714).

On the other hand, when it is determined in step S711 that the air fuel ratio is oscillating in the lean direction (FRL=2) (that is, NO), it is subsequently determined, depending upon whether the inversion flag FRO2 of the downstream oxygen sensor 15 is "2", whether the downstream A/F is inverted in the lean direction (the output value V2 of the downstream oxygen sensor 15 indicates an inversion from rich to lean) (step 713).

When it is determined in step 713 that the downstream A/F indicates a lean inversion (FRO2=1) (that is, YES), the control process proceeds to the reset processing of the period counter Tmr (step 714) so as to invert the oscillation.

Also, when it is determined in step 713 that the downstream A/F indicates not a lean inversion (FRO2≠1) (that is, NO), the control process proceeds to step 715 without executing the reset processing of the period counter Tmr (step 714).

Here, reference will be made to the behavior in the case of occurrence of the scale out of the amount of oxygen occlusion of the catalyst 12 while referring to a timing chart of FIG. 17.

The scale out of the amount of oxygen occlusion is caused in either of the following cases. the amount of oxygen occlusion is suddenly changed by the disturbance of the air fuel ratio resulting from external disturbances; the maximum amount of oxygen occlusion OSCmax is decreased due to the degradation of the catalyst 12 or the lowering of the temperature of the catalyst Tmpcat, etc; and the inversion timing of the average air fuel ratio is delayed.

Figure 17:
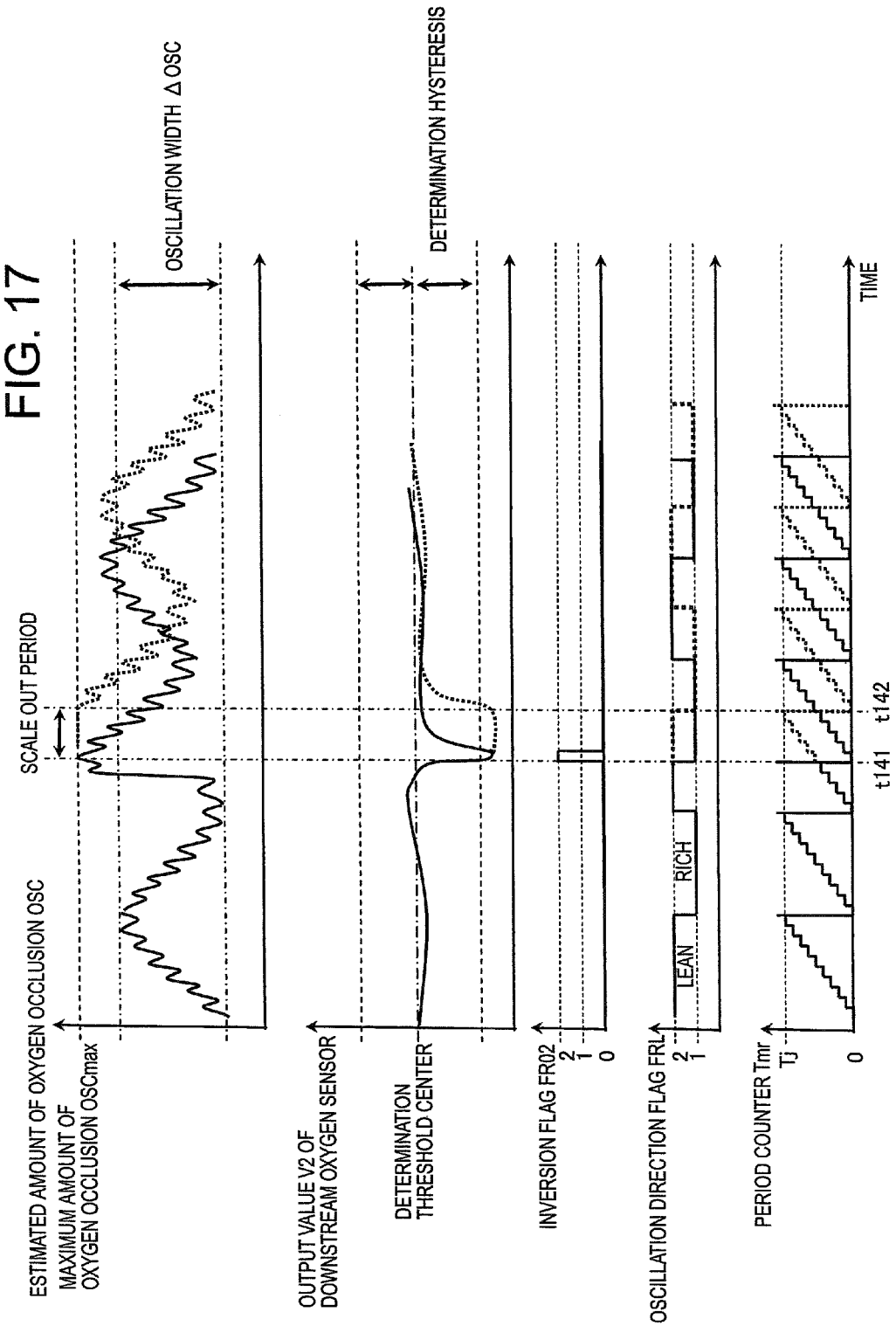
FIG. 17 is a timing chart for supplementarily explaining the operation of the average air fuel ratio oscillation section in FIG. 2.

When a large disturbance in the lean direction of the air fuel ratio is caused just before time point t141, as shown in FIG. 17, the estimated amount of oxygen occlusion OSC of the catalyst 12 rapidly increases to a great extent, so that it will go off from the maximum amount of oxygen occlusion OSCmax at time point t141.

At this time, if forced inversion processing is not performed, the value of the period counter Tmr has not reached the inversion period Tj, as shown by a dotted line waveform, so the oscillation in the lean direction (FRL=2) is continued, and the state that the amount of oxygen occlusion has gone off scale is held over a period from time point t141 to time point t142, as a result of which the air fuel ratio in the catalyst 12 deviates from the stoichiometric air fuel ratio, and the state of purification of the exhaust gas deteriorates to a remarkable extent.

On the other hand, when the forced inversion processing is executed in the above-mentioned step 714, the output value V2 of the downstream oxygen sensor 15 is inverted at time point t141 whereby the inversion flag FRO2 is changed from "0" to "2", thus detecting the scale out of the estimated amount of oxygen occlusion OSC of the catalyst 12. In response to this, the period counter Tmr is reset to the inversion period Tj, as shown by a solid line waveform, thereby to invert the oscillation in the rich direction in a forced manner. As a result, the amount of oxygen occlusion can be restored from the scale out state thereof, thereby making it possible to suppress the deterioration of the exhaust gas to a minimum.

Then, following the reset processing (step 714), in steps 715 through 721, rich/lean period inversion processing is carried out by a timer.

First of all, the period counter Tmr is updated by being incremented by a predetermined amount Dtmr (step 715), and it is determined whether the period counter Tmr exceeds the period Tj (step 716). Here, note that the predetermined amount Dtmr is set to an arithmetic calculation period of 5 msec.

When it is determined as Tmr>Tj in step 716 (that is, YES), inversion timing has been reached, so the period counter Tmr is reset to "0" (step 717), and the frequency of oscillations PTN is incremented by "1" (step 718), and subsequently, depending upon whether the oscillation direction flag FRL is "1", it is determined whether the current oscillation direction is a rich direction (step 719).

When in step S719 it is determined as the current oscillation direction is a rich direction (FRL=1) (that is, YES), the oscillation direction flag FRL is set to "2" and the oscillation direction is inverted to a lean direction (step 720), after which the control process proceeds to step 722.

On the other hand, when it is determined in step S719 that the current oscillation direction is a lean direction (FRL=2) (that is, NO), the oscillation direction flag FRL is set to "1" and the oscillation direction is inverted to a rich direction (step 721), after which the control process proceeds to step 722.

On the other hand, when it is determined as Tmr≦Tj in the above step 716 (that is, NO), inversion timing has not yet been reached, so the control flow immediately proceeds to step 722 without executing steps 717 through 721.

In step 722, the target average air fuel ratio AFAVEobj at the time when the oscillation condition holds is set. At this time, the target average air fuel ratio AFAVEobj is calculated by adding the oscillation width DAFj to an oscillation center AFCNT (a target average air fuel ratio calculated by the second air fuel ratio feedback control section 202), as shown by the following expression (6).

$$AFAVEobj = AFCNT + DAFj \qquad (6)$$

Thus, by detecting the state of the amount of oxygen occlusion of the catalyst 12 based on the output value V2 of the downstream oxygen sensor 15, the oscillation center AFCNT of the target average air fuel ratio AFAVEobj can be adjusted so as not to go off from the maximum amount of oxygen occlusion OSCmax or the minimum amount of oxygen occlusion (=0). As a result, the control precision of the oscillation processing of the amount of oxygen occlusion can be further improved.

Here, note that the oscillation center AFCNT may be set to a predetermined value depending on the engine operating conditions.

In addition, the state of purification of the catalyst 12 may be changed by shifting the oscillation center AFCNT to the lean direction or the rich direction in accordance with a certain condition.

Further, the above-mentioned oscillation processing may be used not only for the degradation diagnosis of the catalyst 12 but also for the failure diagnosis of the sensor, etc.

On the other hand, when it is determined in the first step 702 that the oscillation condition of the average air fuel ratio does not hold (that is, NO), the frequency of oscillations PTN is reset to "0" (step 723), and the period counter Tmr is also reset to "0" (step 724). In addition, the target average air fuel ratio AFAVEobj at the failure of the oscillation condition is set to the oscillation center AFCNT (step 725).

Finally, the control constant in the first air fuel ratio feedback control section 201 is set so as make the average air fuel ratio coincide with the target average air fuel ratio AFAVEobj set in step 722 or 725 (step 726), and the processing routine of FIG. 6 according to the average air fuel ratio oscillation section 203 is terminated and exited.

Next, specific reference will be made to the final step 726 in FIG. 6. First of all, reference will be made to the operation process of the average air fuel ratio executed in step 726 based on a control constant or constants.

The average air fuel ratio is manipulated or adjusted by manipulating the control constant or constants (the rich/lean skip amounts RSR, RSL, rich/lean integration constants KIR, KIL, rich/lean delay times $\tau DR$, $\tau DL$, or the comparison voltage VR1 for the output value V1 of the upstream oxygen sensor 13) in the first air fuel ratio feedback control section 201.

For example, the average air fuel ratio is shifted to a rich side by increasing the rich skip amount RSR or decreasing the lean skip amount RSL, whereas it is shifted to a lean side by increasing the lean skip amount RSL or decreasing the rich skip amount RSR. In other words, the average air fuel ratio can be controlled by changing the rich skip amount RSR and the lean skip amount RSL.

In addition, the average air fuel ratio is also shifted to the rich side by increasing the rich integration constant KIR or decreasing the lean integration constant KIL, whereas it is shifted to the lean side by increasing the lean integration constant KIL or decreasing the rich integration constant KIR. In other words, the average air fuel ratio can be controlled by changing the rich integration constant KIR and the lean integration constant KIL.

Moreover, the average air fuel ratio is shifted to the rich side by setting the rich delay time $\tau DR$ and the lean delay time $\tau DL$ in a manner to satisfy a relation of "$\tau DR > \tau DL$", and on the contrary, it is shifted to the lean side by setting them to a relation of "$\tau DL > \tau DR$". In other words, the average air fuel ratio can be controlled by changing the rich and lean delay times $\tau DL$, $\tau DR$.

Further, the average air fuel ratio is shifted to the rich side by increasing the comparison voltage VR1 with respect to the output value V1 of the upstream oxygen sensor 13, whereas it is shifted to the lean side by decreasing the comparison voltage VR1. In other words, the average air fuel ratio can be controlled by changing the comparison voltage VR1. Thus, the upstream average air fuel ratio can be controlled by changing the control constants (the delay times, the skip amounts, the integral gains, the comparison voltage, etc.).

In addition, it is possible to improve the controllability of the average air fuel ratio by manipulating or operating two or more of the control constants at the same time.

However, by manipulating or operating two or more control constants, it is possible to manage or control the rich/lean operation direction of the average air fuel ratio, but there is a possibility that it might become difficult to perform the management of the amount of manipulation or operation due to the nonlinear interaction between the control constants. Accordingly, in order to eliminate trouble resulting from the operation of a plurality of control constants and to use the degree of freedom positively, a consideration can be given to the following scheme. That is, provision is further made for an element that calculates an amount of operation of each control constant from the target average air fuel ratio, and appropriate control constants are set in accordance with the management or control index of the target average air fuel ratio, so that the operation or manipulation of the control constants is managed or controlled by the average air fuel ratio.

In addition, although in controlling the average air fuel ratio according to each control constant, for example, there are advantages and disadvantages with respect to the control precision, the width or range of operation or the control period of the average air fuel ratio, the oscillation width of the air fuel ratio, etc., it is possible to make the best use of the individual advantages by specifically setting the individual control constants in accordance with the operating point of the target average air fuel ratio.

Now, reference will be made to calculation processing for setting control constants by means of the average air fuel ratio oscillation section 203 while referring to FIG. 18.

Figure 18:
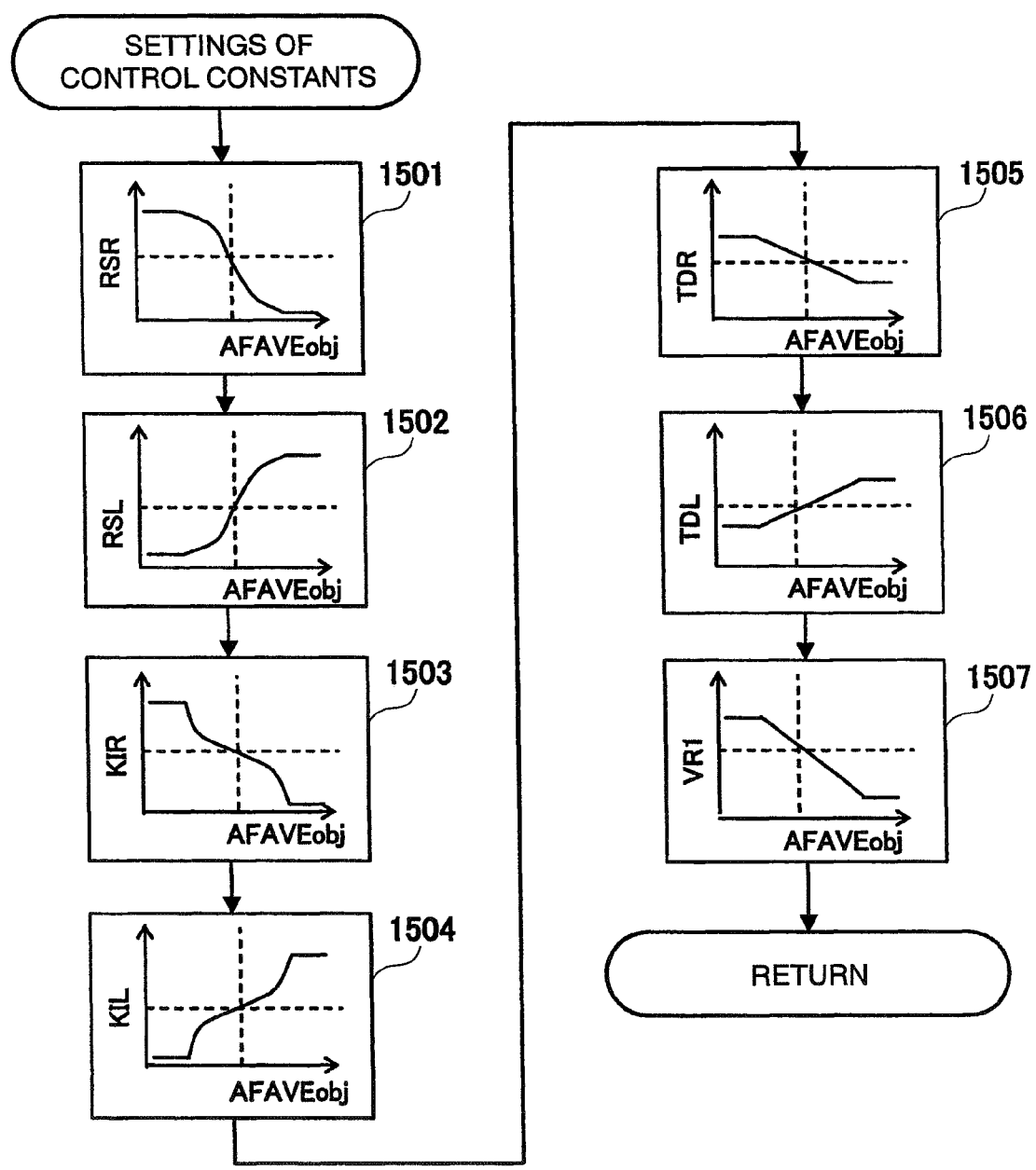
FIG. 18 is a flow chart showing the calculation processing operation of the average air fuel ratio oscillation section in FIG. 2 for setting control constants.

FIG. 18 is a flow chart diagrammatically showing the setting calculation processing of the control constants, wherein there is illustrated an arithmetic calculation routine for setting the control constants (the individual skip amounts RSR, RSL, the integration constants KIR, KIL, the individual delay times $\tau DR$, $\tau DL$, and the comparison voltage VR1) in the first air fuel ratio feedback control section 201 in accordance with the target average air fuel ratio. The calculation processing routine of FIG. 18 is executed at every predetermined time (e.g., 5 msec).

In FIG. 18, first of all, the rich skip amount RSR is calculated according to a one-dimensional map corresponding to the target average air fuel ratio AFAVEobj (step 1501). Here, note that the values of each one-dimensional map are set beforehand based on theoretical calculations or practical experiments, and a set value (map search result) of the target average air fuel ratio AFAVEob corresponding to an input value is output as the rich skip amount RSR.

In addition, one-dimensional maps in step 1501 are provided for the individual operating conditions, respectively, of the engine proper 1, so that a map search is carried out by switching among the one-dimensional maps in accordance with a change in the engine operating conditions. The operating conditions include conditions related to the response, the characteristic and the like of the construction of the first air fuel ratio feedback control section 201 (e.g., the engine rotational speed Ne, the engine load, the idling state, the cooling water temperature THW, the temperature of the exhaust gas, the temperature of the upstream oxygen sensor, and the degree of opening of an EGR valve, etc.). In addition, for example, it is possible to set the operating conditions as operating ranges which are divided by predetermined rotational speeds, loads, and cooling water temperatures.

Further, the arithmetic calculation map of the rich skip amount RSR may not necessarily be a one-dimensional map, but may be an element that represents a relation between input values and output values. For example, in place of such a one-dimensional map, there may be used an arbitrary approximate expression, or a higher-dimensional map or a higher-order function corresponding to a lot of input values.

Hereinafter, the skip amount RSL is calculated by a processing method similar to the one in step 1501 in accordance with the target average air fuel ratio AFAVEobj (step 1502). The integration constant KIR is calculated in accordance with the target average air fuel ratio AFAVEobj (step 1503), and the integration constant KIL is calculated in accordance with the target average air fuel ratio AFAVEobj (step 1504). Also, the delay time τDR is calculated in accordance with the target average air fuel ratio AFAVEobj (step 1505), and the delay time τDL is calculated in accordance with the target average air fuel ratio AFAVEobj (step 1506). In addition, the comparison voltage VR1 is calculated in accordance with the target average air fuel ratio AFAVEobj (step 1507), and the processing routine of FIG. 18 is terminated.

Thus, the control constants (the individual skip amounts RSR, RSL, the individual integration constants KIR, KIL, the individual delay times τDR, τDL, and the comparison voltage VR1) are calculated respectively in accordance with the target average air fuel ratio AFAVEobj.

As stated above, the set values in the individual arithmetic calculation maps in steps 1501 through 1507 have been set beforehand based on theoretical calculations or experimental measurements in such a manner that the actual average air fuel ratio upstream of the catalyst 12 coincides with the target average air fuel ratio AFAVEobj in the form of an input value. In addition, the actual average air fuel ratio is set so as to coincide with the target average air fuel ratio AFAVEobj irrespective of the engine operating conditions by changing the set values of the control constants depending on the engine operating conditions.

Next, reference will be made to the processing operation of the maximum oxygen occlusion amount calculation section 204 while referring to explanatory views of FIG. 20 and FIG. 21 together with a flow chart of FIG. 19. A calculation processing routine of FIG. 19 is executed at every predetermined time (e.g., 5 msec).

Figure 19:
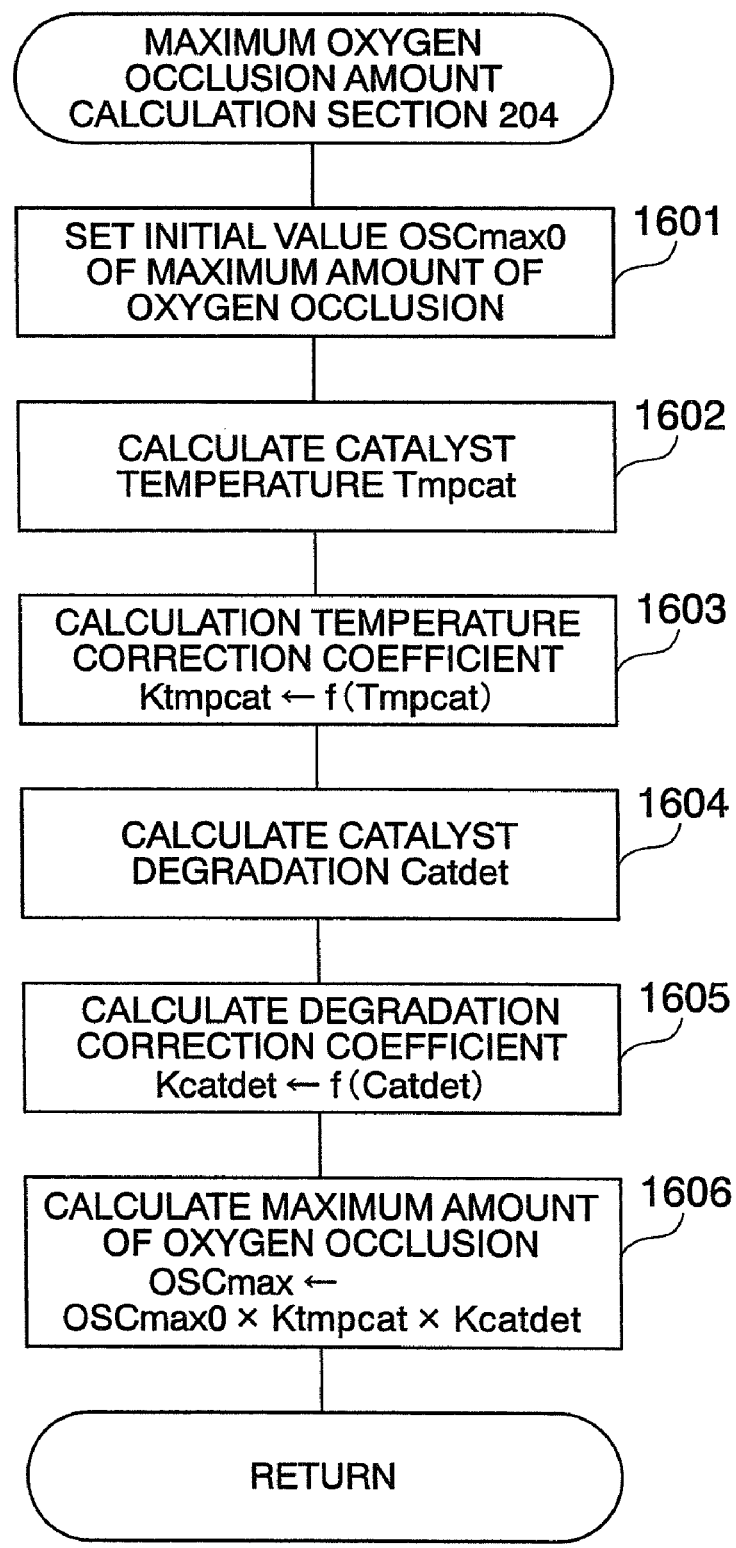
FIG. 19 is a flow chart showing the calculation processing operation of a maximum oxygen occlusion calculation section in FIG. 2.

In FIG. 19, first of all, an initial value OSCmax0 of the maximum amount of oxygen occlusion of the catalyst 12 is set (step 1601). Here, note that the maximum amount of oxygen occlusion of the catalyst designed beforehand at the time of its new product may be set as the initial value OSCmax0.

In addition, a maximum amount of oxygen occlusion of a durable catalyst after travel of a predetermined distance as stipulated by exhaust emission regulations may be set as the initial value OSCmax0, and in this case, the initial value OSCmax0 can be set which satisfies the requirements for exhaust emission regulations.

Further, as the initial value OSCmax0, there may be set a maximum amount of oxygen occlusion in a steady state based on the operating conditions of the engine proper 1 (the engine rotational speed Ne, the engine load, the amount of intake air Qa, etc.), and in this case, setting accuracy can be improved.

Subsequently, the temperature of the catalyst Tmpcat is calculated (step 1602). In this connection, note that the temperature of the catalyst Tmpcat may be directly obtained through measurements by installing a temperature sensor on the catalyst 12 or by arranging a temperature sensor at a location upstream or downstream of the catalyst 12.

Also, the temperature of the catalyst Tmpcat may be obtained from information on other operating conditions through estimation calculation. For example, the temperature of the catalyst Tmpcat can be calculated as a value at the steady state through estimation by reading a value in the steady state set for each of the engine operating conditions (the engine rotational speed Ne, the engine load, the amount of intake air Qa, etc.) through map calculation. In addition, the behavior of the engine proper 1 at transition can be estimated by applying filter processing to the steady state temperature of the catalyst Tmpcat.

Further, the initial temperature of the catalyst Tmpcat0 at engine starting can be estimated from the cooling water temperature THW at engine starting, or a time interval from the last engine stop to the current engine starting, or the like. As a result, it is possible to obtain not only a transition temperature behavior from the starting of the engine proper 1 until the time the catalyst 12 is activated to become a steady state, but also a transition temperature behavior due to the variation of the engine operating conditions.

Subsequently, following the step 1602, a temperature correction coefficient Ktmpcat of the maximum amount of oxygen occlusion OSCmax is calculated through a one-dimensional map (see FIG. 20) set in accordance with the temperature of the catalyst Tmpcat (step 1603).

Figure 20:
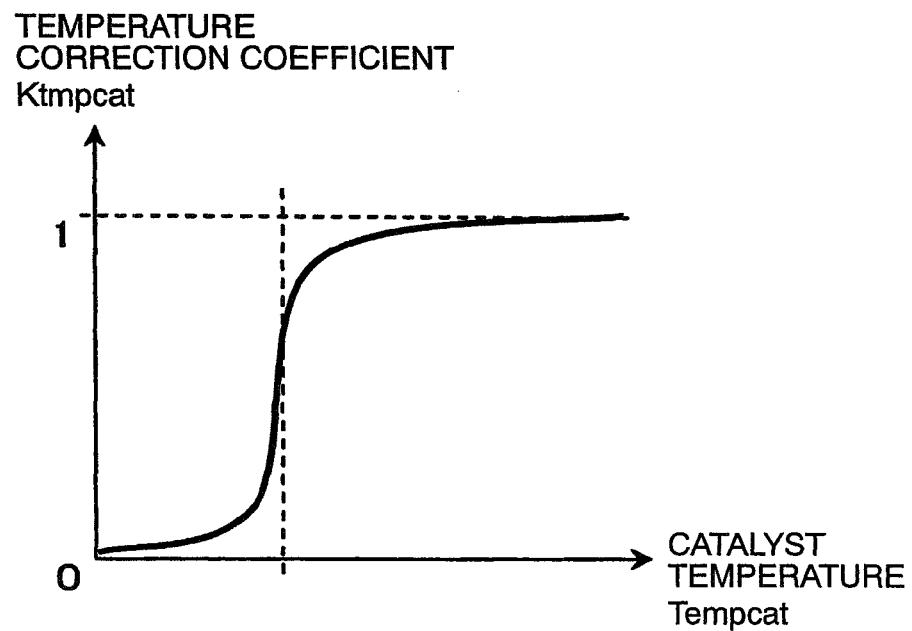
FIG. 20 is an explanatory view showing a one-dimensional map of a temperature correction coefficient set in accordance with the temperature of a catalyst by means of the first embodiment of the present invention.
Figure 21:
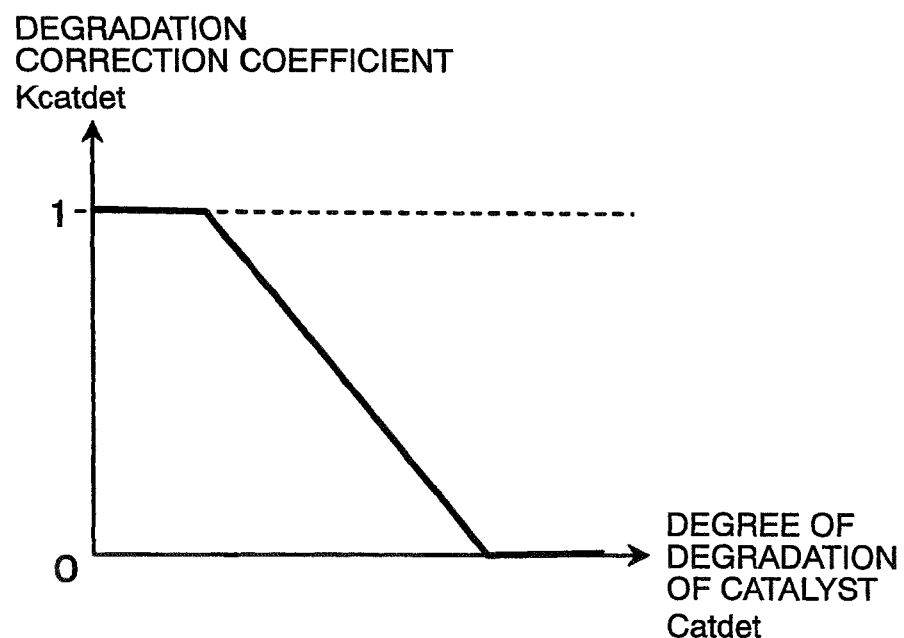
FIG. 21 is an explanatory view showing a one-dimensional map of a degradation correction coefficient set in accordance with the degree of degradation of the catalyst by means of the first embodiment of the present invention.

The temperature correction coefficient Ktmpcat is set to a value that becomes smaller in accordance with the lowering temperature of the catalyst Tmpcat so as to decrease the maximum amount of oxygen occlusion OSCmax, as shown in FIG. 20. In addition, the oxygen occlusion function of the catalyst 12 has a characteristic of being rapidly activated in a temperature range of about 300 degrees C. through 400 degrees C., so the temperature correction coefficient Ktmpcat is set in consideration of the temperature characteristic of the catalyst 12.

Subsequently, the degree of degradation of the catalyst Catdet is calculated adaptively with respect to the output value V2 of the downstream oxygen sensor 15 (step 1604). The greater the degradation of the catalyst 12, the larger the degree of degradation of the catalyst Catdet becomes.

Thereafter, the degradation correction coefficient Kcatdet of the maximum amount of oxygen occlusion is calculated through a one-dimensional map (see FIG. 21) set in accordance with the degree of degradation of the catalyst Catdet (step 1605). The degradation correction coefficient Kcatdet is set to a value that becomes smaller in accordance with the increasing degree of catalyst degradation Catdet so as to decrease the maximum amount of oxygen occlusion OSCmax, as shown in FIG. 21.

Finally, the initial value OSCmax0 of the maximum amount of oxygen occlusion is corrected based on the temperature correction coefficient Ktmpcat and the degradation correction coefficient Kcatdet, and the maximum amount of oxygen occlusion OSCmax is calculated, as shown in the following expression (7) (step 1606).

$$OSCmax = OSCmax0 \times Ktmpcat \times Kcatdet \quad (7)$$

According to expression (7) above, it is possible to calculate the maximum amount of oxygen occlusion OSCmax that changes in accordance with not only changes in various operating conditions but also changes in various other conditions such as a change in the temperature of the catalyst Tmpcat according to the time of transition and the process of activation of the catalyst 12, the degradation of the catalyst 12, etc., as a result of which the control precision of the oscillation processing of the amount of oxygen occlusion of the catalyst 12 can be further improved.

Next, further specific reference will be made to the degree of degradation of the catalyst calculation processing (step 1604) in FIG. 19 according to the maximum oxygen occlusion amount calculation section 204 while referring to a flow chart of FIG. 22. A calculation processing routine of FIG. 22 is executed at every predetermined time (e.g., 5 msec).

Figure 22:
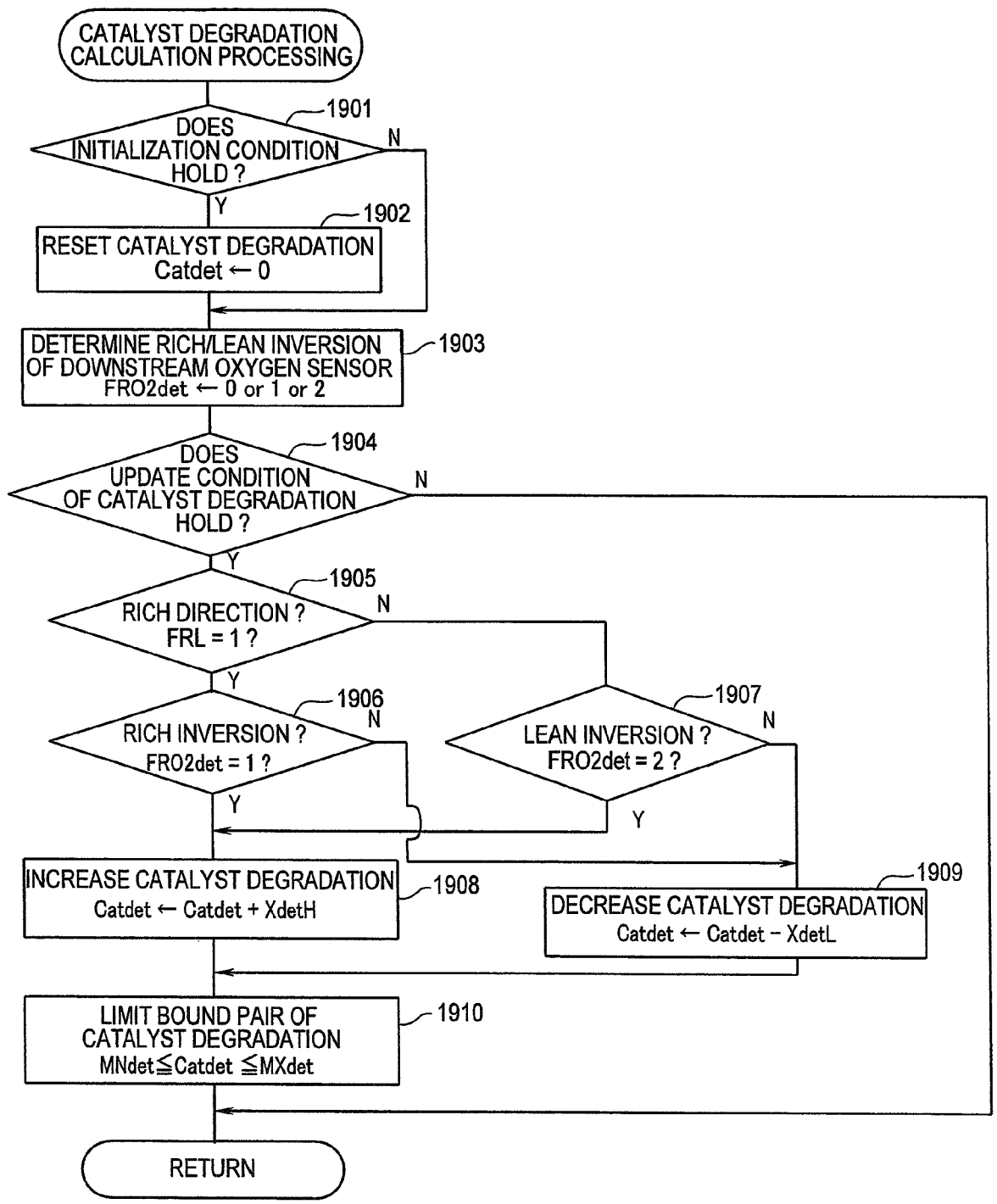
FIG. 22 is a flow chart showing the calculation processing operation of the maximum oxygen occlusion calculation section in FIG. 2 for calculating the degree of degradation of the catalyst.

In FIG. 22, first of all, it is determined whether an initialization condition for the degree of catalyst degradation Catdet holds (step 1901), and when it is determined that the initialization condition holds (that is, YES), the degree of degradation of the catalyst Catdet is reset to "0" (non-degradation state) (step 1902), and the control process proceeds to step 1903. On the other hand, when it is determined in step 1901 that the initialization condition does not hold (that is, NO), the control process proceeds to step 1903.

The degree of degradation of the catalyst Catdet is recorded in and held by the backup RAM 106 (or EEPROM, etc.) in the control circuit 10 so as not to be reset when the engine proper 1 is stopped, but the initialization condition holds at the time when the power supply is first turned on after removal of the battery or after initialization of the EEPROM.

In addition, when the calculation of the degree of degradation of the catalyst Catdet becomes impossible (i.e., when a sensor fault of the downstream oxygen sensor 15 is detected, etc.), or when a recalculation condition of the degree of degradation of the catalyst Catdet holds, or when a reset request is made through communication from external equipment (not shown), a determination is made in step 1901 that the initialization condition holds.

Subsequently, a lean/rich inversion of the output value V2 of the downstream oxygen sensor 15 is determined (step 1903). The determination processing in step 1903 is performed, as in the determination processing in step 701 in FIG. 6 according to the average air fuel ratio oscillation section 203. That is, when the output value V2 of the downstream oxygen sensor 15 is inverted from lean to rich, the inversion flag FRO2det of the downstream oxygen sensor 15 is set to "1", whereas when it is inverted from rich to lean, the inversion flag FRO2det is set to "2". In addition, when no inversion is made, the inversion flag FRO2det is set to "0". Here, note that the set width of hysteresis or the set width of the dead zone, as shown in FIG. 8, and the level of the gradually changing processing of the output value V2 may be set to be different from those in the case of the average air fuel ratio oscillation section 203.

Then, following the step 1903, it is determined whether an update condition for the degree of catalyst degradation Catdet holds (step 1904), and when the update condition for the degree of degradation of the catalyst Catdet holds (that is, YES), the control process proceeds to processing from step 1905 onward, whereas when it is determined in step 1904 that the update condition does not hold (that is, NO), the processing routine of FIG. 22 is terminated without executing steps 1905 through 1910.

In this connection, note that the update condition for the degree of degradation of the catalyst Catdet holds under a condition in which it can be determined that the catalyst 12 is sufficiently activated, as well as under a condition in which the oscillation processing of the average air fuel ratio is being executed. In addition, the active state of the catalyst 12 may be determined directly from the temperature of the catalyst Tmpcat, or it may also be determined based on an elapsed time after the starting of the engine proper 1, an accumulated amount of intake air after engine starting, or a predetermined engine operating condition such as the engine rotational speed Ne, the engine load, etc. Further, the active state of the catalyst 12 may be determined based on whether the frequency of oscillations PTN of the oscillation processing of the average air fuel ratio has reached a predetermined number of times or more.

Subsequently, in steps 1905 through 1909, it is detected, based on the rich/lean inversion of the output value V2 of the downstream oxygen sensor 15, whether the amount of oxygen occlusion of the catalyst 12 has exceeded beyond the maximum amount of oxygen occlusion OSCmax or the minimum amount of oxygen occlusion (=0), and gradually decreasing processing of the degree of catalyst degradation Catdet.

First of all, it is determined, depending upon whether the oscillation direction flag FRL is "1", whether the air fuel ratio is oscillating in the rich direction (step 190), and when it is determined that the air fuel ratio is oscillating in the rich direction (FRL=1) (that is, YES), the control process proceeds to step 1906, whereas when it is determined in step 1905 that the air fuel ratio is oscillating in the lean direction (FRL=2) (that is, NO), the control process proceeds to step 1907.

In step 1906, which is executed when it is determined as FRL=1 in step 1905 (that is, YES), a determination as to whether a rich inversion has been made (i.e., the output value V2 of the downstream oxygen sensor 15 has been inverted from lean to rich) is made, depending upon whether the inversion flag FRO2det of the downstream oxygen sensor 15 is "1".

When it is determined in step 1906 that a rich inversion has been made (FRO2det=1) (that is, YES), the degree of degradation of the catalyst Catdet is updated through calculation by being increased by a predetermined set value XdetH (step 1908), as shown in the following expression (8), and the control process proceeds to step 1910.

$$Catdet=Catdet+XdetH \tag{8}$$

On the other hand, in step 1907, which is executed when it is determined as FRL=2 in step 1905 (that is, NO), a determination as to whether a lean inversion has been made (i.e., the output value V2 of the downstream oxygen sensor 15 has been inverted from rich to lean) is made, depending upon whether the inversion flag FRO2det of the downstream oxygen sensor 15 is "2".

When it is determined in step 1907 as a lean inversion (FRO2det=2) (that is, YES), the control process proceeds to step 1908, where the degree of degradation of the catalyst Catdet is increased by the predetermined set value XdetH, as shown in the above expression (8).

On the other hand, when it is determined in step 1906 that a lean inversion has been made (FRO2det=2) (that is, NO), or when it is determined in step 1907 that a rich inversion has been made (FRO2det=1) (that is, NO), the degree of degradation of the catalyst Catdet is updated through calculation by being decreased by a predetermined set value XdetL (step 1909), as shown in the following expression (9), and the control process proceeds to step 1910.

$$Catdet=Catdet-XdetL \tag{9}$$

Here, note that the individual predetermined set values XdetH and XdetL in expressions (8) and (9) are set in consideration of the oscillation period of the average air fuel ratio and at the same time in accordance with the amount of intake air Qa or the engine operating conditions so as to be in inverse proportion to the amount of intake air Qa.

Finally, in step 1910, the degree of degradation of the catalyst Catdet is subjected to the bound pair limiting processing by using the following expression (10) so as to become a value within a range between an upper limit value MXdet and a lower limit value MNdet, and the processing routine of FIG. 22 is terminated.

$$MNdet \leq Catdet \leq MXdet \quad (10)$$

Next, reference will be made to the processing operation of the catalyst degradation diagnosis section 205 while referring to FIG. 23 and FIG. 24.

Figure 23:
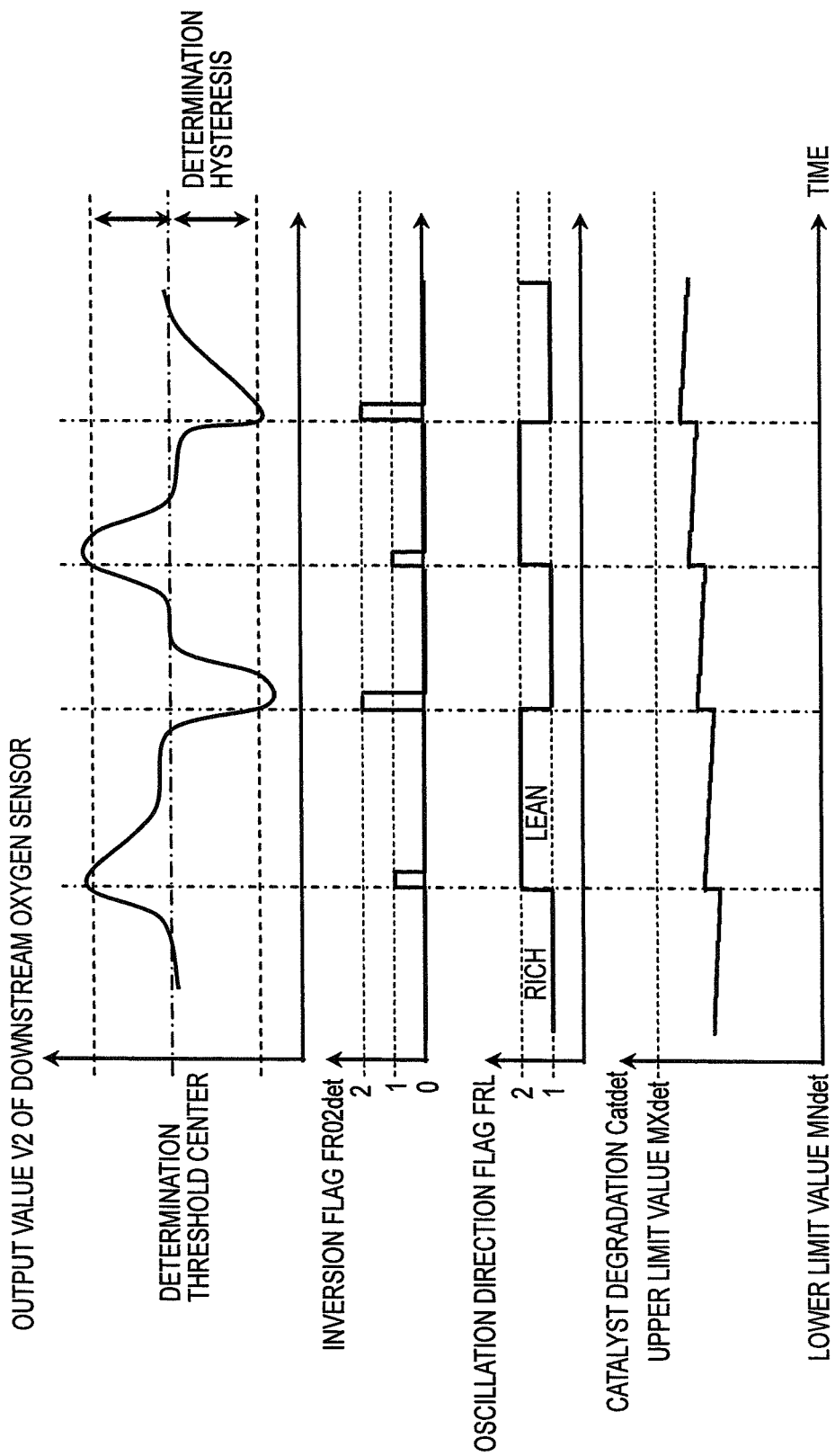
FIG. 23 is a timing chart for supplementarily explaining the operation of a catalyst degradation diagnosis section in FIG. 2.
Figure 24:
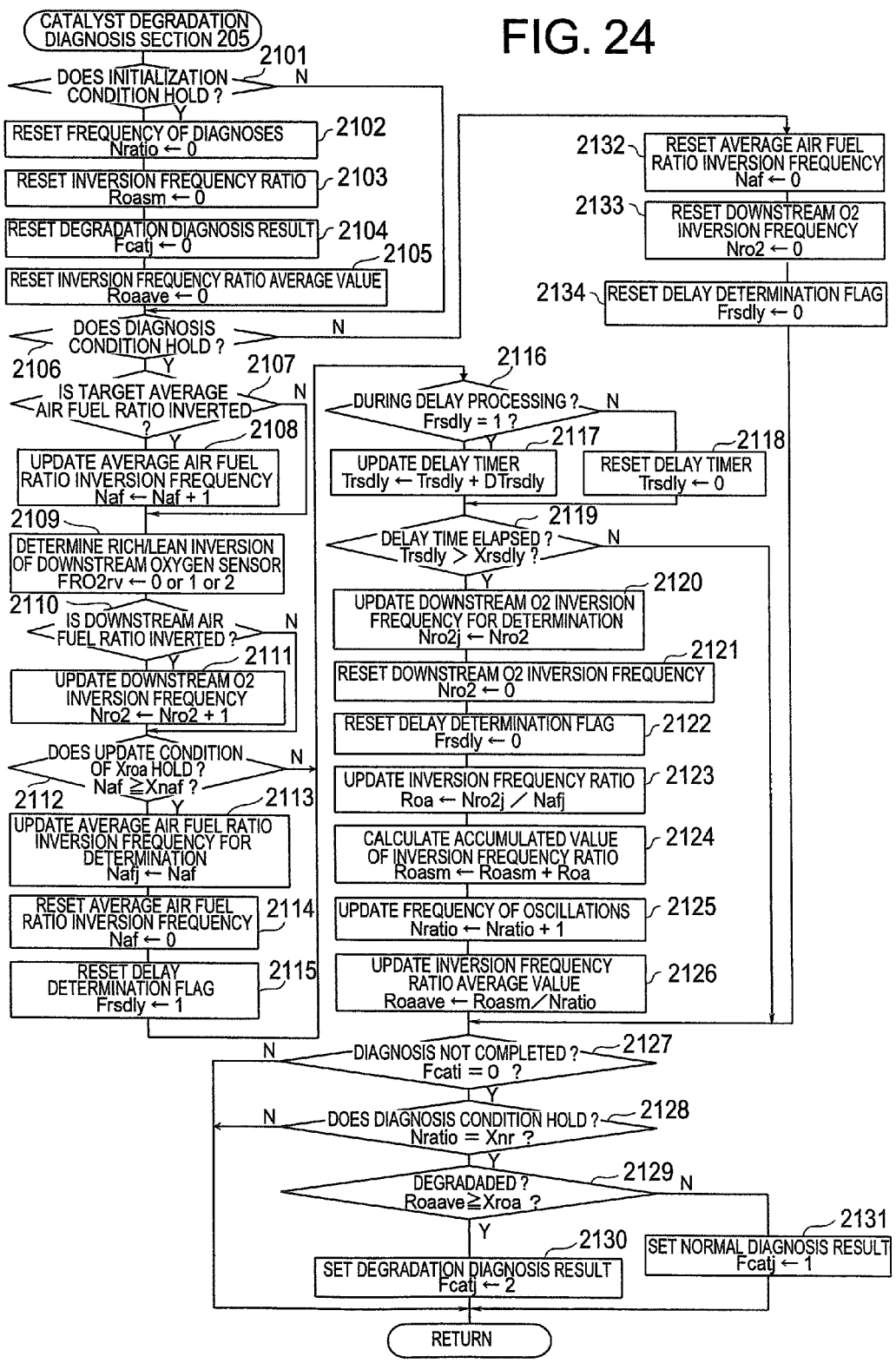
FIG. 24 is a flow chart showing the calculation processing operation of the catalyst degradation diagnosis section in FIG. 2.

FIG. 23 is a timing chart that shows the behavior of the catalyst 12 at the time of degradation thereof, and FIG. 24 is a flow chart that shows the processing operation of the catalyst degradation diagnosis section 203. A calculation processing routine of FIG. 24 is executed at every predetermined time (e.g., 5 msec).

In FIG. 23, the maximum amount of oxygen occlusion OSCmax is decreased due to the degradation of the catalyst 12, and when the oscillation width of the amount of oxygen occlusion due to the oscillation processing of the average air fuel ratio comes to go off from the decreased maximum amount of oxygen occlusion OSCmax, the rich/lean inversion of the output value V2 of the downstream oxygen sensor 15 increases, thereby increasing the degree of degradation of the catalyst Catdet.

In FIG. 24, first of all, it is determined whether the initialization condition of degradation diagnosis of the catalyst 12 holds (step 2101), and when it is determined that the initialization condition holds (that is, YES), the frequency of diagnoses Nratio is reset to "0" (step 2102), and the accumulated or integrated value Roasm of an inversion frequency ratio Roa is reset to "0" (step 2103). Also, the result of degradation diagnosis Fcatj is reset to "0" (not yet determined) (step 2104), and an inversion frequency ratio average value Roaave is reset to "0" (step 2105). Subsequently, it is determined whether the degradation diagnosis condition holds (step 2106).

On the other hand, when it is determined in step 2101 that the initialization condition does not hold (that is, NO), the control process proceeds to step 2106 without executing steps 2102 through 2105.

Here, note that the information of catalyst degradation diagnosis section 205 (the degree of degradation of the catalyst Catdet, etc.) is recorded in and held by the backup RAM 106 (or EEPROM, etc.) so as not to be reset when the engine proper 1 is stopped, but the initialization condition in step 2101 holds at the time when the power supply is first turned on after removal of the battery or after initialization of the EEPROM.

In addition, when the calculation of the degree of degradation of the catalyst Catdet becomes impossible (i.e., when a sensor fault of the downstream oxygen sensor 15 is detected, etc.), or when a recalculation condition of the degree of degradation of the catalyst Catdet holds, or when a reset request is made through communication from external equipment (not shown), a determination is made in step 2101 that the initialization condition holds.

When it is determined in step 2106 that the degradation diagnosis condition holds (that is, YES), it is subsequently determined whether the target average air fuel ratio has been inverted from rich to lean (step 2107), and when it is determined in step 2107 that the rich to lean inversion has been made (that is, YES), the frequency of inversions of the average air fuel ratio Naf is incremented by "1" (step 2108), and the control process proceeds to step 2109.

On the other hand, when it is determined in step 2107 that the target average air fuel ratio has not been inverted (that is, NO), the control process proceeds to step 2108 without executing step 2109.

In this regard, note that the inversion determination of the target average air fuel ratio in step 2107 is made depending upon whether the oscillation direction flag FRL has been changed into "1" (rich) or "2" (lean). In other words, the oscillation direction flag FRL at the last time arithmetic calculation is stored and compared with the oscillation direction flag FRL at the current arithmetic calculation, thereby making it possible to determine the inversion of the target average air fuel ratio.

On the other hand, when it is determined in step 2106 that the degradation diagnosis condition does not hold (that is, NO), the average air fuel ratio inversion frequency Naf is reset to "0" (step 2132), and a downstream O2 inversion frequency Nro2 is reset to "0" (step 2133). Then, a delay determination flag Frsdly is reset to "0" (i.e., indicates non-execution of delay processing to be described later) (step 2134), and the control process proceeds to step 2127 (to be described later).

Here, note that the degradation diagnosis condition in step 2106 holds under a condition in which it can be determined that the catalyst 12 is sufficiently activated, as well as under a condition in which the oscillation processing of the average air fuel ratio is being executed, as in the case of the above-mentioned update condition for the degree of catalyst degradation Catdet (step 1904 in FIG. 22). In addition, the active state of the catalyst 12 may be determined directly from the temperature of the catalyst Tmpcat, or it may also be determined based on an elapsed time after the starting of the engine proper 1, an accumulated amount of intake air after engine starting, or a predetermined engine operating condition such as the engine rotational speed Ne, the engine load, etc.

Further, the active state of the catalyst 12 may be determined based on whether the frequency of oscillations PTN of the oscillation processing of the average air fuel ratio has reached a predetermined number of times or more. With such a determination, it is possible to prevent a misdiagnosis resulting from the fact that an unstable state after the start of oscillation of the average air fuel ratio is diagnosed, so that a diagnosis can be started from a time point at which the oscillation becomes stabilized, thus making it possible to improve diagnostic accuracy.

Returning to step 2108, subsequently, the determination processing of the rich/lean inversion of the output value V2 of the downstream oxygen sensor 15 is executed (step 2109), similarly as stated above (step 701 in FIG. 6 and step 1903 in FIG. 22).

When it is determined in step 2109 that the output value V2 has been inverted from lean to rich, an inversion flag FRO2rv of the downstream oxygen sensor 15 is set to "1", whereas when it is determined in step 2109 that the output value V2 has been inverted from rich to lean, the inversion flag FRO2rv is set to "2". In addition, when no inversion is determined in step 2109, the inversion flag FRO2rv is set to "0".

In this regard, note that the set width of hysteresis or the set width of the dead zone, as shown in FIG. 8, and the level of the gradually changing processing of the output value V2 may be set to be different from those in the case of the average air fuel ratio oscillation section 203, as in the above-mentioned step 1903.

The steps 2105 through 2109 are processes in which it is detected based on the rich/lean inversion of the output value V2 of the downstream oxygen sensor 15 that the amount of oxygen occlusion of the catalyst 12 has exceeded beyond the maximum amount of oxygen occlusion OSCmax or the minimum amount of oxygen occlusion (=0), and the degree of degradation of the catalyst Catdet is increased or decreased in response to such a detection.

Then, it is determined, depending upon whether the inversion flag FRO2rv is "1" or "2", whether the output value V2 (downstream air fuel ratio) has been inverted (step 2110), and when it is determined that the output value V2 has been inverted (FRO2rv=1 or FRO2rv=2) (that is, YES), the downstream O2 inversion frequency Nro2 is incremented by "1" (step 2111).

Subsequently, depending upon whether the average air fuel ratio inversion frequency Naf is equal to or larger than an update condition threshold value Xnaf, it is determined whether an update condition of the determination reference value Xroa for degradation diagnosis holds (step 2112), and when it is determined that the update condition of the determination reference value Xroa holds (Naf≧Xnaf) (that is, YES), a determination average air fuel ratio inversion frequency Naf j is updated by setting the average air fuel ratio inversion frequency Naf as the determination average air fuel ratio inversion frequency Naf j (step 2113).

In addition, in preparation for calculation of the following determination reference value Xroa, the average air fuel ratio inversion frequency Naf is reset to "0" (step 2114), and the delay determination flag Frsdly in consideration of a time lag or delay from a change in the average air fuel ratio until the time the output value V2 changes is set to "1" (i.e., indicates during the delay processing) (step 2115), whereby depending upon whether the delay determination flag Frsdly is "1", it is determined whether delay processing is in operation (step 2116).

On the other hand, when it is determined in step 2112 that the update condition for the determination reference value Xroa does not hold (Naf<Xnaf) (that is, NO), the control process proceeds to step 2116 without executing steps 2113 through 2115.

When it is determined in step 2116 that delay processing is in operation (Frsdly=1) (that is, YES), a delay timer Trsdly is updated by being increased by a predetermined value DTrsdly, as shown in the following expression (11) (step 2117), and the control process proceeds to step 2119.

$$Trsdly = Trsdly + DTrsdly \tag{11}$$

where the predetermined value DTrsdly for timer update is set to an arithmetic calculation period 5 msec, for example.

On the other hand, when it is determined in step 2116 that delay processing is out of operation (Frsdly=0) (that is, NO), the delay timer Trsdly is reset to "0" (step 2118), and the control process proceeds to step 2119.

In step 2119, depending upon whether the delay timer Trsdly is larger than a predetermined threshold value Xrsdly, it is determined whether a delay time has elapsed, and when it is determined that the delay time has not yet elapsed (Trsdly≦Xrsdly) (that is, NO), the control process proceeds to step 2127 (to be described later).

On the other hand, when it is determined in step 2119 that the delay time has elapsed (Frsdly>Xrsdly) (that is, YES), the update condition for degradation diagnosis determination information based on the output value V2 holds, so the following update processing (steps 2120 through 2126) is executed.

Here, note that the predetermined threshold value Xrsdly is set in consideration of a time lag or delay from a change or variation in the average air fuel ratio until the time the output value V2 of the oxygen sensor 15 downstream of the catalyst 12 changes. This time delay includes a delay from a time point at which fuel is injected from a fuel injection valve 7 until a time point at which a mixture containing the injected fuel actually moves to the location of installation of the downstream oxygen sensor 15, and a delay due to the oxygen occlusion operation of the catalyst 12. In general, the total time delay is in inverse proportion to the amount of intake air Qa. Accordingly, the predetermined threshold value Xrsdly is set, for example, by a one-dimensional map corresponding to the amount of intake air Qa.

In addition, although the delay timer Trsdly (timer operation) is used for the determination of the update condition in step 2119, in place of this, without using the delay timer Trsdly, an accumulated quantity of the amount of intake air Qa for a period of time in which the delay determination flag Frsdly is set to "1" (during delay processing) is calculated, and when the accumulated quantity of the amount of intake air Qa thus obtained is larger than a predetermined quantity, a determination may be made that the update condition holds.

In the update processing of degradation diagnosis determination information following the step 2119, first of all, the downstream O2 inversion frequency Nro2 j for determination is updated by setting the downstream O2 inversion frequency Nro2 as the downstream O2 inversion frequency Nro2 j for determination (step 2120).

Moreover, in preparation for calculation of the following determination reference value Xroa, the downstream O2 inversion frequency Nro2 is reset to "0" (step 2114), and the delay determination flag Frsdly is reset to "0" (step 2122), and the delay processing is terminated.

Subsequently, the average air fuel ratio inversion frequency Naf j for determination and the corresponding downstream O2 inversion frequency Nro2 j for determination have been prepared, so an inversion frequency ratio Roa between the average air fuel ratio inversion frequency Naf j for determination and the downstream O2 inversion frequency Nro2 j for determination is updated through calculation, as shown in the following expression (12) (step 2123).

$$Roa = Nro2j/Nafj \tag{12}$$

Subsequently, to update through calculation an average value Roaave of the inversion frequency ratio Roa, first of all, the accumulated value Roasm is updated through calculation by adding the inversion frequency ratio Roa to the last accumulated value Roasm (step 2124), and after a diagnosis frequency Nratio is incremented by "1" (step 2125), the inversion frequency ratio average value Roaave is updated through calculation, as shown in the following expression (13) (step 2126).

$$Roaave = Roasm/Nratio \tag{13}$$

Then, depending upon whether the result of degradation diagnosis Fcatj is "0", it is determined whether degradation diagnosis processing has not been executed (step 2127). When it is determined that the degradation diagnosis processing has been executed (Fcatj=1 or Fcatj=2) (that is, NO), the processing routine of FIG. 24 is terminated, whereas when it is determined that the degradation diagnosis processing has not been executed (Fcatj=0) (that is, YES), it is subsequently determined, depending upon whether the diagnosis frequency Nratio coincides with the frequency of diagnosis executions Xnr, whether the diagnosis condition holds (step 2128). In addition, when it is determined that the diagnosis condition does not hold (Nratio≠Xnr) (that is, NO), the processing routine of FIG. 24 is terminated.

On the other hand, when it is determined in step 2128 that the diagnosis condition holds (Nratio=Xnr) (that is, YES), the degradation diagnosis processing of the catalyst 12 is executed, and the presence or absence of catalyst degradation is determined depending upon whether the inversion frequency ratio average value Roaave is equal to or larger than the determination reference value Xroa (step 2129).

In step 2129, when it is determined that the catalyst 12 is in a degraded state (Roaave≧Xroa) (that is, YES), the degradation diagnosis result Fcatj is set to "2" (i.e., indicates degradation) (step 2130), and the processing routine of FIG. 24 is terminated.

In step 2129, when it is determined that the catalyst 12 is in a normal state (Roaave<Xroa) (that is, NO), the degradation diagnosis result Fcatj is set to "1" (i.e., indicates normal) (step 2131), and the processing routine of FIG. 24 is terminated.

Here, note that the determination reference value Xroa is adjusted to a value with which it is possible to detect a decreased state of the maximum amount of oxygen occlusion OSCmax of the catalyst for which degradation diagnosis is necessary.

In addition, a catalyst for which degradation diagnosis is necessary can be detected in a reliable manner by setting the amount of oxygen occlusion due to the oscillation of the average air fuel ratio to a value larger than the maximum amount of oxygen occlusion OSCmax of the catalyst for which degradation diagnosis is necessary.

Further, by determining the downstream O2 inversion frequency Nro2 (the frequency of inversions of the output value V2 of the downstream oxygen sensor 15) based on a comparison thereof with the frequency of oscillations of the amount of oxygen occlusion (the oscillation frequency PTN of the oscillation processing of the average air fuel ratio), it is possible to prevent the reduction of determination accuracy resulting from the oscillation period that is changed according to the operating condition and the operating pattern of the engine proper 1.

Here, although the degradation of the catalyst is diagnosed by using the inversion frequency average value Roaave, it may be determined that the catalyst 12 is degraded, when the degree of degradation of the catalyst Catdet calculated by the maximum oxygen occlusion amount calculation section 204 indicates equal to or more than a predetermined value.

Figure 25:
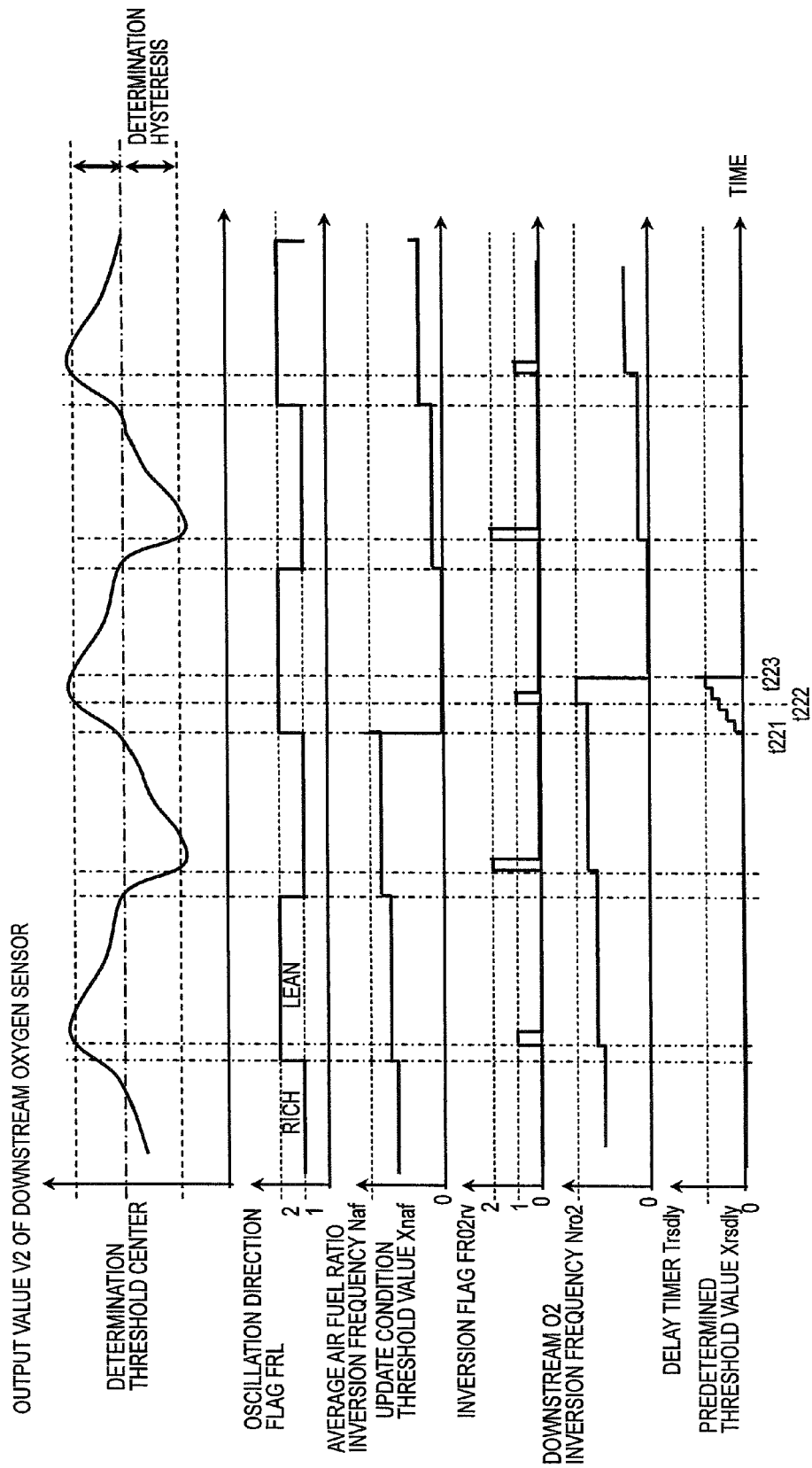
FIG. 25 is a timing chart for supplementarily explaining the operation of the catalyst degradation diagnosis section in FIG. 2.

Now, reference will be made to the behavior in the catalyst degradation diagnosis according to the first embodiment of the present invention while referring to a timing chart of FIG. 25. In FIG. 25, there are illustrated the behaviors of individual parameters when the maximum amount of oxygen occlusion OSCmax is decreased due to the degradation of the catalyst 12 to make the oscillation width of the amount of oxygen occlusion go off scale.

In FIG. 25, the reason why the average air fuel ratio is not inverted even in a state where it is determined that the output value V2 of the downstream oxygen sensor 15 has been inverted is that the hysteresis width of the catalyst degradation diagnosis section 205 is set narrower than the hysteresis width of the average air fuel ratio oscillation section 203.

First of all, when the average air fuel ratio (see the oscillation direction flag FRL) is inverted from rich to lean at time point t221, the average air fuel ratio inversion frequency Naf reaches the update condition threshold value Xnaf, whereby the delay timer Trsdly begins to increase.

Subsequently, the influence of the inversion from rich to lean at time point t221 begins to appear at about time point t222 with a time lag or delay owing to the above-mentioned travel delay of the mixture or the oxygen occlusion operation, and the output value V2 of the downstream oxygen sensor 15 is inverted to rich at time point t222.

On the other hand, the delay timer Trsdly reaches the predetermined threshold value Xrsdly at time point t223, whereby the downstream O2 inversion frequency Nro2j for determination is updated. Thus, by the provision of the delay timer Trsdly in consideration of the delay of a control system, it is possible to detect the variation of the output value V2 of the downstream oxygen sensor 15 corresponding to the oscillation of the average air fuel ratio with a high degree of precision.

Next, reference will be made to the calculation processing operation of the second air fuel ratio feedback control section 202 while referring to a flow chart of FIG. 26 and an explanatory view of FIG. 27. The processing routine of FIG. 26 illustrates a procedure to calculate the oscillation center AFCNT of the average air fuel ratio oscillation based on the output value V2, and this routine is executed at every predetermined time (e.g., 5 msec).

Figure 26:
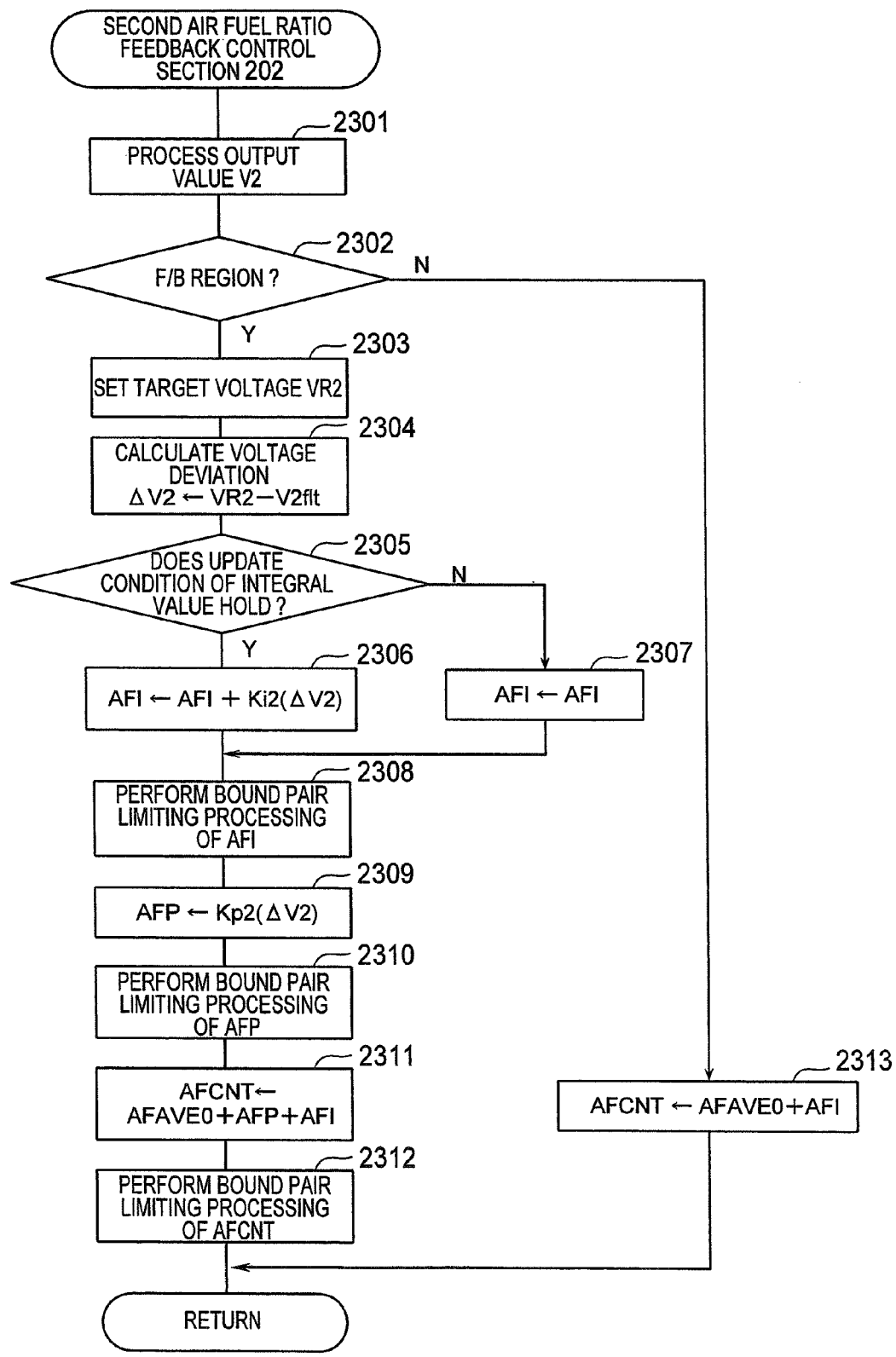
FIG. 26 is a flow chart showing a calculation processing operation of a second air fuel ratio feedback control section in FIG. 2.
Figure 27:
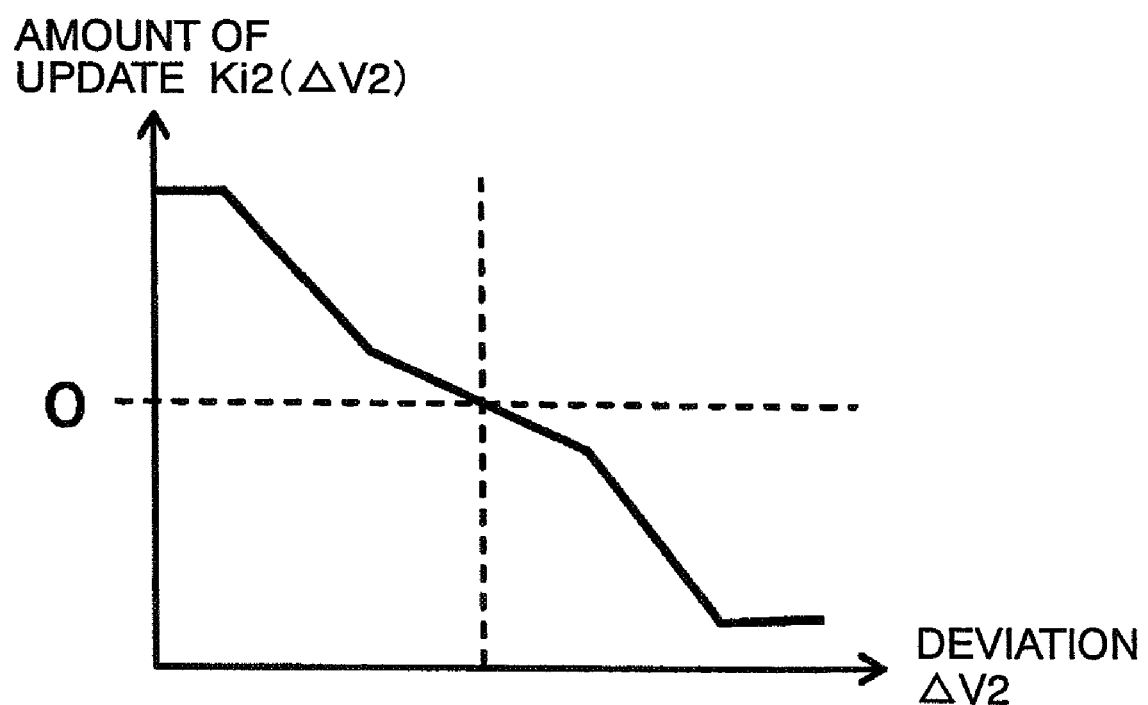
FIG. 27 is an explanatory view showing a one-dimensional map of an integral calculation operation update amount of a target average air fuel ratio set in accordance with a deviation by means of the first embodiment of the present invention.

In FIG. 26, the second air fuel ratio feedback control section 202 first reads in the output value V2 of the downstream oxygen sensor 15, and applies filter processing (or gradually changing processing such as averaging processing, etc.) to the output value V2 thus read in (step 2301), thereby making it possible to perform control based on an output value V2flt thus processed.

Subsequently, it is determined whether the output value V2flt is in a feedback region (in which a closed loop condition holds) according to the downstream oxygen sensor 15 (step 2302).

In step 2302, in case where an air fuel ratio control condition other than stoichiometric air fuel ratio control (e.g., during starting of the engine proper 1, during fuel enriching control at low cooling water temperature THW, during fuel enriching control for increasing power under a high load, during fuel leaning control for improvements in fuel consumption or mileage, during fuel leaning control after engine starting, or during fuel cut operation) holds, or in case where the downstream oxygen sensor 15 is in an inactive state or in a failed state, it is determined, in either case, that a closed loop condition does not hold, and in other cases, it is determined that a closed loop condition holds.

In this regard, note that the active/inactive state of the downstream oxygen sensor 15 can be determined depending upon whether a predetermined time has elapsed after engine starting or whether the level of the output value V2 of the downstream oxygen sensor 15 has once crossed a predetermined voltage.

In step 2302, when it is determined that the closed loop condition does not hold (that is, NO), the oscillation center AFCNT of the average air fuel ratio oscillation is obtained by using an initial value AFCNT0 and an integral calculated value AFI (hereinafter simply referred to as an "integral value") of the oscillation center (central air fuel ratio) of the average air fuel ratio oscillation, as shown in the following expression (14) (step 2314), and the processing routine of FIG. 26 is terminated.

$$AFCNT = AFCNT0 + AFI \quad (14)$$

In expression (14) above, the initial value AFCNT0 is set to "14.53", for example. In addition, the integral value AFI, being a value immediately before the closed loop control is terminated, is held in the backup RAM 106 in the control circuit 10. The initial value AFCNT0 and the integral value AFI are the set values which are held for each operating condition of the engine proper 1 (e.g., each operating range divided by the engine rotational speed Ne, the load and the cooling water temperature THW), and are respectively held in the backup RAM 106.

On the other hand, when it is determined in step 2302 that the closed loop condition holds (that is, YES), the target value VR2 of the output value V2 of the downstream oxygen sensor 15 is set (step 2303).

The target value VR2 may be set to a predetermined output value (e.g., about 0.45 V) of the downstream oxygen sensor 15 corresponding to a purification window of the catalyst 12 in the vicinity of the stoichiometric air fuel ratio, or may be set to a high voltage (e.g., about 0.75 V) at which the NOx purification rate of the catalyst 12 becomes high or to a low voltage (e.g., about 0.2 V) at which the CO, HC purification rate of the catalyst 12 becomes high. Further, the target value VR2 may be variably changed in accordance with the engine operating conditions, etc.

Here, note that when the target value VR2 is changed in accordance with the engine operating conditions, gradually changing processing (e.g., first order time delay filter processing) may be applied to the target value VR2 so as to alleviate the air fuel ratio variation due to a stepwise change upon the changing of the target value VR2.

Then, following the step 2303, a deviation $\Delta V2(=VR2-V2flt)$ between the target value VR2 of the output value V2 and the output value V2flt after filter processing is calculated (step 2304), and PI control processing (proportional calculation and integral calculation) corresponding to the deviation $\Delta V2$ is carried out so as to set the oscillation center AFCNT to make the deviation $\Delta V2$ to "0" (steps 2305 through 2311).

For example, when the output value V2 of the downstream oxygen sensor 15 is smaller than the target value VR2 and in a lean side, the upstream target average air fuel ratio AFAVEobj is set to a rich side, so that the output value V2 of the downstream oxygen sensor 15 is thereby restored to the target value VR2.

The upstream target average air fuel ratio AFAVEobj of the catalyst 12 is calculated by a general PI controller, as shown in the following expression (15), by using an initial value AFAVE0 of the target average air fuel ratio, an amount of integrated operation $\Sigma\{Ki2(\Delta V2)\}$ based on an integral gain Ki2, and an amount of proportional operation $Kp2(\Delta V2)$ based on a proportional gain Kp2.

$$AFAVEobj=AFAVE0+\Sigma\{Ki2(\Delta V2)\}+Kp2(\Delta V2) \quad (15)$$

In expression (15), the initial value AFAVE0 is a value which is set for each operating condition to correspond to the stoichiometric air fuel ratio, and is set to "14.53", for example.

In addition, the integral calculation based on the integral gain Ki2 generates an output while integrating the deviation $\Delta V2$, and operates relatively slowly, so it has an advantageous effect to eliminate a regular deviation of the output value V2 of the downstream oxygen sensor 15 resulting from the characteristic variation of the upstream oxygen sensor 13.

The larger is the integral gain Ki2 set, the larger becomes the absolute value of the integrated amount of operation $\Sigma\{Ki2(\Delta V2)\}$, so the control effect for elimination of the deviation becomes larger, but if set to a too large value, a phase lag or delay becomes larger, and the control system becomes unstable, generating hunting. Thus, an appropriate gain setting is needed.

On the other hand, the proportional calculation based on the proportional gain Kp2 generates an output proportional to the deviation $\Delta V2$ and exhibits a fast response, thus providing an advantageous effect that the deviation can be restored in a quick manner. The larger is the proportional gain Kp2 set, the larger becomes the absolute value of the amount of proportional operation $Kp2(\Delta V2)$ (e.g., "$Kp2 \cdot \Delta V2$", and the speed of restoration becomes faster, but if set to a too large value, the control system becomes unstable, causing hunting. Thus, an appropriate gain setting is needed.

In the above-mentioned PI control processing, first of all, it is determined whether an update condition of the integral value AFI holds (step 2305). The update condition of the integral value AFI holds in cases other than during a transient operation and a predetermined period after a transient operation.

For example, during the transient operation, the upstream A/F is disturbed to a great extent and the downstream A/F is also disturbed similarly, so if integral calculation is carried out in such a state, a wrong or incorrect value results. In particular, the integral calculation operates in a relatively slow manner, so the wrong or incorrect value is held for a while after the transient operation, as a result of which the control performance is deteriorated.

Accordingly, the update of the integral calculation is temporarily stopped at the transient operation, and the integral value AFI is retained, thereby preventing incorrect integral calculation as stated above. In addition, even after the transient operation, an influence remains for a while due to the delay of an object to be controlled, so the update of the integral value AFI is inhibited in a predetermined period of time after the transient operation. In particular, the delay of the catalyst 12 is large, so the predetermined period of time after the transient operation may be set as a period from the end of the transient operation until the amount of intake air after the transient operation reaches a predetermined value. This is because the speed with which the state of the catalyst 12 is restored from the influence of the transient operation depends on the oxygen occlusion operation of the catalyst 12, and is proportional to the amount of intake air Qa.

In this regard, note that the transient operation includes sudden acceleration or deceleration, fuel cutting operation, fuel enriching control, fuel leaning control, stoppage of the control according to the second air fuel ratio feedback control section 202, stoppage of the control according to the first air fuel ratio feedback control section 201, sudden change of the introduction of an evaporated gas, etc. A sudden acceleration or deceleration is determined, such as when an amount of change per unit time of the throttle opening indicates a predetermined value or more, or when an amount of change per unit time of the amount of intake air Qa indicates a predetermined value or more. Also, a sudden change of the introduction of evaporated gas is determined, such as when an amount of change per unit time of the opening of a valve through which the evaporated gas is introduced indicates a predetermined value or more.

In step 2305, when it is determined that an update condition for the integral value AFI holds (that is, YES), the integral value AFI is updated through calculation by adding an amount of update $Ki2(\Delta V2)$ based on the integral gain Ki2 to the last integral value AFI (step 2306), and the control process proceeds to step 2308.

The integral value AFI for each operating condition is held in the backup RAM 106, as previously stated. The amount of update $Ki2(\Delta V2)$ may be simply set as "$Ki2 \cdot \Delta V2$", or may be variably set to a value corresponding to the deviation $\Delta V2$ (so-called variable gain setting) by using a one-dimensional map, as shown in FIG. 27.

In addition, the characteristic variation of the upstream oxygen sensor 13 compensated for by the integral value AFI changes in accordance with an operating condition such as an exhaust gas temperature, an exhaust gas pressure, or the like, so the integral value AFI is held in the backup RAM 106 which is set by update whenever the operating condition changes, so that it is switched for each operating condition.

Also, the integral value AFI is held in the backup RAM 106, and hence is reset upon each stopping or restart of the engine proper 1, thus making it possible to avoid reduction in control performance.

On the other hand, when it is determined in step 2305 that the update condition of the integral value AFI has not held (that is, NO), the last integral value AFI is set as it is, and the control process proceeds to step 2308 without updating the integral value AFI (step 1107).

In step 2308, bound pair limiting processing of the integral value AFI is performed so as to satisfy the following expression (16) by using a minimum value AFImin and a maximum value AFImax of the integral value AFI.

$$\text{AFImin} < \text{AFI} < \text{AFImax} \tag{16}$$

The minimum value AFImin and the maximum value AFImax are set to appropriate limit values, respectively, that can compensate for the width or range of the characteristic variation of the upstream oxygen sensor 13 (this can be grasped beforehand). As a result, an excessively large quantity of air fuel ratio operation can be avoided.

Subsequently, proportional calculation processing is performed so that the amount of proportional operation Kp2 ($\Delta$V2) is set as a proportional calculation value AFP (hereinafter referred to as a "proportional value") (step 2309). The proportional value Kp2($\Delta$V2) may be simply set as "Kp2·$\Delta$V2", or may be variably set to a value corresponding to the deviation $\Delta$V2 (so-called variable gain setting) by using a one-dimensional map, as shown in FIG. 27, similar to the amount of update Ki2($\Delta$V2) of the integral value AFI.

In addition, a set change may be done as for the integral gain Ki2 and the proportional gain Kp2 may be changed in their settings in accordance with the presence or absence of the oscillation processing of the average air fuel ratio by means of the average air fuel ratio oscillation section 203 or in accordance with the width of the oscillation of the average air fuel ratio. In this case, when the variation of the output value V2 of the downstream oxygen sensor 15 is increased by the average air fuel ratio oscillation section 203, the average air fuel ratio is operated or adjusted so as to suppress the variation of the output value V2 under the control of the second air fuel ratio feedback control section 202. As a result, the average air fuel ratio oscillation section 203 and the second air fuel ratio the control section 202 mutually influence each other. In other words, the integral gain Ki2 and the proportional gain Kp2 are changed during the oscillation processing of the average air fuel ratio, and are appropriately set in consideration of the mutual influence.

Moreover, the integral gain Ki2 and the proportional gain Kp2 may be changed in their settings in accordance with the maximum amount of oxygen occlusion OSCmax, the temperature of the catalyst Tmpcat and the degree of degradation of the catalyst Catdet calculated by the maximum oxygen occlusion amount calculation section 204, or the result of diagnosis of the presence or absence of degradation by the catalyst degradation diagnosis section 205. In this case, an appropriate gain corresponding to a change in the maximum amount of oxygen occlusion OSCmax of the catalyst 12 can be set by the changes of the integral gain Ki2 and the proportional gain Kp2.

Further, in a predetermined period of time after transient operation under a transient operation condition (i.e., the update condition of the integral value AFI does not hold), the absolute value of the proportional gain Kp2 is set to a large value, whereby the restoration speed of the purification state of the catalyst 12, having been deteriorated by external disturbances, can be increased. On the other hand, after a predetermined time has elapsed after the transient operation, the absolute value of the proportional gain Kp2 is set smaller, whereby it is possible to avoid deterioration in driveability resulting from an excessively large amount of operation of the target air fuel ratio A/Fo.

The predetermined time after the transient operation in the proportional calculation may be controlled to a period of time until the accumulated amount of air after the transient operation reaches a predetermined value, similar to the case of the integral calculation. This is because the speed with which the state of the catalyst 12 is restored from the influence of the transient operation depends on the oxygen occlusion operation of the catalyst 12, and is proportional to the amount of intake air Qa.

Accordingly, in the predetermined period of time after the transient operation, by setting the absolute value of the proportional gain Kp2 to the large value, it is possible to restore the deterioration of the purification state of the catalyst 12 due to the transient operation in a quick manner, and to avoid the deterioration in driveability during normal operation.

Then, following the step 2309, in order to prevent an excessive operation of the air fuel ratio, bound pair limiting processing of the proportional value AFP is performed so as to satisfy the following expression (17) by using a minimum value AFPmin and a maximum value AFPmax of the proportional value AFP.

$$\text{AFPmin} < \text{AFP} < \text{AFPmax} \tag{17}$$

Subsequently, the oscillation center AFCNT is calculated according to the following expression (18) by adding the integral value AFI obtained in steps 2306 through 2308 and the proportional value AFP obtained in steps 2309, 2310 to the initial value AFAVE0 (step 2311).

$$\text{AFCNT} = \text{AFAVE0} + \text{AFP} + \text{AFI} \tag{18}$$

The oscillation center AFCNT comprising a total sum of the PI (proportional and integral) calculation values as shown in expression (18) above corresponds to the above-mentioned expression (15) by which the upstream target average air fuel ratio AFAVEobj of the catalyst 12 is obtained.

Finally, to avoid an excessively large quantity of operation of the air fuel ratio, the bound pair limiting processing of the oscillation center AFCNT (the target average air fuel ratio AFAVEobj) is carried out so as to satisfy the following expression (19) by using a minimum value AFCNTmin and a maximum value AFCNTmax of the oscillation center AFCNT (corresponding to the target average air fuel ratio AFAVEobj) (step 2312), and the processing routine of FIG. 26 is terminated.

$$\text{AFCNTmin} < \text{AFCNTobj} < \text{AFCNTmax} \tag{19}$$

As described above, in one aspect, the air fuel ratio control apparatus for an internal combustion engine according to the first embodiment of the present invention is provided with the upstream oxygen sensor 13 that is arranged at a location upstream of the catalyst 12 for detecting the air fuel ratio in an upstream exhaust gas, a first air fuel ratio feedback control section 201 that adjusts the air fuel ratio of a mixture supplied to the engine proper 1 in accordance with the output value V1 of the upstream oxygen sensor 13 and the control constants thereby to make the air fuel ratio oscillate in the rich and lean directions in a periodic manner, the downstream air fuel ratio sensor 15 that is arranged at a location downstream of the catalyst 12 for detecting an air fuel ratio in the exhaust gas downstream of the catalyst 12, an average air fuel ratio oscillation section that operates the control constants based on the amount of oxygen occlusion OSC of the catalyst 12 so that the average air fuel ratio obtained by averaging the periodically oscillating air fuel ratio is caused to oscillate in the rich and lean directions, and the catalyst degradation diagnosis section 205, wherein the catalyst degradation diagnosis section 205 calculates the correlation between the oscillation of the average air fuel ratio and the output value V2 of the downstream oxygen sensor 15, and diagnoses the degradation of the catalyst 12 based on the correlation thus calculated.

Thus, by making the average air fuel ratio of the air fuel ratio oscillation of the upstream A/F oscillate in the rich and lean directions in a periodic manner, and by performing degradation diagnosis based on the correlation between the variation of the downstream air fuel ratio detected by the downstream oxygen sensor 15 and the variation of the average air fuel ratio, the degradation of the catalyst can be diagnosed based on the average air fuel ratio oscillation which is in correlation to the oscillation of the amount of oxygen occlusion OSC that becomes a cause to generate the variation of the downstream air fuel ratio, as a result of which accuracy in the diagnosis of the catalyst degradation can be improved.

In addition, the catalyst degradation diagnosis section 205 calculates a first inversion period with which the average air fuel ratio is inverted to the rich direction and to the lean direction, and a second inversion period with which the output value V2 of the downstream oxygen sensor 15 is inverted to the rich direction and to the lean direction with a predetermined determination threshold being taken as a reference, and the catalyst degradation diagnosis section 205 calculates an inversion period ratio from the ratio of the first inversion period and the second inversion period, and diagnoses the degradation of the catalyst 12 based on the inversion period ratio thus calculated.

Thus, by determining the frequency of inversions of the output value V2 of the downstream oxygen sensor 15 based on a comparison thereof with the frequency of oscillations PTN of the amount of oxygen occlusion OSC, it is possible to avoid reduction in the determination accuracy of the degradation diagnosis resulting from the oscillation period that is changed according to the operating condition and the operating pattern of the engine proper 1. Here, note that the determination reference value Xroa for degradation diagnosis is adjusted to a value with which it is possible to detect a decreased state of the maximum amount of oxygen occlusion OSCmax of the catalyst for which degradation diagnosis is necessary. In addition, the catalyst for which degradation diagnosis is necessary can be detected in a reliable manner by setting the amount of oxygen occlusion due to the oscillation of the average air fuel ratio to a value larger than the maximum amount of oxygen occlusion OSCmax of the catalyst for which degradation diagnosis is necessary.

Also, the catalyst degradation diagnosis section 205 calculates a first oscillation width based on the oscillation width DAF in the rich and lean directions of the average air fuel ratio, and a second oscillation width based on the oscillation width of the output value V2 of the downstream oxygen sensor 15, and the catalyst degradation diagnosis section 205 also calculates an oscillation width ratio from the ratio of the first oscillation width and the second oscillation width, and diagnoses the degradation of the catalyst 12 based on the oscillation width ratio thus calculated.

Thus, the degradation of the catalyst 12 can be diagnosed based on the oscillation width ratio in place of the degradation diagnosis based on the inversion frequency average value Roaave. That is, the oscillation width of the target air fuel ratio A/Fo within each period is calculated from a difference between a maximum value and a minimum value thereof at each inversion of the target average air fuel ratio AFAVEobj, and the oscillation width of the target air fuel ratio A/Fo within each period for which a corresponding determination delay is set is calculated from a difference between a maximum value and a minimum value thereof. An oscillation width ratio between the oscillation width of the target air fuel ratio A/Fo within each period and the oscillation width of the target air fuel ratio A/Fo within each period is calculated, and when the oscillation width ratio thus calculated is more than or equal to a predetermined value, it is determined that the catalyst 12 has been degraded. In other words, when the oscillation width $\Delta OSC$ of the amount of oxygen occlusion comes to go off from the maximum amount of oxygen occlusion OSCmax, the disturbance or fluctuation of the output value V2 of the downstream oxygen sensor 15 becomes large to increase the oscillation width $\Delta OSC$, so the degradation of the catalyst 12 can be diagnosed based on the oscillation width ratio.

Moreover, the average air fuel ratio oscillation section 203 sets the control constants in accordance with the target average air fuel ratio AFAVEobj for the average air fuel ratio, so that the target average air fuel ratio AFAVEobj is caused to oscillate in the rich and lean directions in a periodic manner. That is, the control constants (the individual skip amounts of RSR, RSL, the individual integral constants KIR, KIL, the individual delay times $\tau DR$, $\tau DL$ and the comparison voltage VR1) are respectively operated according to the target average air fuel ratio AFAVEobj. Here, the individual set values are set beforehand based on theoretical calculations or experimental measurements in such a manner that the actual average air fuel ratio upstream of the catalyst 12 coincides with the target average air fuel ratio AFAVEobj which is an input value. In addition, the actual average air fuel ratio is made to coincide with the target average air fuel ratio AFAVEobj irrespective of the engine operating conditions by changing the set values of the control constants depending on the engine operating conditions.

In another aspect, the air fuel ratio control apparatus for an internal combustion engine according to the first embodiment of the present invention is provided further with the second air fuel ratio feedback control section 202 that corrects the center of oscillation AFCNT of the average air fuel ratio based on the output value V2 of the downstream oxygen sensor 15. Thus, by detecting the state of the amount of oxygen occlusion of the catalyst 12 based on the output value V2 of the downstream oxygen sensor 15, the oscillation center AFCNT of the target average air fuel ratio AFAVEobj can be adjusted so as not to go off from the maximum amount of oxygen occlusion OSCmax or the minimum amount of oxygen occlusion (=0), whereby the control precision of the oscillation processing of the amount of oxygen occlusion can be further improved.

In addition, the catalyst degradation diagnosis section 205 sets a target value of an output value in the second air fuel ratio feedback control section 202 as a determination threshold for inversion determination of the output value V2 of the downstream oxygen sensor 15, whereby it is possible to improve the detection accuracy of the variation to the rich direction or to the lean direction of the downstream oxygen sensor 15.

Also, the catalyst degradation diagnosis section 205 sets a gradually changing processed value of the output value in the second air fuel ratio feedback control section 202 as the determination threshold for inversion determination of the output value V2 of the downstream oxygen sensor 15. According to this setting, even if the target voltage VR2 suddenly changes with the output value V2 of the downstream oxygen sensor 15 remaining unchanged, the possibility of misjudging a rich/lean inversion can be reduced.

Moreover, the catalyst degradation diagnosis section 205 updates the calculated value for catalyst degradation diagnosis based on the output value of the downstream oxygen sensor 15 and the average air fuel ratio calculated during the period of a predetermined frequency of oscillations each time the frequency of oscillations PTN to the rich and lean directions of the average air fuel ratio reaches the predetermined frequency of oscillations. Thus, by performing the degradation diagnosis at each predetermined frequency of oscillations of the target average air fuel ratio, it is possible to make the diagnosis in synchronization with the variation of the amount of oxygen occlusion OSC that has a correlation with the variation of the output value V2 of the downstream oxygen sensor 15. Accordingly, it is possible to avoid that a degradation diagnosis is carried out in a short period of time in which the number or frequency of oscillations PTN of the amount of oxygen occlusion OSC has not yet been performed to a satisfactory extent, thereby making a misdiagnosis that the variation of the output value V2 of the downstream oxygen sensor 15 is small, or on the contrary, it is possible to avoid that the frequency of oscillations PTN of the amount of oxygen occlusion OSC is large, thus making a misdiagnosis that the variation of the output value V2 of the downstream oxygen sensor 15 is large. As a result, it is possible to avoid the variation of the calculated value of the degradation diagnosis resulting from the variation or fluctuation of the diagnostic period of time (the oscillation frequency PTN of the amount of oxygen occlusion) that is caused in accordance with the engine operating condition, whereby the accuracy of degradation diagnosis can be improved.

Further, the catalyst degradation diagnosis section 205 diagnoses the degradation of the catalyst 12 based on the oscillation behavior of the average air fuel ratio in a predetermined period of time and the behavior of the output value V2 of the downstream oxygen sensor 15 in the predetermined period after a delay time that is in correlation to the amount of intake air Qa of the engine proper 1. That is, by the provision of the delay timer Trsdly in consideration of the delay of a control system, it is possible to detect the variation of the output value V2 of the downstream oxygen sensor 15 corresponding to the oscillation of the average air fuel ratio with a high degree of precision.

Furthermore, each time the predetermined frequency of oscillations is reached after the average air fuel ratio starts to oscillate, the catalyst degradation diagnosis section 205 executes degradation diagnosis processing of the catalyst 12, but inhibits the execution of the degradation diagnosis processing of the catalyst 12 for a period of time in which the predetermined frequency of oscillations is reached after the start of oscillation of the average air fuel ratio. With this, it is possible to prevent a misdiagnosis resulting from the fact that an unstable state after the start of oscillation of the average air fuel ratio is diagnosed, so that a diagnosis can be started from a time point at which the oscillation becomes stabilized, thus making it possible to improve diagnostic accuracy. Embodiment 2.

Although in the above-mentioned first embodiment, the average air fuel ratio oscillation section 203 executes oscillation processing based on the period counter Tmr, the oscillation processing may be executed based on an estimated value of the amount of oxygen occlusion (an estimated amount of oxygen occlusion OSC).

Hereinafter, reference will be made to a second embodiment of the present invention in which oscillation processing based on the estimated amount of oxygen occlusion OSC is executed, while referring to FIG. 28 through FIG. 31 together with FIG. 1 and FIG. 2. In this case, only a part of the calculation processing (see FIG. 6) according to the average air fuel ratio oscillation section 203 is different from that described in the above-mentioned first embodiment, but the overall construction and the other functions of the air fuel ratio control apparatus for an internal combustion engine according to this second embodiment are similar to those of the above-mentioned first embodiment.

Figure 28:
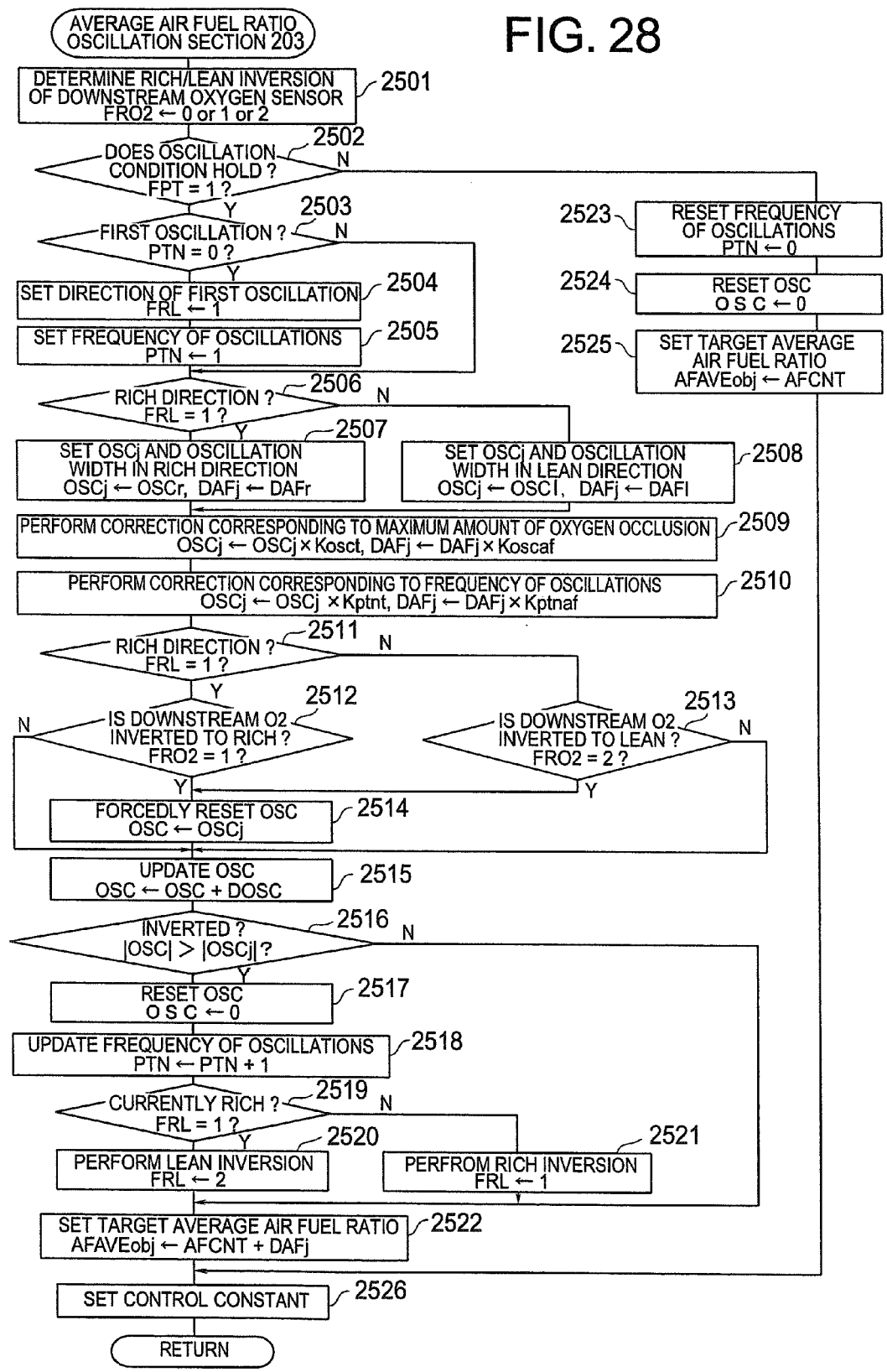
FIG. 28 is a flow chart illustrating the processing operation of an average air fuel ratio oscillation section according to a second embodiment of the present invention.
Figure 29:
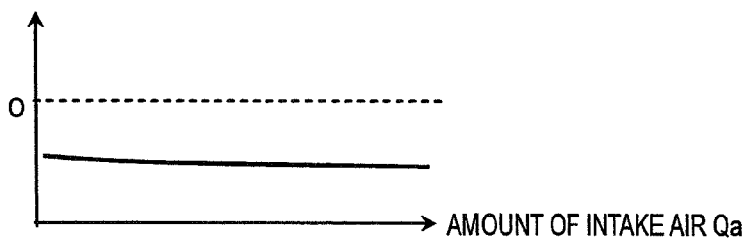
FIG. 29 is an explanatory view showing the characteristic of the set value of an estimated amount of oxygen occlusion in a rich direction set in accordance with the amount of intake air by means of the second embodiment of the present invention.
Figure 30:
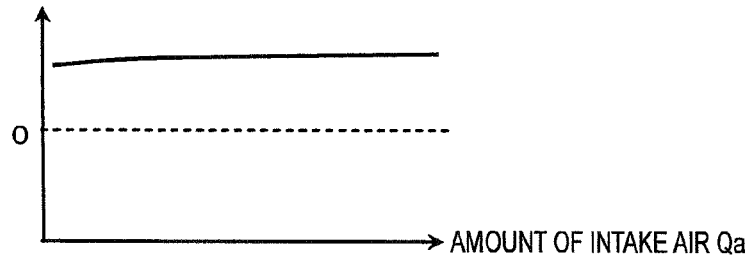
FIG. 30 is an explanatory view showing the characteristic of the set value of an estimated amount of oxygen occlusion in a lean direction set in accordance with the amount of intake air by means of the second embodiment of the present invention.
Figure 31:
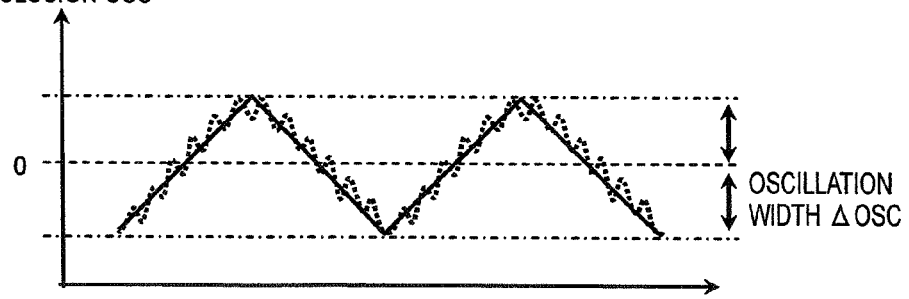
FIG. 31 is a timing chart showing the width of oscillation of an estimated amount of oxygen occlusion in the second embodiment of the present invention.

FIG. 28 is a flow chart that shows the processing operation of the average air fuel ratio oscillation section 203 according to the second embodiment of the present invention, and an arithmetic calculation routine of FIG. 28 is executed at every predetermined time (e.g., 5 msec), as in the case of the above-mentioned FIG. 6. FIG. 29 and FIG. 30 are explanatory views that show the set values of estimated amounts of oxygen occlusion OSCr, OSCl in the rich and lean directions, respectively. Here, note that oscillation widths DAFr, DAFl in the rich and lean directions, respectively, of the average air fuel ratio oscillation are as shown in the above-mentioned FIG. 10 and FIG. 12, respectively. FIG. 31 is a timing chart that shows an oscillation width $\Delta OSC$ in the second embodiment of the present invention.

In FIG. 28, steps 2501 through 2526 correspond to the above-mentioned steps 701 through 726 (see FIG. 6), respectively. However, note that using the estimated amount of oxygen occlusion OSC instead of the inversion period Tj or the period counter Tmr in individual processes in steps 2507 through 2510, 2514 through 2517 and 2524 is different from the above-mentioned one.

First of all, the average air fuel ratio oscillation section 203 makes a determination as to whether the output value V2 of the downstream oxygen sensor 15 has been inverted from rich to lean, or vice versa, or has not been inverted (step 2501), similar to the above-mentioned step 701. When the output value V2 has been inverted from lean to rich, the inversion flag FRO2 is set to 1 (i.e., FRO2=1, rich inversion); when the output value V2 has been inverted from rich to lean, the inversion flag FRO2 is set to 2 (i.e., FRO2=2, lean inversion); and when no inversion has been made, the inversion flag FRO2 is set to 0 (i.e., FRO2=0, no inversion). Then, the control process proceeds to step 2502.

In step 2502, similar to the above-mentioned step 702, it is determined whether the oscillation condition of the average air fuel ratio holds, and when the oscillation condition holds, the control process proceeds to the following determination processing (step 2503), whereas when the oscillation condition does not hold, the control process proceeds to reset processing (step 2523).

In steps 2503 through 2505, initial values (the oscillation direction flag FRL and the frequency of oscillations PTN) in the first oscillation after the oscillation condition holds is set. First of all, when the result of the determination in step 2503 shows that the frequency of oscillations PTN is 0 (i.e., PTN=0, first oscillation), initial values are set in steps 2504, 2505, respectively, whereas when otherwise (i.e., other than PTN=0), the control process proceeds to step 2506 without setting initial values. In step 2504, the first oscillation direction flag FRL (e.g., rich direction "1") is set, and in step 2505, the first frequency of oscillations PTN is set to 1 (PTN=1).

In steps 2506 through 2508, estimated amounts of oxygen occlusion OSCj and widths of oscillation DAFj of the average air fuel ratio in the rich and lean directions are set, respectively. First of all, in step 2506, it is determined whether the direction of oscillation is a rich or lean direction, and in case of a rich direction (FRL=1), the control process proceeds to step 2507, whereas in case of a lean direction (FRL=2), the control process proceeds to step 2508.

In step 2507, the estimated amount of oxygen occlusion OSCr and the oscillation width DAFr in the rich direction are set, and the control process proceeds to step 2509. At this time, an estimated amount of oxygen occlusion OSCj (=OSCr) is set by the use of a one-dimensional map (see FIG. 29) corresponding to the amount of intake air Qa in such a manner that the oscillation width ΔOSC of the amount of oxygen occlusion becomes a predetermined amount, and similarly, an oscillation width of the average air fuel ratio DAFj (=DAFr) is set by the use of a one-dimensional map (see FIG. 10) corresponding to the amount of intake air Qa in such a manner that the oscillation width A OSC of the amount of oxygen occlusion becomes the predetermined amount.

In step 2508, an estimated amount of oxygen occlusion OSCl and an oscillation width DAFl in the lean direction are set, and the control process proceeds to step 2509. At this time, the estimated amount of oxygen occlusion OSCj (=OSCl) is set by the use of a one-dimensional map (see FIG. 30) corresponding to the amount of intake air Qa in such a manner that the oscillation width ΔOSC of the amount of oxygen occlusion becomes a predetermined amount, and similarly, the oscillation width DAFj (=DAFl) of the average air fuel ratio is set by the use of a one-dimensional map (see FIG. 12) corresponding to the amount of intake air Qa in such a manner that the oscillation width ΔOSC of the amount of oxygen occlusion becomes the predetermined amount.

In addition, as will be described later, in the course of degradation diagnosis of the catalyst degradation diagnosis section 205, the width of oscillation ΔOSC of the amount of oxygen occlusion at the time of degradation diagnosis is set to be within the range of the maximum amount of oxygen occlusion OSCmax of the catalyst 12 before degradation thereof, and outside the range of the maximum amount of oxygen occlusion of the catalyst for which the degradation diagnosis is required. Thus, in case of the catalyst for which degradation diagnosis is required, the disturbance of the output value V2 of the downstream oxygen sensor 15 becomes large, so the accuracy of the degradation diagnosis can be improved.

The width of oscillation ΔOSC of the amount of oxygen occlusion is represented as shown in the following expression (20), similar to the aforementioned expression (3), by using the period Tj [sec], the absolute value of the width of oscillation DAFj, the amount of intake air Qa [g/sec], and the predetermined coefficient KO2 for conversion.

$$\Delta OSC\ [g] = 2 \times |OSCj|\ [g] \qquad (20)$$
$$= Tj \times |DAFj| \times Qa \times KO2$$

In order to maintain the oscillation width ΔOSC of the amount of oxygen occlusion at a predetermined value, if it is assumed that the oscillation width DAFj is a fixed value for example, the period Tj need only be changed in inverse proportion to the amount of intake air Qa (see FIG. 9 and FIG. 11). On the contrary, in case where the period Tj is set to a fixed value, the width of oscillation DAFj need be set to a value that is in inverse proportion to the amount of intake air Qa. However, in actuality, in the setting range of the period Tj or the oscillation width DAFj, there are various constraints such as improvement in the purification characteristic of the catalyst 12, improvement in driveability, improvement in response, etc., so the oscillation width DAFj is caused to change in accordance with the amount of intake air Qa, as shown in FIG. 10 and FIG. 12, so as to set the oscillation width ΔOSC of the amount of oxygen occlusion to a predetermined value.

Also, the oscillation widths DAFj in the rich and lean directions of the average air fuel ratio oscillation are set asymmetric with respect to each other, and for example, in order to improve the NOx purification characteristic of the catalyst 12 or to alleviate the reduction in torque, the absolute value of the width of oscillation DAFj (=DAFl) to the lean direction may be set smaller than the absolute value of the width of oscillation DAFj (=DAFr) to the rich direction.

Moreover, the estimated amount of oxygen occlusion OSC (width of oscillation ΔOSC) is set to be within the range of the maximum amount of oxygen occlusion OSCmax of the catalyst 12. This is because when the amount of oxygen occlusion of the catalyst 12 is within a range between the maximum amount of oxygen occlusion OSCmax and the minimum amount of oxygen occlusion (=0), the variation of the air fuel ratio upstream of the catalyst 12 is absorbed by the change in the amount of oxygen occlusion, and the air fuel ratio in the catalyst 12 is kept in the vicinity of the stoichiometric air fuel ratio, so it is possible to prevent large deterioration of the purification rate of the catalyst 12.

In the range of the maximum amount of oxygen occlusion OSCmax, too, the oscillation width ΔOSC of the amount of oxygen occlusion is adjusted for improvement in the purification characteristic of the catalyst 12 or for the degradation diagnosis of the catalyst 12 for example, and is set to a predetermined amount in accordance with the operating conditions. This is because by changing the oscillation width ΔOSC of the amount of oxygen occlusion in accordance with the engine rotational speed Ne or the load, the components of the exhaust gas discharged from the engine proper 1 and the temperature of the catalyst Tmpcat are changed to change the purification characteristic of the catalyst 12, so it is possible to further improve the purification characteristic of the catalyst 12.

Further, the individual set values of the estimated amounts of oxygen occlusion OSCj and the oscillation width DAFj in the rich and lean directions may be switched such as when the purification characteristic of the catalyst 12 is improved, or when the degradation diagnosis of the catalyst 12 is performed, or the like. As a result, it is possible to set an appropriate oscillation width ΔOSC of the amount of oxygen occlusion in accordance with the intended purposes. The switching processing at this time is performed, for example, by switching between the individual maps of the estimated amounts of oxygen occlusion OSCj and the oscillation widths DAFj set in steps 2507, 2508 in accordance with the operating conditions.

In addition, the width of oscillation ΔOSC of the amount of oxygen occlusion at the time of degradation analysis is set to be within the range of the maximum amount of oxygen occlusion OSCmax of the catalyst 12 before degradation thereof, and outside the range of the maximum amount of oxygen occlusion of the catalyst for which the degradation diagnosis is required. Thus, in case of the catalyst for which degradation diagnosis is required, the disturbance of the output value V2 of the downstream oxygen sensor 15 becomes large, so the accuracy of the degradation diagnosis can be improved.

Returning to FIG. 28, in step 2509, similar to the above-mentioned step 709 (FIG. 6), the estimated amounts of oxygen occlusion OSCj (the oscillation widths ΔOSC) set in step 2507 or 2508 and the oscillation widths DAFj of the average air fuel ratio are adaptively corrected in accordance with the maximum amount of oxygen occlusion OSCmax calculated by the maximum oxygen occlusion amount calculation section 204. That is, the oscillation widths DAFj of the average air fuel ratio are corrected according to the aforementioned expression (5) by using a correction coefficient Koscaf corresponding to the maximum amount of oxygen occlusion OSCmax, and the estimated amounts of oxygen occlusion OSCj (the oscillation widths ΔOSC) are corrected according to the following expression (21) by using a correction coefficient Kosct, similar to the aforementioned expression (4).

$$OSCj = OSCj(n-1) \times Kosct \quad (21)$$

where (n−1) represents the last value before correction. Here, note that the correction coefficient Kosct is set by a one-dimensional map corresponding to the maximum amount of oxygen occlusion OSCmax.

In addition, the individual correction coefficients Kosct, Koscaf are set so as to maintain the oscillation widths ΔOSC of the estimated amounts of oxygen occlusion within the range of the changed maximum amount of oxygen occlusion OSCmax in such a manner that the oscillation widths ΔOSC of the amounts of oxygen occlusion decrease in accordance with the decreasing maximum amount of oxygen occlusion OSCmax. As a result, it is possible to prevent the oscillation widths ΔOSC of the amounts of oxygen occlusion from deviating from the maximum amount of oxygen occlusion OSCmax to go off scale to a great extent, whereby it is possible to avoid the great deterioration of the exhaust gas.

Then, following correction processing in step 2509, the estimated amounts of oxygen occlusion OSCj and the oscillation widths DAFj of the average air fuel ratio are further corrected by being multiplied by the correction coefficients Kptnt, Kptnaf corresponding to the frequency of oscillations PTN after the oscillation of the average air fuel ratio starts (step 2510).

The correction coefficient Kptnt of the estimated amounts of oxygen occlusion OSCj (the oscillation widths ΔOSC) and the correction coefficient Kptnaf of the oscillation widths DAFj of the average air fuel ratio are respectively set according to tables corresponding to the frequency of oscillations PTN. Here, note that the individual correction coefficients may be set in such a manner that the oscillation widths ΔOSC of the amounts of oxygen occlusion gradually increase in accordance with the increasing frequency of oscillations PTN. With this, it is possible to prevent a sudden change in the state of the catalyst 12 as well as to avoid the defect of the followability of air fuel ratio control (in particular, control according to the second air fuel ratio feedback control section 202).

Subsequently, in steps 2511 through 2514, similar to the above-mentioned steps 711 through 714 (FIG. 6), when the amount of oxygen occlusion OSC of the catalyst 12 has exceeded beyond the maximum amount of oxygen occlusion OSCmax or the minimum amount of oxygen occlusion (=0) at the time of the rich/lean inversion of the output value V2 of the downstream oxygen sensor 15, forced resetting is carried out to invert the oscillation direction of the average air fuel ratio in a forced manner.

First of all, when the result of the determination in step 2511 shows that the average air fuel ratio is oscillating in the rich direction (the oscillation direction flag FRL=1), the control process proceeds to step 2512, whereas when the average air fuel ratio is oscillating in the lean direction (FRL=2), the control process proceeds to step 2513.

Subsequently, when the result of the determination in step 2512 during the oscillation of the average air fuel ratio in the rich direction shows the lean to rich inversion of the output value V2 (the inversion flag FRO2 of the downstream oxygen sensor 15=1), the estimated amount of oxygen occlusion OSC is reset to an inverted amount of oxygen occlusion OSCj (step 2514), whereby the direction of oscillation is inverted in a forced manner.

On the other hand, when the result of the determination in step 2513 during the oscillation of the average air fuel ratio in the lean direction shows the rich to lean inversion of the output value V2 (FRO2=2), the control process similarly proceeds to step 2514, where the estimated amount of oxygen occlusion OSC is reset to the inverted amount of oxygen occlusion OSCj thereby to forcedly change the direction of oscillation.

Thus, similar to the above-mentioned first embodiment, by detecting the scale out of the amount of oxygen occlusion OSC of the catalyst 12 based on the inversion of the output value V2 of the downstream oxygen sensor 15, and by inverting the direction of the oscillation of the average air fuel ratio, it is possible to restore the amount of oxygen occlusion OSC from the state of scale out thereof, whereby the deterioration of the exhaust gas can be suppressed to a minimum.

Then, according to steps 2515 through 2521, the rich/lean inversion is performed by updating the estimated amount of oxygen occlusion OSC. First, in step 2515, the estimated amount of oxygen occlusion OSC is updated, as shown in the following expression (22), by applying an integral calculation to the last integral value OSC(n−1) by the use of the oscillation width DAF of the average air fuel ratio, the amount of intake air Qa [g/sec], an arithmetic calculation period DT (=5 msec), and the predetermined coefficient KO2 for conversion into the amount of oxygen occlusion OSC.

$$OSC = OSC(n-1) + DAF \times Qa \times DT \times KO2 \quad (22)$$

FIG. 31 is a timing chart that shows the behavior of the estimated amount of oxygen occlusion OSC (see a solid line) estimated from the average air fuel ratio, wherein the estimated amount of oxygen occlusion OSC is shown in comparison with the amount of oxygen occlusion (see a dotted line) estimated from the air fuel ratio behavior (i.e., changes to rich/lean in a periodic manner) before the averaging processing.

In FIG. 31, comparing the estimated amount of oxygen occlusion (see the dotted line) based on the air fuel ratio behavior with the estimated amount of oxygen occlusion OSC (see the solid line) based on the average air fuel ratio, it is found that the oscillation of the amount of oxygen occlusion of a long period can be simulated to a satisfactory extent even if omitting minute oscillations (see the dotted line) such as the estimated amount of oxygen occlusion OSC (see the solid line).

Although in expression (22) above, the oscillation width DAF of the average air fuel ratio is used, the target average air fuel ratio AFAVEobj may instead be used. In this case, in the arithmetic calculation of the expression (22), a value (AFAVEobj—14.53) is used in place of the oscillation width DAF.

In addition, an estimated value of the air fuel ratio upstream of the catalyst 12 may be used instead of the target average air fuel ratio AFAVEobj. In this case, the estimated value of the upstream air fuel ratio is estimated through calculation, for example, by applying dead time processing (or gradually changing processing, etc.) to the fuel correction coefficient FAF.

In case where the air fuel ratio is estimated based on the target average air fuel ratio AFAVEobj or the fuel correction coefficient FAF, there is an influence of control due to the second air fuel ratio feedback control section 202, so design becomes complicated with the occurrence of an interaction with the feedback control of the second air fuel ratio feedback control section 202, but the estimation accuracy of the amount of oxygen occlusion OSC is excellent. On the other hand, in case where the air fuel ratio is estimated based on the oscillation width DAF of the average air fuel ratio, there is no influence of control by the second air fuel ratio feedback control section 202, so designing becomes simple but the estimation accuracy of the amount of oxygen occlusion OSC is poor.

In addition, although the stoichiometric air fuel ratio has been described as "14.53", the calculation may be carried out by using another stoichiometric air fuel ratio (=14.53+AFI) which is learned by the feedback control due to the second air fuel ratio feedback control section 202.

Then, following the update processing of the estimated amount of oxygen occlusion OSC (step 2515), a determination is made as to whether it is the timing for inversion, depending upon whether the absolute value of the estimated amount of oxygen occlusion OSC is larger than the absolute value of the estimated amount of oxygen occlusion OSCj after inversion (step 2516). When it is determined as the timing for inversion (|OSC|>|OSCj|) (that is, YES), the estimated amount of oxygen occlusion OSC is reset to "0" (step 2517), and the frequency of oscillations PTN is incremented by "1" (step 2518), after which the control process proceeds to step 2519 that is similar to the above-mentioned step 719 (FIG. 6).

On the other hand, when it is determined as not the timing for inversion (|OSC|≦|OSCj|) in step 2516 (that is, NO), the control process proceeds to processing for setting the target average air fuel ratio AFAVEobj (step 2522).

Hereinafter, when the result of the determination in step 2519 shows the current oscillation direction flag FRL=1 (rich), the oscillation direction flag FRL is set to "2" and is inverted to the lean direction (step 2520), whereas when the result of the determination in step 2519 shows FRL=2 (lean), the oscillation direction flag FRL is set to "1" and is inverted to the rich direction (step 2521).

Also, the target average air fuel ratio AFAVEobj when the oscillation condition holds is set through calculation by adding the oscillation width DAFj to the oscillation center AFCNT of the target average air fuel ratio AFAVEobj, as shown in the aforementioned expression (6) (step 2522, and then the control process proceeds to step 2526. Here, note that the oscillation center AFCNT of the target average air fuel ratio AFAVEobj is the target average air fuel ratio calculated by the feedback control due to the second air fuel ratio feedback control section 202.

Thus, by detecting the state of the amount of oxygen occlusion of the catalyst 12 based on the output value V2 of the downstream oxygen sensor 15, the oscillation center AFCNT of the target average air fuel ratio AFAVEobj can be adjusted so as not to go off from the maximum amount of oxygen occlusion OSCmax or the minimum amount of oxygen occlusion (=0), whereby the control precision of the oscillation processing of the amount of oxygen occlusion OSC can be further improved.

Here, note that the oscillation center AFCNT may be set to a predetermined value depending on the engine operating conditions.

In addition, the state of purification of the catalyst 12 may be changed by shifting the oscillation center AFCNT to the lean direction or the rich direction in accordance with a certain condition, and the air fuel ratio control apparatus of the present invention may be used for the diagnose of failure in the catalyst 12, the various kinds of sensors, etc.

On the other hand, when the result of the determination in the above-mentioned step 2502 shows that the oscillation condition does not hold, the frequency of oscillations PTN is reset to "0" (step 2523), and the estimated amount of oxygen occlusion OSC is also reset to "0" (step 2524), after which the target average air fuel ratio AFAVEobj at the failure of the oscillation condition is set to the oscillation center AFCNT (step 2525), and the control process proceeds to step 2526.

Finally, in step 2526, the control constants in the control operation of the first air fuel ratio feedback control section 201 are set so as to make the average air fuel ratio coincide with the target average air fuel ratio AFAVEobj, and the processing of the average air fuel ratio oscillation section 203 of FIG. 28 is terminated.

As described above, the average air fuel ratio oscillation section 203 according to the second embodiment of the present invention estimates the amount of oxygen occlusion OSC of the catalyst 12, and inverts the average air fuel ratio to the rich direction and to the lean direction based on the estimated amount of oxygen occlusion OSC so as to make the estimated amount of oxygen occlusion OSC oscillate in a predetermined range set in accordance with the engine operating condition within the range of the maximum amount of oxygen occlusion OSCmax of the catalyst 12. In this case, too, the operational effects similar to those of the above-mentioned first embodiment can be achieved.

Figure 32:
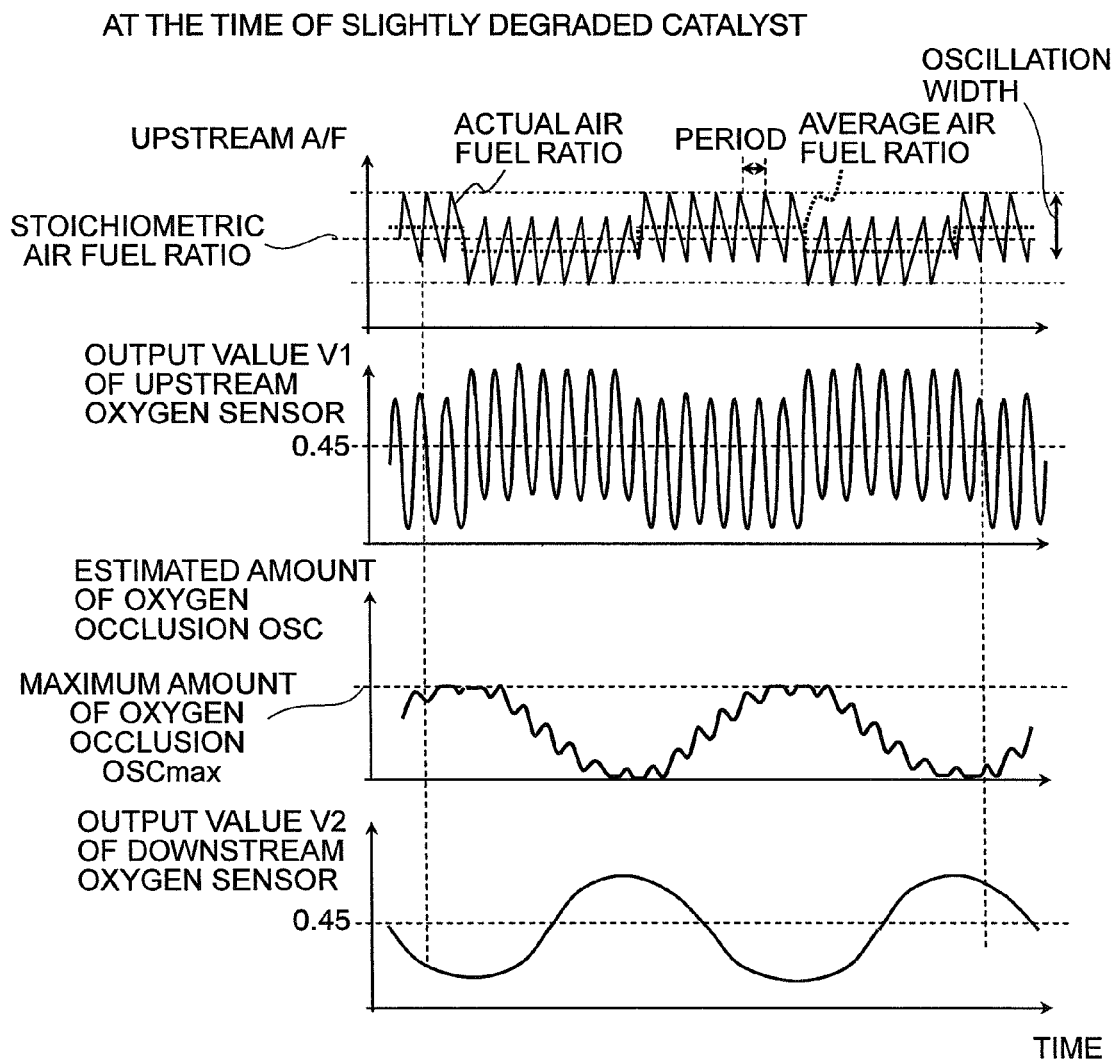
FIG. 32 is a timing chart illustrating processing operations with slightly degraded catalysts for explanation of effects according to the first and second embodiments of the present invention.
Figure 33:
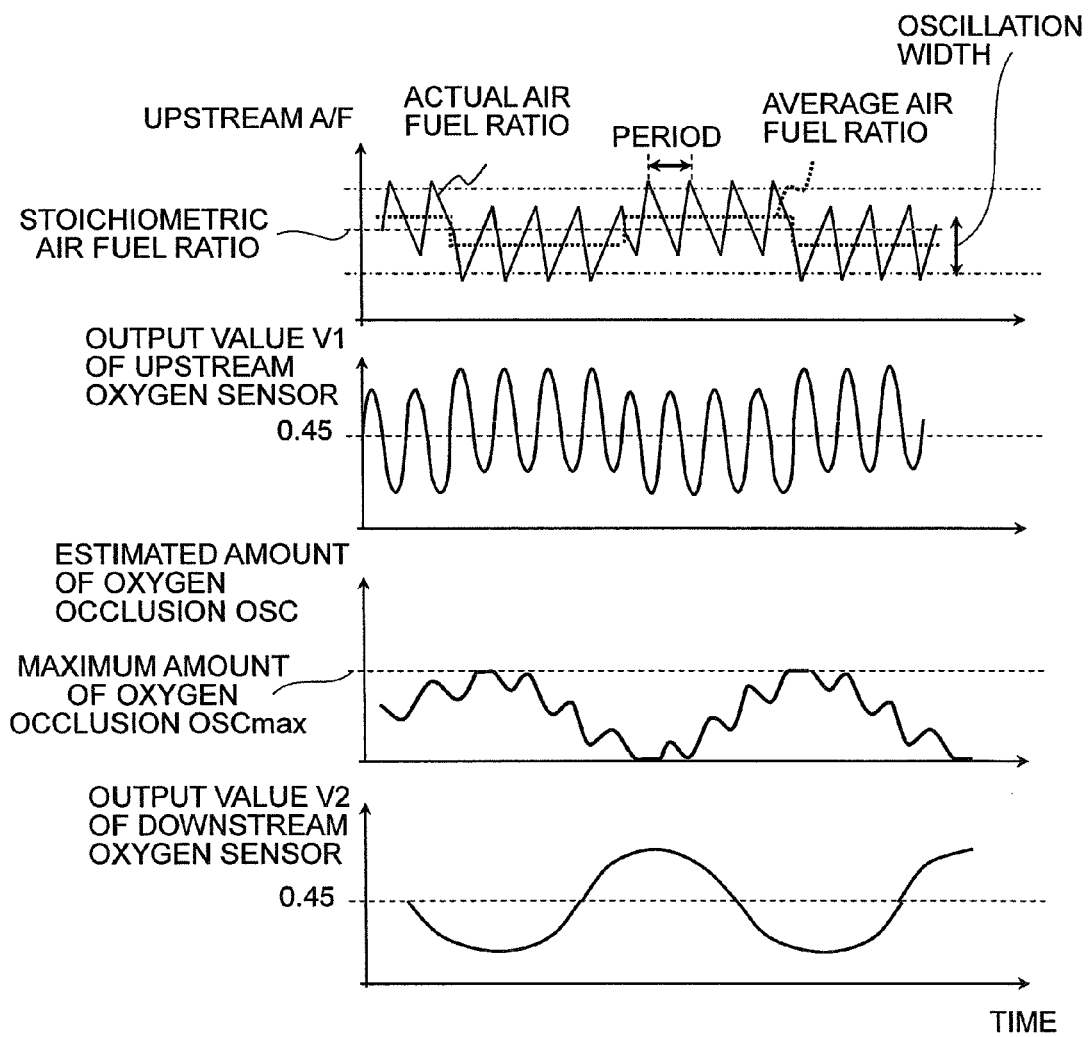
FIG. 33 is a timing chart illustrating processing operations with slightly degraded catalysts under conditions different from those in FIG. 32 for explanation of effects according to the first and second embodiments of the present invention.
Figure 34:
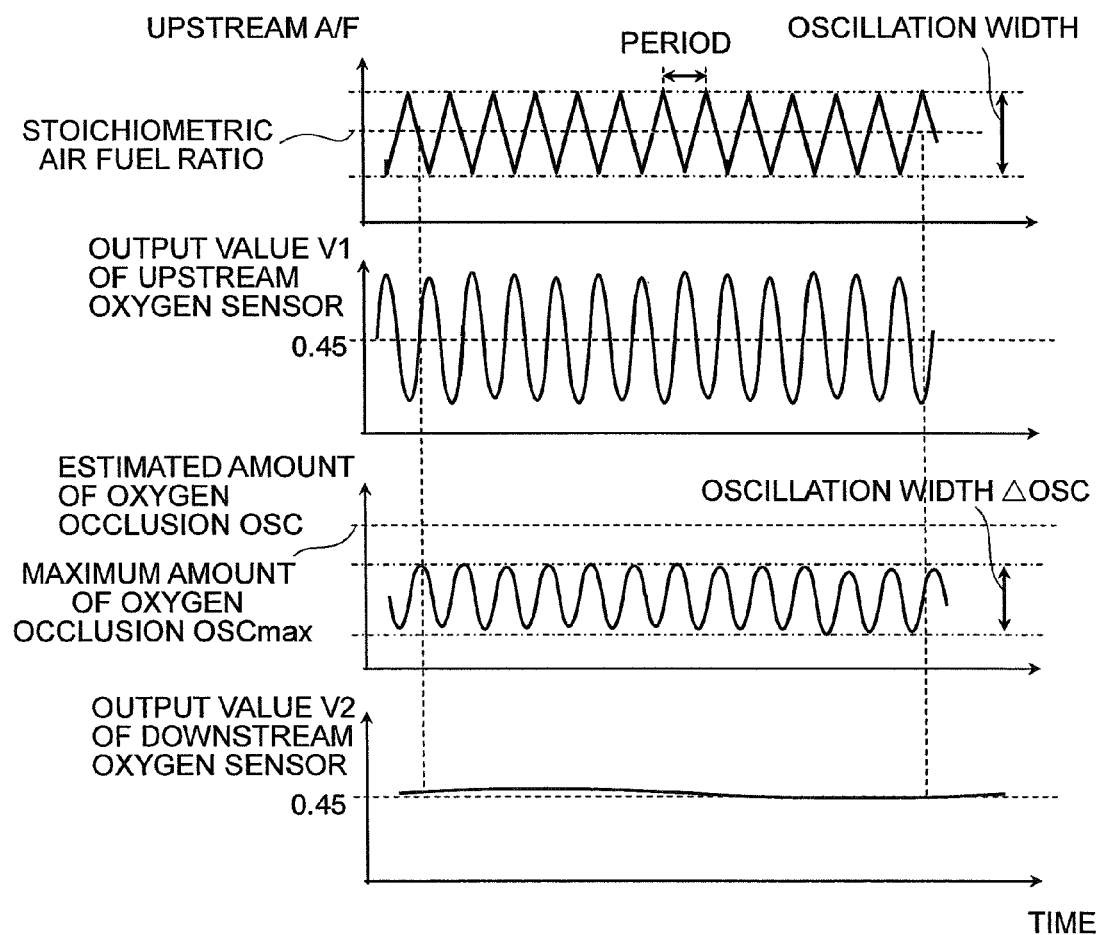
FIG. 34 is a timing chart illustrating processing operations with a normal catalyst according to a conventional air fuel ratio control apparatus for an internal combustion engine.
Figure 35:
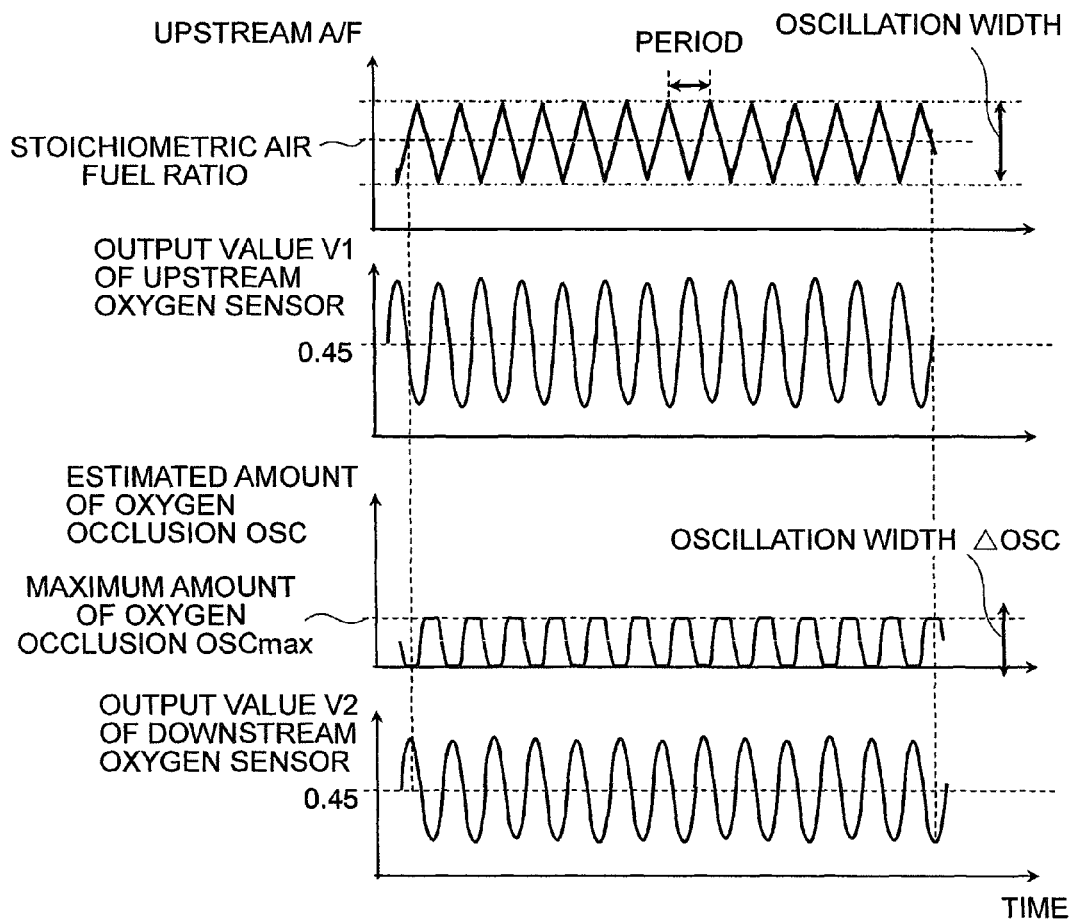
FIG. 35 is a timing chart illustrating processing operations with a degraded catalyst according to the conventional air fuel ratio control apparatus for an internal combustion engine.
Figure 36:
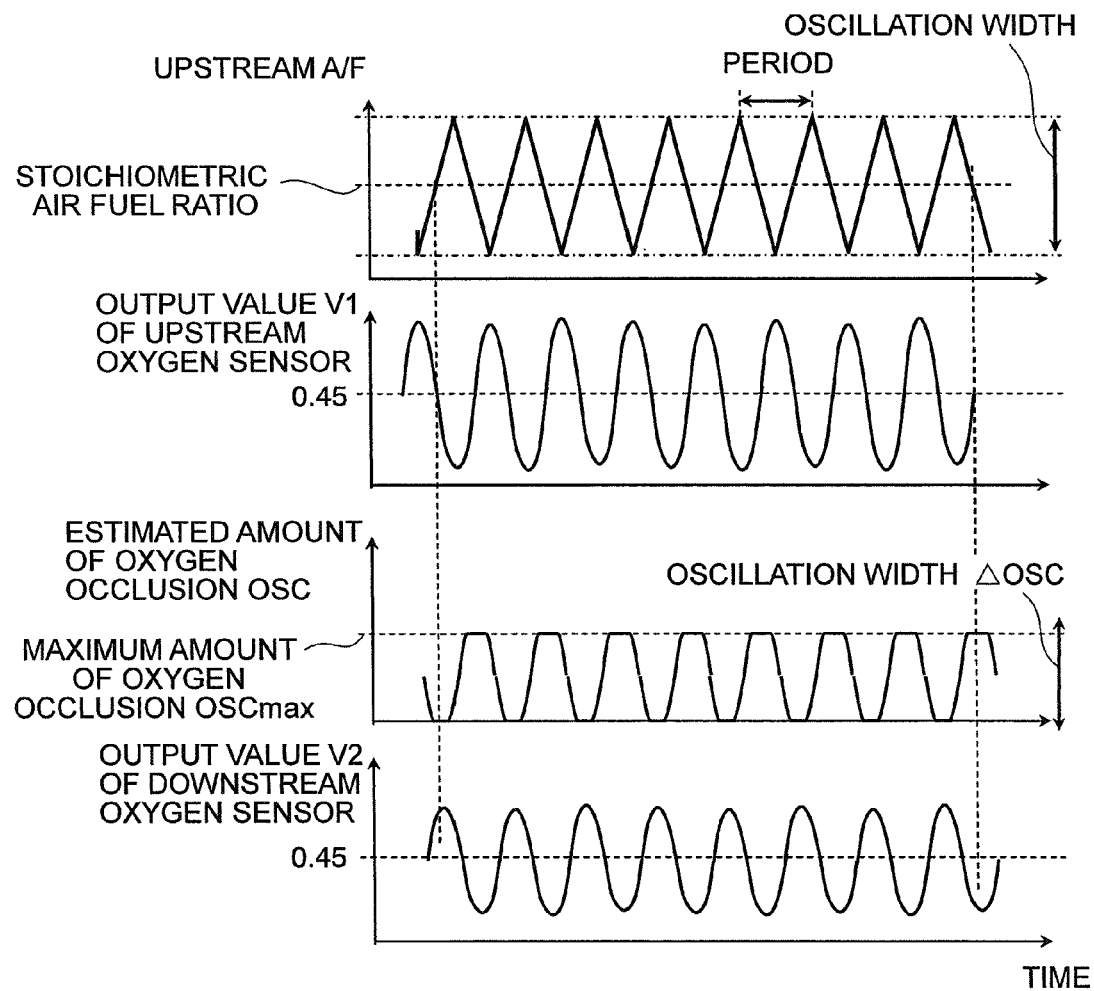
FIG. 36 is a timing chart illustrating processing operations with a slightly degraded catalyst according to a conventional air fuel ratio control apparatus for an internal combustion engine.

Now, reference will be made to the operational effects obtained by the first and second embodiments of the present invention while referring to the timing charts of FIG. 32 and FIG. 33. FIG. 32 and FIG. 33 show the behaviors of a slightly degraded catalyst in the degradation diagnosis thereof under the mutually different engine operating conditions, respectively, wherein individual operation waveforms correspond to the above-mentioned cases of FIG. 36, respectively.

In the upstream A/F at the top row in each of FIG. 32 and FIG. 33, a solid line waveform indicates the variation of an actual air fuel ratio, and a dotted line waveform indicates the variation of an average air fuel ratio. In addition, though the amount of oscillation of the average air fuel ratio in FIG. 33 is identical with that in the case of FIG. 32, the operating condition in FIG. 33 is different from that in FIG. 32, with the oscillation period of the upstream A/F in FIG. 33 being longer than that in FIG. 32.

In FIG. 32 and FIG. 33, the oscillation width $\Delta OSC$ of the amount of oxygen occlusion OSC can be increased by making the average value of the oscillating air fuel ratio (see the dotted lines) oscillate in the rich and lean directions in a periodic manner without changing the period and amplitude or oscillation width of the air fuel ratio oscillation to the rich and lean directions of the upstream A/F to any great extent.

In addition, as shown in FIG. 32 and FIG. 33, the correlation between the variation period and the oscillation width of the upstream A/F and the change rate of the amount of oxygen occlusion OSC changes in accordance with the engine operating condition, so there is no correlation between the frequency of oscillation of the amount of oxygen occlusion OSC due to the oscillation of the average air fuel ratio and the frequency of oscillation of the upstream A/F.

Here, if the degradation diagnosis is made from the output value V2 of the downstream oxygen sensor 15 with the upstream A/F (the output value V1 of the upstream oxygen sensor 13) indicated by a solid line waveform being used as a reference, the oscillation frequency of the upstream A/F increases or decreases when the response of the output value V1 of the upstream oxygen sensor 13 changes due to aging, etc., as a consequence of which the accuracy of the degradation diagnosis will reduce though the oscillation frequency of the amount of oxygen occlusion OSC due to the oscillation of the average air fuel ratio has not changed.

On the other hand, as in the first and second embodiments of the present invention, by making the average air fuel ratio (see the dotted line waveform) of the air fuel ratio oscillation of the upstream A/F oscillate in the rich and lean directions in a periodic manner, and by performing degradation diagnosis based on the correlation between the variation of the average air fuel ratio and the variation of the downstream A/F (the output value V2) detected by the downstream oxygen sensor 15, the degradation of the catalyst can be diagnosed based on the average air fuel ratio oscillation which is in correlation to the oscillation of the amount of oxygen occlusion OSC that is a cause to generate the variation of the downstream A/F. As a result of which diagnostic accuracy can be improved.

Although in the above-mentioned individual embodiments, the λ type sensor is used as the downstream oxygen sensor 15, there may be used, for this purpose, other types of sensors which can detect the purification state of the catalyst 12 arranged at a location upstream of such sensors. For example, the purification state of the catalyst 12 can be controlled with the use of a linear oxygen sensor, an NOx sensor, an HC sensor, a CO sensor, and so on, while providing the same operational effects as stated above.

Furthermore, a linear type oxygen sensor having a linear output characteristic with respect to a change in the air fuel ratio may be used as the upstream oxygen sensor 13, and in this case, the average air fuel ratio can be controlled under the same control action of the first air fuel ratio feedback control section 201 as stated above while making the air fuel ratio upstream of the catalyst 12 oscillate, as a consequence of which the same operational effects as stated above can be achieved.

In addition, in case where a linear type oxygen sensor is used as the upstream oxygen sensor 13, it is possible to perform control with an excellent ability to follow the target air fuel ratio A/Fo. Thus, the target air fuel ratio A/Fo is caused to oscillate in the rich and lean directions in a periodic manner thereby to oscillate the upstream air fuel ratio, whereby the average value of the target air fuel ratio A/Fo under oscillation is forced to further oscillate in the rich and lean directions in a periodic manner, thus making it possible to achieve the same operational effects as stated above.

Further, the second air fuel ratio feedback controller 202 is constructed to calculate the target air fuel ratio A/Fo from the target value VR2 and the output value V2 of the downstream oxygen sensor 15 (output information) by using proportional calculation and integral calculation, but the purification state of the catalyst 12 can be controlled even if the target air fuel ratio A/Fo is calculated from the target value VR2 and the output value V2 of the downstream oxygen sensor 15 by using other kinds of feedback control (for example, state feedback control, sliding mode control, observer control, adaptive control, H∞ control, etc., of modern control theory), while providing the same operational effects as stated above.

While the invention has been described in terms of preferred embodiments, those skilled in the art will recognize that the invention can be practiced with modifications within the spirit and scope of the appended claims.

What is claimed is:

1. An air fuel ratio control apparatus for an internal combustion engine, comprising:
   a catalyst that is arranged in an exhaust system of an internal combustion engine for purifying an exhaust gas from said internal combustion engine;
   an upstream air fuel ratio sensor that is arranged at a location upstream of said catalyst for detecting an air fuel ratio of a mixture in the exhaust gas upstream of said catalyst;
   a variety of kinds of sensors that detect operating conditions of said internal combustion engine;
   a first air fuel ratio feedback control section that adjusts the air fuel ratio of the mixture supplied to said internal combustion engine in accordance with an output value of said upstream air fuel ratio sensor and a predetermined control constant thereby to make said air fuel ratio oscillate in rich and lean directions in a periodic manner;
   a downstream air fuel ratio sensor that is arranged at a location downstream of said catalyst for detecting an air fuel ratio in the exhaust gas downstream of said catalyst;
   an average air fuel ratio oscillation section that operates said control constant based on an amount of oxygen occlusion of said catalyst so as to make an average air fuel ratio, which is obtained by averaging said periodically oscillating air fuel ratio, oscillate in the rich and lean directions; and
   a catalyst degradation diagnosis section;
   wherein said catalyst degradation diagnosis section calculates a correlation between the oscillation of said average air fuel ratio and an output value of said downstream air fuel ratio sensor, and diagnoses the degradation of said catalyst based on the correlation thus calculated,
   wherein said catalyst degradation diagnosis section calculates a first inversion period based on an oscillation width to the rich direction and to the lean direction of said average air fuel ratio, and a second inversion period based on an oscillation width of the output value of said downstream air fuel ratio sensor; and
   wherein said catalyst degradation diagnosis section also calculates an oscillation width ratio from a ratio of said first oscillation width and said second oscillation width, and diagnoses the degradation of said catalyst based on said oscillation width ratio thus calculated.

2. The air fuel ratio control apparatus for an internal combustion engine as set forth in claim 1, wherein
   said catalyst degradation diagnosis section calculates a first inversion period with which said average air fuel ratio is inverted to the rich direction and to the lean direction, and a second inversion period with which the output value of said downstream air fuel ratio sensor is inverted to the rich direction and to the lean direction with a predetermined determination threshold being taken as a reference; and
   said catalyst degradation diagnosis section calculates an inversion period ratio from a ratio of said first inversion period and said second inversion period, and diagnoses the degradation of said catalyst based on said inversion period ratio thus calculated.

3. The air fuel ratio control apparatus for an internal combustion engine as set forth in claim 1, wherein
   said average air fuel ratio oscillation section sets said control constant in accordance with a target average air fuel ratio for said average air fuel ratio thereby to make said target average air fuel ratio oscillate in the rich and lean directions in a periodic manner.

4. The air fuel ratio control apparatus for an internal combustion engine as set forth in claim 1, wherein
   said catalyst degradation diagnosis section updates a calculated value for catalyst degradation diagnosis based on the output value of the downstream oxygen sensor and said average air fuel ratio calculated during the period of a predetermined frequency of oscillations each time the frequency of oscillations to the rich and lean directions of said average air fuel ratio reaches said predetermined frequency of oscillations.

5. The air fuel ratio control apparatus for an internal combustion engine as set forth in claim 1, wherein
said catalyst degradation diagnosis section diagnoses the degradation of said catalyst based on the oscillation behavior of said average air fuel ratio in a predetermined period of time and the behavior of the output value of the downstream oxygen sensor in said predetermined period after a delay time that is in correlation to an amount of intake air of said internal combustion engine.

6. The air fuel ratio control apparatus for an internal combustion engine as set forth in claim 1, wherein
said catalyst degradation diagnosis section inhibits the execution of degradation diagnosis processing for said catalyst for a period of time in which a predetermined frequency of oscillations is reached after the start of oscillation of said average air fuel ratio.

7. The air fuel ratio control apparatus for an internal combustion engine as set forth in claim 1, further comprising:
a second air fuel ratio feedback control section that corrects an oscillation center of said average air fuel ratio based on the output value of said downstream air fuel ratio sensor.

8. The air fuel ratio control apparatus for an internal combustion engine as set forth in claim 7, wherein
said catalyst degradation diagnosis section sets a target value for the output value of said downstream air fuel ratio sensor in said second air fuel ratio feedback control section as a determination threshold for the inversion determination of the output value of said downstream air fuel ratio sensor.

9. The air fuel ratio control apparatus for an internal combustion engine as set forth in claim 7, wherein
said catalyst degradation diagnosis section sets a gradually changing processed value for the output value of said downstream air fuel ratio sensor in said second air fuel ratio feedback control section as a determination threshold for the inversion determination of the output value of said downstream air fuel ratio sensor.

* * * * *